United States Patent
Ito

(10) Patent No.: US 7,859,978 B2
(45) Date of Patent: *Dec. 28, 2010

(54) OPTICAL PICKUP LENS

(75) Inventor: Mitsuru Ito, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/662,173

(22) Filed: Apr. 2, 2010

(65) Prior Publication Data

US 2010/0195220 A1    Aug. 5, 2010

Related U.S. Application Data

(63) Continuation of application No. 12/656,059, filed on Jan. 14, 2010, which is a continuation of application No. 11/979,720, filed on Nov. 7, 2007, now Pat. No. 7,742,383.

(30) Foreign Application Priority Data

Nov. 8, 2006    (JP) .............................. 2006-303396

(51) Int. Cl.
*G11B 7/00*    (2006.01)
(52) U.S. Cl. .............................. 369/112.26; 369/112.23
(58) Field of Classification Search ............ 369/112.23, 369/112.25, 112.26, 112.01, 112.07, 112.08, 369/112.12, 112.13, 44.23; 359/719, 721, 359/565, 566, 717, 724
See application file for complete search history.

(56) References Cited

U.S. PATENT DOCUMENTS

| | | | | | |
|---|---|---|---|---|---|
| 4,743,093 | A | * | 5/1988 | Oinen | 359/719 |
| 5,600,494 | A | * | 2/1997 | Kubo et al. | 359/719 |
| 5,796,520 | A | * | 8/1998 | Maruyama | 359/565 |
| 6,625,103 | B1 | * | 9/2003 | Koike | 369/112.26 |
| 6,829,105 | B2 | | 12/2004 | Kubo | |
| 7,054,254 | B2 | | 5/2006 | Maruyama | |
| 7,206,275 | B2 | | 4/2007 | Saitoh et al. | |
| 7,345,829 | B2 | | 3/2008 | Terashima et al. | |
| 7,345,983 | B2 | | 3/2008 | Kimura et al. | |
| 7,414,796 | B2 | | 8/2008 | Sugi et al. | |

(Continued)

FOREIGN PATENT DOCUMENTS

JP    A-55-59418    5/1980

(Continued)

OTHER PUBLICATIONS

Japanese Office Action from JP2008-177372, mailed on Apr. 7, 2009 (and translation).

(Continued)

*Primary Examiner*—Thang V Tran
(74) *Attorney, Agent, or Firm*—Oliff & Berridge, PLC

(57) ABSTRACT

An optical pickup lens for focusing a light beam from a laser light source on an optical information recording medium is a single lens. The optical pickup lens has two surfaces, and a surface R2 opposite to a surface R1 closer to the laser light source has a continuous shape. When the surface R2 has radii h1, h2 and h3 (h1<h2<h3) from an optical axis to a lens periphery, and where sags in the radii h1, h2 and h3 are sag1, sag2 and sag3, and differentials in the sags are Δsag1, Δsag2 and Δsag3, respectively, 0>Δsag1>Δsag2 and Δsag2<Δsag3 are satisfied.

10 Claims, 70 Drawing Sheets

U.S. PATENT DOCUMENTS

| | | |
|---|---|---|
| 7,414,976 B2 | 8/2008 | Venkatachalam et al. |
| 2003/0128440 A1* | 7/2003 | Kimura .................... 359/717 |
| 2003/0184881 A1* | 10/2003 | Itonaga .................... 359/719 |
| 2007/0263523 A1 | 11/2007 | Sugi |
| 2008/0013415 A1 | 1/2008 | Nomura et al. |
| 2009/0129241 A1 | 5/2009 | Katsuma et al. |

FOREIGN PATENT DOCUMENTS

| | | |
|---|---|---|
| JP | A 2001-324673 | 11/2001 |
| JP | A 2002-156579 | 5/2002 |
| JP | A 2002-303787 | 10/2002 |
| JP | A-2003-091854 | 3/2003 |
| JP | A-2003-115125 | 4/2003 |
| JP | A-2003-207714 | 7/2003 |
| JP | A-2003-279851 | 10/2003 |
| JP | A-2003-337281 | 11/2003 |
| JP | A-2004-014095 | 1/2004 |
| JP | A-2004-151665 | 5/2004 |
| JP | A-2004-185797 | 7/2004 |
| JP | A-2004-265573 | 9/2004 |
| JP | A-2004-335080 | 11/2004 |
| JP | A-2005-166227 | 6/2005 |
| JP | A-2006-155839 | 6/2006 |
| JP | A-2006-252770 | 9/2006 |
| JP | A-2007-299486 | 11/2007 |
| JP | A-2008-084490 | 4/2008 |
| JP | A-2008-262699 | 10/2008 |
| JP | A-2008-262700 | 10/2008 |
| JP | A-2008-262701 | 10/2008 |
| JP | A-2008-293640 | 12/2008 |
| JP | A-2008-293641 | 12/2008 |
| WO | WO 2006/085452 A1 | 8/2006 |

OTHER PUBLICATIONS

Japanese Office Action from JP2009-217388, mailed on Oct. 13, 2009 (and translation).

Dec. 1, 2009 Appeal Decision issued in Japanese Patent Application No. 2008-177372 (with English-Language Translation).

Dec. 8, 2009 Decision to Grant issued in Japanese Patent Application No. 2009-217388 (with English-Language Translation).

* cited by examiner

|  | ON-AXIS WAVEFRONT ABERRATION (λ rms) | ANGLE OF VIEW (0.3°) WAVEFRONT ABERRATION (λ rms) |
|---|---|---|
| EXAMPLE 1 | 0.002 | 0.008 |
| EXAMPLE 2 | 0.004 | 0.006 |
| EXAMPLE 3 | 0.005 | 0.011 |
| EXAMPLE 4 | 0.005 | 0.010 |
| EXAMPLE 5 | 0.002 | 0.008 |
| EXAMPLE 6 | 0.002 | 0.007 |
| EXAMPLE 7 | 0.002 | 0.012 |
| EXAMPLE 8 | 0.003 | 0.010 |
| EXAMPLE 9 | 0.002 | 0.011 |
| EXAMPLE 10 | 0.002 | 0.008 |
| EXAMPLE 11 | 0.002 | 0.006 |
| EXAMPLE 12 | 0.003 | 0.012 |
| EXAMPLE 13 | 0.003 | 0.010 |
| EXAMPLE 14 | 0.005 | 0.010 |
| EXAMPLE 15 | 0.002 | 0.006 |
| EXAMPLE 16 | 0.004 | 0.008 |
| EXAMPLE 17 | 0.004 | 0.011 |
| EXAMPLE 18 | 0.006 | 0.011 |
| EXAMPLE 19 | 0.006 | 0.011 |
| EXAMPLE 20 | 0.006 | 0.011 |
| EXAMPLE 21 | 0.007 | 0.011 |
| EXAMPLE 22 | 0.005 | 0.011 |
| EXAMPLE 23 | 0.005 | 0.011 |
| EXAMPLE 24 | 0.005 | 0.010 |
| EXAMPLE 25 | 0.005 | 0.011 |
| EXAMPLE 26 | 0.003 | 0.007 |
| EXAMPLE 27 | 0.005 | 0.010 |
| EXAMPLE 28 | 0.005 | 0.010 |
| EXAMPLE 29 | 0.005 | 0.010 |
| EXAMPLE 30 | 0.005 | 0.011 |
| EXAMPLE 31 | 0.003 | 0.010 |
| EXAMPLE 32 | 0.006 | 0.011 |

Fig. 4

|  | CURVATURE RADIUS R (mm) | INTER-PLANE DISTANCE d (mm) | REFRACTIVE INDEX n | ABBE NUMBER νd |
|---|---|---|---|---|
| 0 (APERTURE STOP SURFACE) | ∞ | 0 |  |  |
| 1 (OPTICAL PICKUP LENS SURFACE R1) | 0.9056466 | 1.68495 | 1.510000 | 72.1 |
| 2 (OPTICAL PICKUP LENS SURFACE R2) | -1.297362 | 0.4700169 |  |  |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 |  |  |

Fig. 5A

| f (mm) | 1.41 | NA | 0.87 |
|---|---|---|---|
| WORKING DISTANCE WD (mm) | 0.4700169 | EFFECTIVE DIAMETER (mm) | 2.45 |

Fig. 5B

| ASPHERIC COEFFICIENT OF OPTICAL PICKUP LENS SURFACE R1 | | | |
|---|---|---|---|
| $k_1$ | -0.926974 | $A_1 4$ | 0.088745883 |
| $A_1 6$ | -0.014009239 | $A_1 8$ | 0.099800842 |
| $A_1 10$ | -0.14901375 | $A_1 12$ | 0.14625795 |
| $A_1 14$ | -0.070002669 | $A_1 16$ | 0.014589588 |

Fig. 5C

| ASPHERIC COEFFICIENT OF OPTICAL PICKUP LENS SURFACE R2 | | | |
|---|---|---|---|
| $k_2$ | -39.48096 | $A_2 4$ | 0.075333946 |
| $A_2 6$ | 0.18895162 | $A_2 8$ | -0.62044141 |
| $A_2 10$ | 0.70725579 | $A_2 12$ | -0.29899683 |
| $A_2 14$ | -0.04753959 | $A_2 16$ | 0.054582827 |

Fig. 5D

|  | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | ∞ | 0 | | |
| 1 (OPTICAL PICKUP LENS SURFACE R1) | 0.7512375 | 1.41 | 1.510000 | 70.0 |
| 2 (OPTICAL PICKUP LENS SURFACE R2) | -1.107503 | 0.3780043 | | |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 | | |

Fig. 7A

| f (mm) | 1.18 | NA | 0.86 |
|---|---|---|---|
| WORKING DISTANCE WD (mm) | 0.3780043 | EFFECTIVE DIAMETER (mm) | 2.04 |

Fig. 7B

| ASPHERIC COEFFICIENT OF OPTICAL PICKUP LENS SURFACE R1 | | | |
|---|---|---|---|
| $k1$ | -0.9932813 | $A_1 4$ | 0.16173019 |
| $A_1 6$ | -0.0068172054 | $A_1 8$ | 0.30943156 |
| $A_1 10$ | -0.71828309 | $A_1 12$ | 1.0694734 |
| $A_1 14$ | -0.73917226 | $A_1 16$ | 0.20953108 |

Fig. 7C

| ASPHERIC COEFFICIENT OF OPTICAL PICKUP LENS SURFACE R2 | | | |
|---|---|---|---|
| $k2$ | -33.95954 | $A_2 4$ | 0.17453771 |
| $A_2 6$ | 0.44467479 | $A_2 8$ | -2.4997169 |
| $A_2 10$ | 3.8254443 | $A_2 12$ | -0.79040597 |
| $A_2 14$ | -3.2835885 | $A_2 16$ | 2.3437228 |

Fig. 7D

|  | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | ∞ | 0 |  |  |
| 1 (OPTICAL PICKUP LENS SURFACE R1) | 0.7635927 | 1.12 | 1.510000 | 72.1 |
| 2 (OPTICAL PICKUP LENS SURFACE R2) | -1.433206 | 0.541468 |  |  |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 |  |  |

Fig. 9A

| f (mm) | 1.18 | NA | 0.86 |
|---|---|---|---|
| WORKING DISTANCE WD (mm) | 0.541468 | EFFECTIVE DIAMETER (mm) | 2.04 |

Fig. 9B

| ASPHERIC COEFFICIENT OF OPTICAL PICKUP LENS SURFACE R1 ||||
|---|---|---|---|
| k1 | -0.9466495 | $A_14$ | 0.24903705 |
| $A_16$ | -0.36048557 | $A_18$ | 1.1438588 |
| $A_110$ | -1.9098038 | $A_112$ | 1.6938973 |
| $A_114$ | -0.46516446 | $A_116$ | -0.072891209 |

Fig. 9C

| ASPHERIC COEFFICIENT OF OPTICAL PICKUP LENS SURFACE R2 ||||
|---|---|---|---|
| k2 | -75.72197 | $A_24$ | 0.019422265 |
| $A_26$ | -0.32268346 | $A_28$ | 2.2460383 |
| $A_210$ | -5.4223554 | $A_212$ | 6.376184 |
| $A_214$ | -3.7488674 | $A_216$ | 0.88571896 |

Fig. 9D

| | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | ∞ | 0 | | |
| 1 (OPTICAL PICKUP LENS SURFACE R1) | 0.7679574 | 1.1 | 1.520000 | 71.2 |
| 2 (OPTICAL PICKUP LENS SURFACE R2) | -1.55685 | 0.5478057 | | |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 | | |

Fig. 11A

| f (mm) | 1.18 | NA | 0.86 |
|---|---|---|---|
| WORKING DISTANCE WD (mm) | 0.5478057 | EFFECTIVE DIAMETER (mm) | 2.04 |

Fig. 11B

| ASPHERIC COEFFICIENT OF OPTICAL PICKUP LENS SURFACE R1 | | | |
|---|---|---|---|
| k1 | -0.9398416 | $A_1 4$ | 0.24128209 |
| $A_1 6$ | -0.34301622 | $A_1 8$ | 1.083611 |
| $A_1 10$ | -1.8150026 | $A_1 12$ | 1.6414373 |
| $A_1 14$ | -0.47292165 | $A_1 16$ | -0.062493854 |

Fig. 11C

| ASPHERIC COEFFICIENT OF OPTICAL PICKUP LENS SURFACE R2 | | | |
|---|---|---|---|
| k2 | -88.93305 | $A_2 4$ | 0.023349205 |
| $A_2 6$ | -0.32649716 | $A_2 8$ | 2.2472554 |
| $A_2 10$ | -5.4246882 | $A_2 12$ | 6.380635 |
| $A_2 14$ | -3.751575 | $A_2 16$ | 0.88613003 |

Fig. 11D

| | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | ∞ | 0 | | |
| 1 (OPTICAL PICKUP LENS SURFACE R1) | 1.191532 | 1.880206 | 1.589500 | 60.1 |
| 2 (OPTICAL PICKUP LENS SURFACE R2) | -3.403963 | 0.6781086 | | |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 | | |

Fig. 13A

| f (mm) | 1.765 | NA | 0.87 |
|---|---|---|---|
| WORKING DISTANCE WD (mm) | 0.6781086 | EFFECTIVE DIAMETER (mm) | 3.071 |

Fig. 13B

| ASPHERIC COEFFICIENT OF OPTICAL PICKUP LENS SURFACE R1 | | | |
|---|---|---|---|
| k1 | -0.9492633 | $A_1 4$ | 0.044592937 |
| $A_1 6$ | -0.0068437749 | $A_1 8$ | 0.021477068 |
| $A_1 10$ | -0.019768666 | $A_1 12$ | 0.012293489 |
| $A_1 14$ | -0.0038200489 | $A_1 16$ | 0.00050129802 |

Fig. 13C

| ASPHERIC COEFFICIENT OF OPTICAL PICKUP LENS SURFACE R2 | | | |
|---|---|---|---|
| k2 | -182.9027 | $A_2 4$ | 0.027690813 |
| $A_2 6$ | 0.067467218 | $A_2 8$ | -0.12461531 |
| $A_2 10$ | 0.089306502 | $A_2 12$ | -0.027291059 |
| $A_2 14$ | 0.00074940155 | $A_2 16$ | 0.00092481679 |

Fig. 13D

| | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | ∞ | | | |
| 1 (OPTICAL PICKUP LENS SURFACE R1) | 0.9535233 | 1.500789 | 1.589900 | 61.9 |
| 2 (OPTICAL PICKUP LENS SURFACE R2) | -2.709719 | 0.5326224 | | |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 | | |

Fig. 15A

| f (mm) | 1.41 | NA | 0.87 |
|---|---|---|---|
| WORKING DISTANCE WD (mm) | 0.5326224 | EFFECTIVE DIAMETER (mm) | 2.45 |

Fig. 15B

| ASPHERIC COEFFICIENT OF OPTICAL PICKUP LENS SURFACE R1 | | | |
|---|---|---|---|
| k1 | -0.9600111 | $A_14$ | 0.088155058 |
| $A_16$ | -0.020201892 | $A_18$ | 0.10304172 |
| $A_110$ | -0.14913915 | $A_112$ | 0.14541671 |
| $A_114$ | -0.070831316 | $A_116$ | 0.01461419 |

Fig. 15C

| ASPHERIC COEFFICIENT OF OPTICAL PICKUP LENS SURFACE R2 | | | |
|---|---|---|---|
| k2 | -173.3174 | $A_24$ | 0.055207581 |
| $A_26$ | 0.20760269 | $A_28$ | -0.60003347 |
| $A_210$ | 0.6732648 | $A_212$ | -0.32321924 |
| $A_214$ | 0.015478211 | $A_216$ | 0.026017588 |

Fig. 15D

|  | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | ∞ | 0 | | |
| 1 (OPTICAL PICKUP LENS SURFACE R1) | 0.8001256 | 1.252404 | 1.589500 | 62.1 |
| 2 (OPTICAL PICKUP LENS SURFACE R2) | -2.233906 | 0.4410299 | | |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 | | |

Fig. 17A

| f (mm) | 1.18 | NA | 0.87 |
|---|---|---|---|
| WORKING DISTANCE WD (mm) | 0.4410299 | EFFECTIVE DIAMETER (mm) | 2.05 |

Fig. 17B

| ASPHERIC COEFFICIENT OF OPTICAL PICKUP LENS SURFACE R1 | | | |
|---|---|---|---|
| k1 | -0.9594913 | $A_1 4$ | 0.14877579 |
| $A_1 6$ | -0.045632834 | $A_1 8$ | 0.35019747 |
| $A_1 10$ | -0.7328475 | $A_1 12$ | 1.0313709 |
| $A_1 14$ | -0.72313909 | $A_1 16$ | 0.21427771 |

Fig. 17C

| ASPHERIC COEFFICIENT OF OPTICAL PICKUP LENS SURFACE R2 | | | |
|---|---|---|---|
| k2 | -161.224 | $A_2 4$ | 0.094760596 |
| $A_2 6$ | 0.50494165 | $A_2 8$ | -2.0833173 |
| $A_2 10$ | 3.3426387 | $A_2 12$ | -2.3085402 |
| $A_2 14$ | 0.18292616 | $A_2 16$ | 0.3648101 |

Fig. 17D

| | CURVATURE RADIUS R (mm) | INTER-PLANE DISTANCE d (mm) | REFRACTIVE INDEX n | ABBE NUMBER $\nu$ d |
|---|---|---|---|---|
| 0 (APERTURE STOP SURFACE) | ∞ | 0 | | |
| 1 (OPTICAL PICKUP LENS SURFACE R1) | 1.228405 | 1.861999 | 1.610000 | 61.5 |
| 2 (OPTICAL PICKUP LENS SURFACE R2) | -3.709981 | 0.697384 | | |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 | | |

Fig. 19A

| f (mm) | 1.765 | NA | 0.85 |
|---|---|---|---|
| WORKING DISTANCE WD (mm) | 0.697384 | EFFECTIVE DIAMETER (mm) | 3.01 |

Fig. 19B

| ASPHERIC COEFFICIENT OF OPTICAL PICKUP LENS SURFACE R1 | | | |
|---|---|---|---|
| k1 | -0.933373 | $A_1 4$ | 0.055949772 |
| $A_1 6$ | -0.041886709 | $A_1 8$ | 0.07248633 |
| $A_1 10$ | -0.06826189 | $A_1 12$ | 0.040094777 |
| $A_1 14$ | -0.012519385 | $A_1 16$ | 0.001630436 |

Fig. 19C

| ASPHERIC COEFFICIENT OF OPTICAL PICKUP LENS SURFACE R2 | | | |
|---|---|---|---|
| k2 | -455.5753 | $A_2 4$ | -0.010152777 |
| $A_2 6$ | 0.14291499 | $A_2 8$ | -0.14735344 |
| $A_2 10$ | -0.027462306 | $A_2 12$ | 0.15058201 |
| $A_1 14$ | -0.1014961 | $A_1 16$ | 0.022479329 |

Fig. 19D

|  | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | $\infty$ | 0 |  |  |
| 1 (OPTICAL PICKUP LENS SURFACE R1) | 1.189682 | 1.892 | 1.580000 | 62.8 |
| 2 (OPTICAL PICKUP LENS SURFACE R2) | -3.053853 | 0.6806319 |  |  |
| 3 (LIGHT TRANSMITTING LAYER IN OPTICAL DISC) | $\infty$ | 0.0875 | 1.621308 | 29.8 |
| 4 (LIGHT TRANSMITTING LAYER IN OPTICAL DISC) | $\infty$ | 0 |  |  |

Fig. 21A

| f (mm) | 1.765 | NA | 0.87 |
|---|---|---|---|
| WORKING DISTANCE WD (mm) | 0.6806319 | EFFECTIVE DIAMETER (mm) | 3.07 |

Fig. 21B

| ASPHERIC COEFFICIENT OF OPTICAL PICKUP LENS SURFACE R1 | | | |
|---|---|---|---|
| $k_1$ | -0.9580877 | $A_1 4$ | 0.045801354 |
| $A_1 6$ | -0.007251242 | $A_1 8$ | 0.021672754 |
| $A_1 10$ | -0.019763282 | $A_1 12$ | 0.012276112 |
| $A_1 14$ | -0.0038263848 | $A_1 16$ | 0.00050735434 |

Fig. 21C

| ASPHERIC COEFFICIENT OF OPTICAL PICKUP LENS SURFACE R2 | | | |
|---|---|---|---|
| $k_2$ | -143.2029 | $A_2 4$ | 0.027970648 |
| $A_2 6$ | 0.067411313 | $A_2 8$ | -0.1237978 |
| $A_2 10$ | 0.088770483 | $A_2 12$ | -0.027492372 |
| $A_2 14$ | 0.0010203336 | $A_2 16$ | 0.0008590202 |

Fig. 21D

|  | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | ∞ | 0 | | |
| 1 (OPTICAL PICKUP LENS SURFACE R1) | 0.9425122 | 1.502034 | 1.570000 | 63.5 |
| 2 (OPTICAL PICKUP LENS SURFACE R2) | -2.299648 | 0.5402237 | | |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 | | |

Fig. 23A

| f (mm) | 1.41 | NA | 0.87 |
|---|---|---|---|
| WORKING DISTANCE WD (mm) | 0.5402237 | EFFECTIVE DIAMETER (mm) | 2.45 |

Fig. 23B

| ASPHERIC COEFFICIENT OF OPTICAL PICKUP LENS SURFACE R1 | | | |
|---|---|---|---|
| k1 | -0.9565323 | $A_1 4$ | 0.090865527 |
| $A_1 6$ | -0.020422483 | $A_1 8$ | 0.10301823 |
| $A_1 10$ | -0.14836638 | $A_1 12$ | 0.14583109 |
| $A_1 14$ | -0.070851658 | $A_1 16$ | 0.01430004 |

Fig. 23C

| ASPHERIC COEFFICIENT OF OPTICAL PICKUP LENS SURFACE R2 | | | |
|---|---|---|---|
| k2 | -118.3703 | $A_2 4$ | 0.052874754 |
| $A_2 6$ | 0.20738386 | $A_2 8$ | -0.60144087 |
| $A_2 10$ | 0.67131768 | $A_2 12$ | -0.3220786 |
| $A_2 14$ | 0.020383006 | $A_2 16$ | 0.022620086 |

Fig. 23D

| | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | ∞ | 0 | | |
| 1 (OPTICAL PICKUP LENS SURFACE R1) | 0.7964245 | 1.41 | 1.570000 | 63.5 |
| 2 (OPTICAL PICKUP LENS SURFACE R2) | −1.545441 | 0.367573 | | |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 | | |

Fig. 25A

| f (mm) | 1.18 | NA | 0.87 |
|---|---|---|---|
| WORKING DISTANCE WD (mm) | 0.367573 | EFFECTIVE DIAMETER (mm) | 2.05 |

Fig. 25B

| ASPHERIC COEFFICIENT OF OPTICAL PICKUP LENS SURFACE R1 | | | |
|---|---|---|---|
| k1 | −0.9605808 | $A_14$ | 0.1392074 |
| $A_16$ | −0.022166318 | $A_18$ | 0.32576885 |
| $A_110$ | −0.73020892 | $A_112$ | 1.0409532 |
| $A_114$ | −0.72543054 | $A_116$ | 0.2110024 |

Fig. 25C

| ASPHERIC COEFFICIENT OF OPTICAL PICKUP LENS SURFACE R2 | | | |
|---|---|---|---|
| k2 | −74.59183 | $A_24$ | 0.23922495 |
| $A_26$ | 0.24810152 | $A_28$ | −2.4411527 |
| $A_210$ | 4.3912018 | $A_212$ | −0.72293383 |
| $A_214$ | −5.729731 | $A_216$ | 4.5963303 |

Fig. 25D

|  | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | ∞ | 0 | | |
| 1 (OPTICAL PICKUP LENS SURFACE R1) | 1.268997 | 2.11 | 1.640000 | 55.0 |
| 2 (OPTICAL PICKUP LENS SURFACE R2) | -3.610762 | 0.5657746 | | |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 | | |

Fig. 27A

| f (mm) | 1.765 | NA | 0.87 |
|---|---|---|---|
| WORKING DISTANCE WD (mm) | 0.5657746 | EFFECTIVE DIAMETER (mm) | 3.07 |

Fig. 27B

| ASPHERIC COEFFICIENT OF OPTICAL PICKUP LENS SURFACE R1 | | | |
|---|---|---|---|
| k1 | -1.044086 | $A_1 4$ | 0.056858804 |
| $A_1 6$ | -0.036969722 | $A_1 8$ | 0.06823844 |
| $A_1 10$ | -0.066340745 | $A_1 12$ | 0.039968808 |
| $A_1 14$ | -0.012879695 | $A_1 16$ | 0.0017427414 |

Fig. 27C

| ASPHERIC COEFFICIENT OF OPTICAL PICKUP LENS SURFACE R2 | | | |
|---|---|---|---|
| k2 | -726.2614 | $A_2 4$ | -0.0069533698 |
| $A_2 6$ | 0.42633354 | $A_2 8$ | -0.90876836 |
| $A_2 10$ | 0.61432937 | $A_2 12$ | 0.40910207 |
| $A_2 14$ | -0.76415264 | $A_2 16$ | 0.28848611 |

Fig. 27D

|  | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | ∞ | 0 | | |
| 1 (OPTICAL PICKUP LENS SURFACE R1) | 1.124288 | 2.109175 | 1.510000 | 72.1 |
| 2 (OPTICAL PICKUP LENS SURFACE R2) | -1.654282 | 0.5926939 | | |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 | | |

Fig. 29A

| f (mm) | 1.765 | NA | 0.87 |
|---|---|---|---|
| WORKING DISTANCE WD (mm) | 0.5926939 | EFFECTIVE DIAMETER (mm) | 3.07 |

Fig. 29B

| ASPHERIC COEFFICIENT OF OPTICAL PICKUP LENS SURFACE R1 | | | |
|---|---|---|---|
| k1 | -0.9384436 | $A_14$ | 0.044567441 |
| $A_16$ | 0.0031781266 | $A_18$ | 0.0071153218 |
| $A_110$ | -0.0063732122 | $A_112$ | 0.0054324291 |
| $A_114$ | -0.0021163885 | $A_116$ | 0.00038807555 |

Fig. 29C

| ASPHERIC COEFFICIENT OF OPTICAL PICKUP LENS SURFACE R2 | | | |
|---|---|---|---|
| k2 | -39.44136 | $A_24$ | 0.049311919 |
| $A_26$ | 0.020205358 | $A_28$ | -0.071421532 |
| $A_210$ | 0.069017618 | $A_212$ | -0.035588392 |
| $A_214$ | 0.0095701237 | $A_216$ | -0.0010241709 |

Fig. 29D

|  | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | ∞ | 0 |  |  |
| 1 (OPTICAL PICKUP LENS SURFACE R1) | 1.022536 | 1.68495 | 1.640000 | 55.0 |
| 2 (OPTICAL PICKUP LENS SURFACE R2) | -2.741647 | 0.4493312 |  |  |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 |  |  |

Fig. 31A

| f (mm) | 1.41 | NA | 0.87 |
|---|---|---|---|
| WORKING DISTANCE WD (mm) | 0.4493312 | EFFECTIVE DIAMETER (mm) | 2.45 |

Fig. 31B

| ASPHERIC COEFFICIENT OF OPTICAL PICKUP LENS SURFACE R1 | | | |
|---|---|---|---|
| k1 | -0.9645603 | $A_1 4$ | 0.10468541 |
| $A_1 6$ | -0.12249481 | $A_1 8$ | 0.34809003 |
| $A_1 10$ | -0.51790173 | $A_1 12$ | 0.46920166 |
| $A_1 14$ | -0.22678856 | $A_1 16$ | 0.046341405 |

Fig. 31C

| ASPHERIC COEFFICIENT OF OPTICAL PICKUP LENS SURFACE R2 | | | |
|---|---|---|---|
| k2 | -606.7909 | $A_2 4$ | 0.10519824 |
| $A_2 6$ | 0.37017977 | $A_2 8$ | -1.2124966 |
| $A_2 10$ | 0.53733141 | $A_2 12$ | 3.2473091 |
| $A_2 14$ | -5.5218119 | $A_2 16$ | 2.6223762 |

Fig. 31D

|  | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | ∞ | 0 | | |
| 1 (OPTICAL PICKUP LENS SURFACE R1) | 0.8427123 | 1.41 | 1.640000 | 55.0 |
| 2 (OPTICAL PICKUP LENS SURFACE R2) | -2.52389 | 0.3555572 | | |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 | | |

Fig. 33A

| f (mm) | 1.18 | NA | 0.87 |
|---|---|---|---|
| WORKING DISTANCE WD (mm) | 0.3555572 | EFFECTIVE DIAMETER (mm) | 2.05 |

Fig. 33B

| ASPHERIC COEFFICIENT OF OPTICAL PICKUP LENS SURFACE R1 | | | |
|---|---|---|---|
| k1 | -0.9827762 | $A_1 4$ | 0.13983568 |
| $A_1 6$ | -0.04947903 | $A_1 8$ | 0.35410773 |
| $A_1 10$ | -0.74497112 | $A_1 12$ | 1.0226357 |
| $A_1 14$ | -0.71959906 | $A_1 16$ | 0.21837798 |

Fig. 33C

| ASPHERIC COEFFICIENT OF OPTICAL PICKUP LENS SURFACE R2 | | | |
|---|---|---|---|
| k2 | -353.6122 | $A_2 4$ | 0.28576337 |
| $A_2 6$ | 0.1897616 | $A_2 8$ | -2.431659 |
| $A_2 10$ | 4.6319539 | $A_2 12$ | -0.63443207 |
| $A_2 14$ | -6.9566166 | $A_2 16$ | 5.5001634 |

Fig. 33D

|  | CURVATURE RADIUS R (mm) | INTER-PLANE DISTANCE d (mm) | REFRACTIVE INDEX n | ABBE NUMBER $\nu$d |
|---|---|---|---|---|
| 0 (APERTURE STOP SURFACE) | ∞ | 0 |  |  |
| 1 (OPTICAL PICKUP LENS SURFACE R1) | 0.9877811 | 1.269 | 1.640000 | 55.0 |
| 2 (OPTICAL PICKUP LENS SURFACE R2) | -5.205923 | 0.6491336 |  |  |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 |  |  |

Fig. 35A

| f (mm) | 1.41 | NA | 0.87 |
|---|---|---|---|
| WORKING DISTANCE WD (mm) | 0.6491336 | EFFECTIVE DIAMETER (mm) | 2.44 |

Fig. 35B

| ASPHERIC COEFFICIENT OF OPTICAL PICKUP LENS SURFACE R1 | | | |
|---|---|---|---|
| k1 | -1.021529 | $A_1 4$ | 0.12263938 |
| $A_1 6$ | -0.13960613 | $A_1 8$ | 0.38200409 |
| $A_1 10$ | -0.55699969 | $A_1 12$ | 0.4973079 |
| $A_1 14$ | -0.2333599 | $A_1 16$ | 0.045056312 |

Fig. 35C

| ASPHERIC COEFFICIENT OF OPTICAL PICKUP LENS SURFACE R2 | | | |
|---|---|---|---|
| k2 | -1283.085 | $A_2 4$ | 0.06691832 |
| $A_2 6$ | -0.059741496 | $A_2 8$ | 0.3161995 |
| $A_2 10$ | -0.79754312 | $A_2 12$ | 0.91510312 |
| $A_2 14$ | -0.50238815 | $A_2 16$ | 0.10800529 |

Fig. 35D

|  | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | ∞ | 0 |  |  |
| 1 (OPTICAL PICKUP LENS SURFACE R1) | 1.125578 | 1.69 | 1.530000 | 65.3 |
| 2 (OPTICAL PICKUP LENS SURFACE R2) | -2.657615 | 0.7930357 |  |  |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 |  |  |

Fig. 37A

| f (mm) | 1.765 | NA | 0.87 |
|---|---|---|---|
| WORKING DISTANCE WD (mm) | 0.7930357 | EFFECTIVE DIAMETER (mm) | 3.06 |

Fig. 37B

| ASPHERIC COEFFICIENT OF OPTICAL PICKUP LENS SURFACE R1 ||||
|---|---|---|---|
| k1 | -1.027897 | $A_1 4$ | 0.059195591 |
| $A_1 6$ | -0.005568913 | $A_1 8$ | 0.014102018 |
| $A_1 10$ | -0.0058692147 | $A_1 12$ | -0.00026732758 |
| $A_1 14$ | 0.0016815396 | $A_1 16$ | -0.00038238792 |

Fig. 37C

| ASPHERIC COEFFICIENT OF OPTICAL PICKUP LENS SURFACE R2 ||||
|---|---|---|---|
| k2 | -76.97271 | $A_2 4$ | 0.029612385 |
| $A_2 6$ | -0.03401654 | $A_2 8$ | 0.067899864 |
| $A_2 10$ | -0.069152263 | $A_2 12$ | 0.035806394 |
| $A_2 14$ | -0.0093407832 | $A_2 16$ | 0.00098109414 |

Fig. 37D

|  | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | ∞ | 0 |  |  |
| 1 (OPTICAL PICKUP LENS SURFACE R1) | 1.115539 | 1.71 | 1.520000 | 71.2 |
| 2 (OPTICAL PICKUP LENS SURFACE R2) | -2.46248 | 0.7854462 |  |  |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 |  |  |

Fig. 39A

| f (mm) | 1.765 | NA | 0.87 |
|---|---|---|---|
| WORKING DISTANCE WD (mm) | 0.7854462 | EFFECTIVE DIAMETER (mm) | 3.054 |

Fig. 39B

| ASPHERIC COEFFICIENT OF OPTICAL PICKUP LENS SURFACE R1 |  |  |  |
|---|---|---|---|
| k1 | -1.022663 | $A_1 4$ | 0.058942889 |
| $A_1 6$ | -0.0053838557 | $A_1 8$ | 0.016002706 |
| $A_1 10$ | -0.0089006439 | $A_1 12$ | 0.0019022455 |
| $A_1 16$ | 0.00098142769 | $A_1 16$ | -0.0002984782 |

Fig. 39C

| ASPHERIC COEFFICIENT OF OPTICAL PICKUP LENS SURFACE R2 |  |  |  |
|---|---|---|---|
| k2 | -63.49834 | $A_2 4$ | 0.03025509 |
| $A_2 6$ | -0.033664287 | $A_2 8$ | 0.068653753 |
| $A_2 10$ | -0.071943926 | $A_2 12$ | 0.038159486 |
| $A_2 16$ | -0.010159171 | $A_2 16$ | 0.0010857375 |

Fig. 39D

|  | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | ∞ | 0 | | |
| 1 (OPTICAL PICKUP LENS SURFACE R1) | 1.105804 | 1.75 | 1.510000 | 72.1 |
| 2 (OPTICAL PICKUP LENS SURFACE R2) | -2.253043 | 0.7676265 | | |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 | | |

Fig. 41A

| f (mm) | 1.765 | NA | 0.87 |
|---|---|---|---|
| WORKING DISTANCE WD (mm) | 0.7676265 | EFFECTIVE DIAMETER (mm) | 3.054 |

Fig. 41B

| ASPHERIC COEFFICIENT OF OPTICAL PICKUP LENS SURFACE R1 | | | |
|---|---|---|---|
| k1 | -1.052229 | $A_1 4$ | 0.06206122 |
| $A_1 6$ | -0.0052289708 | $A_1 8$ | 0.016529271 |
| $A_1 10$ | -0.0094237781 | $A_1 12$ | 0.0020510563 |
| $A_1 14$ | 0.00097282779 | $A_1 16$ | -0.00029150076 |

Fig. 41C

| ASPHERIC COEFFICIENT OF OPTICAL PICKUP LENS SURFACE R2 | | | |
|---|---|---|---|
| k2 | -53.38526 | $A_2 4$ | 0.029752378 |
| $A_2 6$ | -0.032035616 | $A_2 8$ | 0.067499761 |
| $A_2 10$ | -0.071790634 | $A_2 12$ | 0.038359519 |
| $A_2 14$ | -0.010259361 | $A_2 16$ | 0.0011001194 |

Fig. 41D

| | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | $\infty$ | 0 | | |
| 1 (OPTICAL PICKUP LENS SURFACE R1) | 0.8951218 | 1.37 | 1.510000 | 72.1 |
| 2 (OPTICAL PICKUP LENS SURFACE R2) | -1.766506 | 0.6271601 | | |
| 3 (LIGHT TRANSMITTING LAYER IN OPTICAL DISC) | $\infty$ | 0.0875 | 1.621308 | 29.8 |
| 4 (LIGHT TRANSMITTING LAYER IN OPTICAL DISC) | $\infty$ | 0 | | |

Fig. 43A

| f (mm) | 1.41 | NA | 0.87 |
|---|---|---|---|
| WORKING DISTANCE WD (mm) | 0.6271601 | EFFECTIVE DIAMETER (mm) | 2.44 |

Fig. 43B

| ASPHERIC COEFFICIENT OF OPTICAL PICKUP LENS SURFACE R1 | | | |
|---|---|---|---|
| k1 | -1.009089 | $A_1 4$ | 0.12908173 |
| $A_1 6$ | -0.061022809 | $A_1 8$ | 0.16879878 |
| $A_1 10$ | -0.18477171 | $A_1 12$ | 0.097246165 |
| $A_1 14$ | -0.0013373834 | $A_1 16$ | -0.0076762199 |

Fig. 43C

| ASPHERIC COEFFICIENT OF OPTICAL PICKUP LENS SURFACE R2 | | | |
|---|---|---|---|
| k2 | -61.4956 | $A_2 4$ | 0.055416533 |
| $A_2 6$ | -0.19788318 | $A_2 8$ | 0.63194589 |
| $A_2 10$ | -0.95825215 | $A_2 12$ | 0.75560862 |
| $A_2 14$ | -0.30470257 | $A_2 16$ | 0.049895607 |

Fig. 43D

|  | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | ∞ | 0 | | |
| 1 (OPTICAL PICKUP LENS SURFACE R1) | 1.131051 | 1.645339 | 1.550000 | 62.1 |
| 2 (OPTICAL PICKUP LENS SURFACE R2) | -3.313853 | 0.7999673 | | |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 | | |

Fig. 45A

| f (mm) | 1.765 | NA | 0.86 |
|---|---|---|---|
| WORKING DISTANCE WD (mm) | 0.7999673 | EFFECTIVE DIAMETER (mm) | 3.04 |

Fig. 45B

| ASPHERIC COEFFICIENT OF OPTICAL PICKUP LENS SURFACE R1 | | | |
|---|---|---|---|
| $k_1$ | -0.9617149 | $A_1 4$ | 0.046773933 |
| $A_1 6$ | 0.00044250507 | $A_1 8$ | 0.013249302 |
| $A_1 10$ | -0.010233637 | $A_1 12$ | 0.0044753146 |
| $A_1 14$ | -0.00032012855 | $A_1 16$ | -7.6326919e-005 |

Fig. 45C

| ASPHERIC COEFFICIENT OF OPTICAL PICKUP LENS SURFACE R2 | | | |
|---|---|---|---|
| $k_2$ | -79.58361 | $A_2 4$ | 0.062982414 |
| $A_2 6$ | -0.096285282 | $A_2 8$ | 0.14032715 |
| $A_2 10$ | -0.12412936 | $A_2 12$ | 0.061702932 |
| $A_2 14$ | -0.016114362 | $A_2 16$ | 0.0017273197 |

Fig. 45D

|  | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | ∞ | 0 | | |
| 1 (OPTICAL PICKUP LENS SURFACE R1) | 1.137101 | 1.66 | 1.540000 | 64.3 |
| 2 (OPTICAL PICKUP LENS SURFACE R2) | -2.874943 | 0.8075337 | | |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 | | |

Fig. 47A

| f (mm) | 1.765 | NA | 0.86 |
|---|---|---|---|
| WORKING DISTANCE WD (mm) | 0.8075337 | EFFECTIVE DIAMETER (mm) | 3.05 |

Fig. 47B

| ASPHERIC COEFFICIENT OF OPTICAL PICKUP LENS SURFACE R1 | | | |
|---|---|---|---|
| k1 | -1.030853 | $A_1 4$ | 0.058976116 |
| $A_1 6$ | -0.006693647 | $A_1 8$ | 0.016145772 |
| $A_1 10$ | -0.008609903 | $A_1 12$ | 0.001965323 |
| $A_1 14$ | 0.0008359665 | $A_1 16$ | -0.00028122847 |

Fig. 47C

| ASPHERIC COEFFICIENT OF OPTICAL PICKUP LENS SURFACE R2 | | | |
|---|---|---|---|
| k2 | -90.20658 | $A_2 4$ | 0.033031609 |
| $A_2 6$ | -0.035085883 | $A_2 8$ | 0.067129169 |
| $A_2 10$ | -0.07099281 | $A_2 12$ | 0.038498861 |
| $A_2 14$ | -0.010512051 | $A_2 16$ | 0.0011534855 |

Fig. 47D

|  | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | ∞ | 0 |  |  |
| 1 (OPTICAL PICKUP LENS SURFACE R1) | 0.9229223 | 1.269 | 1.550000 | 62.1 |
| 2 (OPTICAL PICKUP LENS SURFACE R2) | -2.486232 | 0.6680973 |  |  |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 |  |  |

Fig. 49A

| f (mm) | 1.41 | NA | 0.86 |
|---|---|---|---|
| WORKING DISTANCE WD (mm) | 0.6680973 | EFFECTIVE DIAMETER (mm) | 2.43 |

Fig. 49B

| ASPHERIC COEFFICIENT OF OPTICAL PICKUP LENS SURFACE R1 | | | |
|---|---|---|---|
| $k1$ | -1.07224 | $A_1 4$ | 0.13325697 |
| $A_1 6$ | -0.051674643 | $A_1 8$ | 0.12916155 |
| $A_1 10$ | -0.11528444 | $A_1 12$ | 0.019872451 |
| $A_1 14$ | 0.048398506 | $A_1 16$ | -0.021182589 |

Fig. 49C

| ASPHERIC COEFFICIENT OF OPTICAL PICKUP LENS SURFACE R2 | | | |
|---|---|---|---|
| $k2$ | -116.3511 | $A_2 4$ | 0.10743055 |
| $A_2 6$ | -0.42254793 | $A_2 8$ | 1.1101925 |
| $A_2 10$ | -1.52129 | $A_2 12$ | 1.1302302 |
| $A_2 14$ | -0.43758356 | $A_2 16$ | 0.069488033 |

Fig. 49D

|  | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | $\infty$ | 0 | | |
| 1 (OPTICAL PICKUP LENS SURFACE R1) | 0.9039366 | 1.33 | 1.530000 | 65.3 |
| 2 (OPTICAL PICKUP LENS SURFACE R2) | -2.114554 | 0.6373816 | | |
| 3 (LIGHT TRANSMITTING LAYER IN OPTICAL DISC) | $\infty$ | 0.0875 | 1.621308 | 29.8 |
| 4 (LIGHT TRANSMITTING LAYER IN OPTICAL DISC) | $\infty$ | 0 | | |

Fig. 51A

| f (mm) | 1.41 | NA | 0.86 |
|---|---|---|---|
| WORKING DISTANCE WD (mm) | 0.6373816 | EFFECTIVE DIAMETER (mm) | 2.43 |

Fig. 51B

| ASPHERIC COEFFICIENT OF OPTICAL PICKUP LENS SURFACE R1 | | | |
|---|---|---|---|
| $k_1$ | -1.048595 | $A_14$ | 0.12559292 |
| $A_16$ | -0.040625774 | $A_18$ | 0.12904932 |
| $A_110$ | -0.14162433 | $A_112$ | 0.075984163 |
| $A_114$ | 0.0021755834 | $A_116$ | -0.0078152356 |

Fig. 51C

| ASPHERIC COEFFICIENT OF OPTICAL PICKUP LENS SURFACE R2 | | | |
|---|---|---|---|
| $k_2$ | -79.03513 | $A_24$ | 0.067141601 |
| $A_26$ | -0.20497667 | $A_28$ | 0.62317868 |
| $A_210$ | -0.95004782 | $A_212$ | 0.75943913 |
| $A_214$ | -0.31082207 | $A_216$ | 0.051645069 |

Fig. 51D

|  | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | $\infty$ | 0 |  |  |
| 1 (OPTICAL PICKUP LENS SURFACE R1) | 0.9001396 | 1.354 | 1.520000 | 71.2 |
| 2 (OPTICAL PICKUP LENS SURFACE R2) | -1.918996 | 0.6304473 |  |  |
| 3 (LIGHT TRANSMITTING LAYER IN OPTICAL DISC) | $\infty$ | 0.0875 | 1.621308 | 29.8 |
| 4 (LIGHT TRANSMITTING LAYER IN OPTICAL DISC) | $\infty$ | 0 |  |  |

Fig. 53A

| f (mm) | 1.41 | NA | 0.86 |
|---|---|---|---|
| WORKING DISTANCE WD (mm) | 0.6304473 | EFFECTIVE DIAMETER (mm) | 2.43 |

Fig. 53B

| ASPHERIC COEFFICIENT OF OPTICAL PICKUP LENS SURFACE R1 | | | |
|---|---|---|---|
| k1 | -1.021251 | $A_14$ | 0.12623005 |
| $A_16$ | -0.051814781 | $A_18$ | 0.15226555 |
| $A_110$ | -0.16958584 | $A_112$ | 0.093908025 |
| $A_114$ | -0.0044131766 | $A_116$ | -0.0064095882 |

Fig. 53C

| ASPHERIC COEFFICIENT OF OPTICAL PICKUP LENS SURFACE R2 | | | |
|---|---|---|---|
| k2 | -69.55357 | $A_24$ | 0.062078148 |
| $A_26$ | -0.20370474 | $A_28$ | 0.62936503 |
| $A_210$ | -0.95326807 | $A_212$ | 0.75554936 |
| $A_214$ | -0.3067312 | $A_216$ | 0.050587061 |

Fig. 53D

|  | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | ∞ | 0 | | |
| 1 (OPTICAL PICKUP LENS SURFACE R1) | 0.8051119 | 1.062 | 1.640000 | 55.1 |
| 2 (OPTICAL PICKUP LENS SURFACE R2) | -5.911139 | 0.5186146 | | |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 | | |

Fig. 55A

| f (mm) | 1.18 | NA | 0.87 |
|---|---|---|---|
| WORKING DISTANCE WD (mm) | 0.5186146 | EFFECTIVE DIAMETER (mm) | 2.042 |

Fig. 55B

| ASPHERIC COEFFICIENT OF OPTICAL PICKUP LENS SURFACE R1 | | | |
|---|---|---|---|
| $k1$ | -1.016846 | $A_14$ | 0.14336762 |
| $A_16$ | -0.012564889 | $A_18$ | 0.29470033 |
| $A_110$ | -0.6704631 | $A_112$ | 1.0542626 |
| $A_114$ | -0.78436093 | $A_116$ | 0.22618785 |

Fig. 55C

| ASPHERIC COEFFICIENT OF OPTICAL PICKUP LENS SURFACE R2 | | | |
|---|---|---|---|
| $k2$ | -770.415 | $A_24$ | 0.046754134 |
| $A_26$ | 0.66689577 | $A_28$ | -2.2098704 |
| $A_210$ | 3.1209736 | $A_212$ | -2.1200379 |
| $A_214$ | 0.52924405 | $A_216$ | 0.033330668 |

Fig. 55D

|  | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | ∞ | 0 | | |
| 1 (OPTICAL PICKUP LENS SURFACE R1) | 0.9094412 | 1.31 | 1.540000 | 64.3 |
| 2 (OPTICAL PICKUP LENS SURFACE R2) | -2.314889 | 0.6438528 | | |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 | | |

Fig. 57A

| f (mm) | 1.41 | NA | 0.86 |
|---|---|---|---|
| WORKING DISTANCE WD (mm) | 0.6438528 | EFFECTIVE DIAMETER (mm) | 2.43 |

Fig. 57B

| ASPHERIC COEFFICIENT OF OPTICAL PICKUP LENS SURFACE R1 | | | |
|---|---|---|---|
| k1 | -1.037216 | $A_1 4$ | 0.12088226 |
| $A_1 6$ | -0.035389603 | $A_1 8$ | 0.11517092 |
| $A_1 10$ | -0.12436494 | $A_1 12$ | 0.066347618 |
| $A_1 14$ | 0.0038566815 | $A_1 16$ | -0.0076722834 |

Fig. 57C

| ASPHERIC COEFFICIENT OF OPTICAL PICKUP LENS SURFACE R2 | | | |
|---|---|---|---|
| k2 | -93.81054 | $A_2 4$ | 0.067898776 |
| $A_2 6$ | -0.20487399 | $A_2 8$ | 0.62345775 |
| $A_2 10$ | -0.95229733 | $A_2 12$ | 0.76263482 |
| $A_2 14$ | -0.31271551 | $A_2 16$ | 0.052060794 |

Fig. 57D

|  | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | ∞ | 0 | | |
| 1 (OPTICAL PICKUP LENS SURFACE R1) | 0.7703533 | 1.1 | 1.530000 | 65.3 |
| 2 (OPTICAL PICKUP LENS SURFACE R2) | -1.679665 | 0.5423588 | | |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 | | |

Fig. 59A

| f (mm) | 1.18 | NA | 0.86 |
|---|---|---|---|
| WORKING DISTANCE WD (mm) | 0.5423588 | EFFECTIVE DIAMETER (mm) | 2.04 |

Fig. 59B

| ASPHERIC COEFFICIENT OF OPTICAL PICKUP LENS SURFACE R1 | | | |
|---|---|---|---|
| $k1$ | -0.9608537 | $A_14$ | 0.23631377 |
| $A_16$ | -0.31532825 | $A_18$ | 1.0333374 |
| $A_110$ | -1.7599185 | $A_112$ | 1.6369588 |
| $A_114$ | -0.53423029 | $A_116$ | -0.020576434 |

Fig. 59C

| ASPHERIC COEFFICIENT OF OPTICAL PICKUP LENS SURFACE R2 | | | |
|---|---|---|---|
| $k2$ | -103.2593 | $A_24$ | 0.032963093 |
| $A_26$ | -0.33676253 | $A_28$ | 2.2305246 |
| $A_210$ | -5.3947166 | $A_212$ | 6.4049572 |
| $A_214$ | -3.8137658 | $A_216$ | 0.91427145 |

Fig. 59D

|  | CURVATURE RADIUS R (mm) | INTER-PLANE DISTANCE d (mm) | REFRACTIVE INDEX n | ABBE NUMBER νd |
|---|---|---|---|---|
| 0 (APERTURE STOP SURFACE) | ∞ | 0 | | |
| 1 (OPTICAL PICKUP LENS SURFACE R1) | 1.231135 | 1.589 | 1.640000 | 55.0 |
| 2 (OPTICAL PICKUP LENS SURFACE R2) | -6.797954 | 0.8220361 | | |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 | | |

Fig. 61A

| f (mm) | 1.765 | NA | 0.87 |
|---|---|---|---|
| WORKING DISTANCE WD (mm) | 0.8220361 | EFFECTIVE DIAMETER (mm) | 3.054 |

Fig. 61B

| ASPHERIC COEFFICIENT OF OPTICAL PICKUP LENS SURFACE R1 | | | |
|---|---|---|---|
| $k_1$ | -1.021035 | $A_1 4$ | 0.062574235 |
| $A_1 6$ | -0.045241681 | $A_1 8$ | 0.079327627 |
| $A_1 10$ | -0.073809846 | $A_1 12$ | 0.042064319 |
| $A_1 14$ | -0.012595027 | $A_1 16$ | 0.0015526444 |

Fig. 61C

| ASPHERIC COEFFICIENT OF OPTICAL PICKUP LENS SURFACE R2 | | | |
|---|---|---|---|
| $k_2$ | -1477.323 | $A_2 4$ | 0.0346752 |
| $A_2 6$ | -0.019615736 | $A_2 8$ | 0.065615895 |
| $A_2 10$ | -0.10571148 | $A_2 12$ | 0.077404108 |
| $A_2 14$ | -0.027088902 | $A_2 16$ | 0.0037085859 |

Fig. 61D

|  | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | ∞ | 0 |  |  |
| 1 (OPTICAL PICKUP LENS SURFACE R1) | 0.7844236 | 1.062 | 1.540000 | 64.3 |
| 2 (OPTICAL PICKUP LENS SURFACE R2) | -1.783328 | 0.5658496 |  |  |
| 3 (LIGHT TRANSMITTING LAYER IN OPTICAL DISC) | ∞ | 0.0875 | 1.621308 | 2.98 |
| 4 (LIGHT TRANSMITTING LAYER IN OPTICAL DISC) | ∞ | 0 |  |  |

Fig. 63A

| f (mm) | 1.18 | NA | 0.86 |
|---|---|---|---|
| WORKING DISTANCE WD (mm) | 0.5658496 | EFFECTIVE DIAMETER (mm) | 2.03 |

Fig. 63B

| ASPHERIC COEFFICIENT OF OPTICAL PICKUP LENS SURFACE R1 ||||
|---|---|---|---|
| k1 | -1.067617 | $A_1 4$ | 0.29498064 |
| $A_1 6$ | -0.48058365 | $A_1 8$ | 1.5634422 |
| $A_1 10$ | -2.8433291 | $A_1 12$ | 2.8755736 |
| $A_1 14$ | -1.2503572 | $A_1 16$ | 0.13817705 |

Fig. 63C

| ASPHERIC COEFFICIENT OF OPTICAL PICKUP LENS SURFACE R2 ||||
|---|---|---|---|
| k2 | -130.6428 | $A_2 4$ | 0.093196351 |
| $A_2 6$ | -0.79843961 | $A_2 8$ | 3.65791 |
| $A_2 10$ | -7.7151766 | $A_2 12$ | 8.4989355 |
| $A_2 14$ | -4.8070571 | $A_2 16$ | 1.1070974 |

Fig. 63D

|  | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | ∞ | 0 | | |
| 1 (OPTICAL PICKUP LENS SURFACE R1) | 1.144334 | 1.5885 | 1.570000 | 63.5 |
| 2 (OPTICAL PICKUP LENS SURFACE R2) | -4.129549 | 0.8215144 | | |
| 3 (LIGHT TRANSMITTING LAYER IN OPTICAL DISC) | ∞ | 0.0875 | 1.621308 | 29.8 |
| 4 (LIGHT TRANSMITTING LAYER IN OPTICAL DISC) | ∞ | 0 | | |

Fig. 65A

| f (mm) | 1.765 | NA | 0.87 |
|---|---|---|---|
| WORKING DISTANCE WD (mm) | 0.8215144 | EFFECTIVE DIAMETER (mm) | 3.07 |

Fig. 65B

| ASPHERIC COEFFICIENT OF OPTICAL PICKUP LENS SURFACE R1 ||||
|---|---|---|---|
| k1 | -0.9235149 | $A_1 4$ | 0.046192323 |
| $A_1 6$ | -0.0093976409 | $A_1 8$ | 0.02383725 |
| $A_1 10$ | -0.021179362 | $A_1 12$ | 0.013479068 |
| $A_1 14$ | -0.0040714599 | $A_1 16$ | 0.00048835963 |

Fig. 65C

| ASPHERIC COEFFICIENT OF OPTICAL PICKUP LENS SURFACE R2 ||||
|---|---|---|---|
| k2 | -204.3627 | $A_2 4$ | -0.018214151 |
| $A_2 6$ | 0.11041367 | $A_2 8$ | -0.12846609 |
| $A_2 10$ | 0.076998924 | $A_2 12$ | -0.026153861 |
| $A_2 14$ | 0.0047664661 | $A_2 16$ | -0.00036133903 |

Fig. 65D

| | CURVATURE RADIUS R (mm) | INTER-PLANE DISTANCE d (mm) | REFRACTIVE INDEX n | ABBE NUMBER $\nu d$ |
|---|---|---|---|---|
| 0 (APERTURE STOP SURFACE) | $\infty$ | 0 | | |
| 1 (OPTICAL PICKUP LENS SURFACE R1) | 1.145264 | 1.63 | 1.560000 | 63.3 |
| 2 (OPTICAL PICKUP LENS SURFACE R2) | -3.529421 | 0.8092724 | | |
| 3 (LIGHT TRANSMITTING LAYER IN OPTICAL DISC) | $\infty$ | 0.0875 | 1.621308 | 29.8 |
| 4 (LIGHT TRANSMITTING LAYER IN OPTICAL DISC) | $\infty$ | 0 | | |

Fig. 67A

| f (mm) | 1.765 | NA | 0.86 |
|---|---|---|---|
| WORKING DISTANCE WD (mm) | 0.8092724 | EFFECTIVE DIAMETER (mm) | 3.05 |

Fig. 67B

| ASPHERIC COEFFICIENT OF OPTICAL PICKUP LENS SURFACE R1 | | | |
|---|---|---|---|
| $k1$ | -0.9484284 | $A_14$ | 0.046363008 |
| $A_16$ | -0.0010598525 | $A_18$ | 0.013732556 |
| $A_110$ | -0.010278977 | $A_112$ | 0.0043817762 |
| $A_114$ | -0.00028907686 | $A_116$ | -8.428967e-005 |

Fig. 67C

| ASPHERIC COEFFICIENT OF OPTICAL PICKUP LENS SURFACE R2 | | | |
|---|---|---|---|
| $k2$ | -102.2111 | $A_24$ | 0.060907754 |
| $A_26$ | -0.095320706 | $A_28$ | 0.14058537 |
| $A_210$ | -0.12435916 | $A_212$ | 0.061577603 |
| $A_214$ | -0.016000199 | $A_216$ | 0.0017059725 |

Fig. 67D

OPTICAL PICKUP LENS

This is a Continuation of application Ser. No. 12/656,059 filed Jan. 14, 2010, which in turn is a Continuation of application Ser. No. 11/979,720 filed Nov. 7, 2007. The application claims benefit of Japanese Patent Application No. 2006-303396, filed Nov. 8, 2006. The disclosure of the prior application is hereby incorporated by reference herein in its entirety.

BACKGROUND

1. Field of the Invention

The present invention relates to an optical pickup lens used in an optical system for performing recording or playback of an optical disc.

2. Description of Related Art

The recording capacity of an optical disc is ever increasing, and the recording density per unit area is also increasing. When reading information on an optical disc, light from a light source of an optical disc apparatus, after passing through an optical path including transparent components such as a wave plate and a collimator lens, is focused by an optical pickup lens to form an optical spot on an optical disc, thereby reading the information on the optical disc. Normally, light that is emitted from a laser light source enters an optical pickup lens after it is converted into parallel light by a collimator lens or the like. For an optical pickup lens which is used for reading a high-capacity optical disc, laser light with a wavelength of 410 nm or shorter is used, and a numerical aperture NA is generally set to 0.84 or larger.

An example of an optical pickup lens of a related art is disclosed in Japanese Unexamined Patent Application Publication No. 2002-156579. The objective lens for an optical disc which is disclosed therein is a double-sided aspherical single lens with a numerical aperture NA of 0.7 or larger, in which the center thickness of the lens is longer than a focal length. Another example is disclosed in Japanese Unexamined Patent Application Publication No. 2001-324673. The objective lens which is disclosed therein has an aspherical surface on one side and satisfies $1.1 \leq d1/f \leq 3$ where d1 is an on-axis lens thickness and f is a focal length. Yet another example is disclosed in Japanese Unexamined Patent Application Publication No. 2002-303787. The objective lens which is disclosed therein is a double-sided aspherical single objective lens with a numerical aperture NA of 0.75 or larger which satisfies $1.75 < n$ and $35 < v$ where n is a refractive index for at least one use wavelength and v is Abbe number on a line d.

It is necessary to maintain good off-axis characteristics in order to mount an optical pickup lens to a pickup. However, if a numerical aperture NA exceeds 0.80, it is difficult to maintain good characteristics for both on-axis aberration such as spherical aberration and off-axis aberration such as astigmatic aberration and comatic aberration of a pickup lens. Particularly, a biconvex lens in which a surface on the side close to a laser light source (surface R1) and a surface on the opposite side (surface R2) are both convex is difficult to have good angle of view characteristics.

Further, if a numerical aperture NA exceeds 0.80, a working distance (WD) which indicates a distance between an optical pickup lens and an optical disc becomes smaller. The decrease in the working distance is particularly significant in a meniscus lens in which the surface R2 is not convex, thus increasing the risk of collision between an optical disc and an optical pickup lens.

SUMMARY

The present invention has been accomplished to solve the above problems and an object of the present invention is thus to provide an optical pickup lens with a high NA which maintains a longer working distance and has good on-axis characteristic and off-axis characteristics.

According to one aspect of the present invention, there is provided an optical pickup lens for focusing a light beam from a laser light source on an optical information recording medium. The optical pickup lens is a single lens, and a second surface of the optical pickup lens opposite to a first surface closer to the laser light source has a continuous shape. Further, a shape of the second surface of the optical pickup lens having radii h1, h2 and h3 (h1<h2<h3) from an optical axis to a lens periphery, where sags in the radii h1, h2 and h3 are sag1, sag2 and sag3, and differentials in the sags are Δsag1, Δsag2 and Δsag3, respectively, satisfies 0>Δsag1>Δsag2 and Δsag2<Δsag3.

Because the shape of the second surface satisfies 0>Δsag1>Δsag2 and Δsag2<Δsag3, it is possible to maintain a sufficient working distance (a distance between an optical pickup lens and an optical disc) and obtain good on-axis aberration characteristics.

The shape of the second surface of the above optical pickup lens preferably has radii h1, h2, h3 and h4 which satisfy sag2>sag3 and sag3<sag4 where a sag in the radius h4 (h3<h4) is a sag4. Alternatively, the shape of the second surface of the above optical pickup lens preferably has radii h1, h2, h3 and h4 which satisfy Δsag3<0 and Δsag4>0 where a sag in a lens radius h4 (h3<h4) is a sag 4 and a differential in the sag is Δsag4. Also in the above optical pickup lens, the shape of the second surface preferably has a minimum. It is also preferred in the above optical pickup lens that the second surface is convex in a center and concave in a periphery. By satisfying such conditions, it is possible to maintain a longer working distance and obtain better on-axis characteristics and off-axis characteristics.

It is further preferred in the above optical pickup lens that 0.84≤NA and 0.9≤d/f are satisfied when the optical pickup lens is used in a recording and/or playback pickup apparatus using a laser with a wavelength of 410 nm or shorter and where a numerical aperture is NA, a single lens center thickness is d, and a focal length is f.

It is more preferred in the above optical pickup lens that 0.84≤NA and 0.9≤d/f≤1.2 are satisfied when the optical pickup lens is used in a recording and/or playback pickup apparatus using a laser with a wavelength of 410 nm or shorter and where a numerical aperture is NA, a single lens center thickness is d, and a focal length is f. By satisfying such conditions, it is possible to maintain a suitable edge thickness and facilitate the manufacture of the shape of the second surface which satisfies 0>Δsag1>Δsag2 and Δsag2<Δsag3.

Further, in the above optical pickup lens, a refractive index n for a wavelength of 405 nm is preferably 1.51≤n≤1.64.

More preferably, a refractive-index n for a wavelength of 405 nm is 1.59≤n≤1.62. By satisfying such conditions, it is possible to maintain a suitable edge thickness and facilitate the design of the second surface which satisfies 0>Δsag1>Δsag2 and Δsag2<Δsag3.

Furthermore, in the above optical pickup lens, an effective diameter D of the single lens is preferably 1.8≤D≤3.2 mm. By applying the present invention to the lens having such an effective diameter, it is possible to maintain a long working distance and improve on-axis characteristics and off-axis characteristics.

In addition, aberration is preferably 15 mλrms when an angle of view as off-axis characteristics is 0.3 degrees.

It is also preferred in the above optical pickup lens that a tangent angle α of the first surface is 60°≦α. If the tangent angle α becomes larger, the sag in the first surface increases, and the sag in the second surface decreases accordingly. This facilitates the manufacture of the shape of the second surface which satisfies 0>Δsag1>Δsag2 and Δsag2<Δsag3.

It is further preferred that an Abbe number vd of a lens material is 50≦vd. This enables accurate writing of a pit sequence on an optical disc. As the Abbe number is larger, the lens is more resistant to the displacement of a wavelength during writing.

Further, parallel light or sub-finite light may enter the optical pickup lens through the first surface. The single lens may be made of plastic or glass.

The present invention provides an optical pickup lens with a high NA which maintains a longer working distance and has good on-axis characteristic and good off-axis characteristics.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 4 is a view showing wavefront aberration in examples of the present invention;

FIGS. 5A to 5D are views showing characteristic values of an optical pickup lens according to an example 1 of the present invention;

FIGS. 7A to 7D are views showing characteristic values of an optical pickup lens according to an example 2 of the present invention;

FIGS. 9A to 9D are views showing characteristic values of an optical pickup lens according to an example 3 of the present invention;

FIGS. 11A to 11D are views showing characteristic values of an optical pickup lens according to an example 4 of the present invention;

FIGS. 13A to 13D are views showing characteristic values of an optical pickup lens according to an example 5 of the present invention;

FIGS. 15A to 15D are views showing characteristic values of an optical pickup lens according to an example 6 of the present invention;

FIGS. 17A to 17D are views showing characteristic values of an optical pickup lens according to an example 7 of the present invention;

FIGS. 19A to 19D are views showing characteristic values of an optical pickup lens according to an example 8 of the present invention;

FIGS. 21A to 21D are views showing characteristic values of an optical pickup lens according to an example 9 of the present invention;

FIGS. 23A to 23D are views showing characteristic values of an optical pickup lens according to an example 10 of the present invention;

FIGS. 25A to 25D are views showing characteristic values of an optical pickup lens according to an example 11 of the present invention;

FIGS. 27A to 27D are views showing characteristic values of an optical pickup lens according to an example 12 of the present invention;

FIGS. 29A to 29D are views showing characteristic values of an optical pickup lens according to an example 13 of the present invention;

FIGS. 31A to 31D are views showing characteristic values of an optical pickup lens according to an example 14 of the present invention;

FIGS. 33A to 33D are views showing characteristic values of an optical pickup lens according to an example 15 of the present invention;

FIGS. 35A to 35D are views showing characteristic values of an optical pickup lens according to an example 16 of the present invention;

FIGS. 37A to 37D are views showing characteristic values of an optical pickup lens according to an example 17 of the present invention;

FIGS. 39A to 39D are views showing characteristic values of an optical pickup lens according to an example 18 of the present invention;

FIGS. 41A to 41D are views showing characteristic values of an optical pickup lens according to an example 19 of the present invention;

FIGS. 43A to 43D are views showing characteristic values of an optical pickup lens according to an example 20 of the present invention;

FIGS. 45A to 45D are views showing characteristic values of an optical pickup lens according to an example 21 of the present invention;

FIGS. 47A to 47D are views showing characteristic values of an optical pickup lens according to an example 22 of the present invention;

FIGS. 49A to 49D are views showing characteristic values of an optical pickup lens according to an example 23 of the present invention;

FIGS. 51A to 51D are views showing characteristic values of an optical pickup lens according to an example 24 of the present invention;

FIGS. 53A to 53D are views showing characteristic values of an optical pickup lens according to an example 25 of the present invention;

FIGS. 55A to 55D are views showing characteristic values of an optical pickup lens according to an example 26 of the present invention;

FIGS. 57A to 57D are views showing characteristic values of an optical pickup lens according to an example 27 of the present invention;

FIGS. 59A to 59D are views showing characteristic values of an optical pickup lens according to an example 28 of the present invention;

FIGS. 61A to 61D are views showing characteristic values of an optical pickup lens according to an example 29 of the present invention;

FIG. 62A is a view showing longitudinal aberration;

FIG. 62B is a view showing a sag in the radial direction;

FIG. 62C is a view showing an optical pickup lens according to the example 29;

FIGS. 63A to 63D are views showing characteristic values of an optical pickup lens according to an example 30 of the present invention;

FIG. 64A is a view showing longitudinal aberration;

FIG. 64B is a view showing a sag in the radial direction;

FIG. 64C is a view showing an optical pickup lens according to the example 30;

FIGS. 65A to 65D are views showing characteristic values of an optical pickup lens according to an example 31 of the present invention;

FIG. 66A is a view showing longitudinal aberration;

FIG. 66B is a view showing a sag in the radial direction;

FIG. 66C is a view showing an optical pickup lens according to the example 31;

FIGS. 67A to 67D are views showing characteristic values of an optical pickup lens according to an example 32 of the present invention;

Figure 68A:
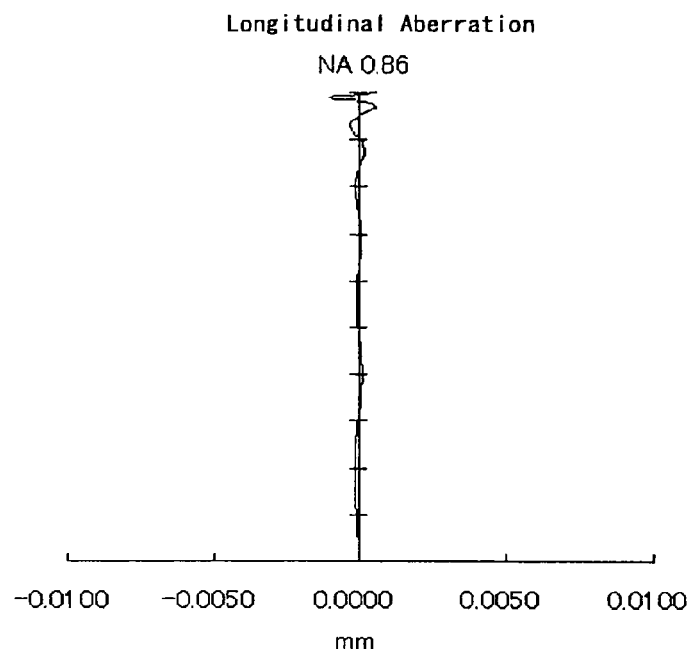
Figure 68B:
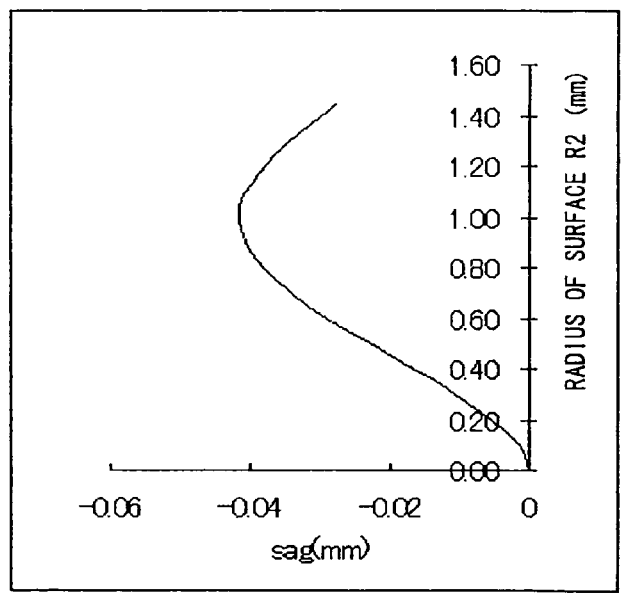

FIG. 68A is a view showing longitudinal aberration;

FIG. 68B is a view showing a sag in the radial direction; and

Figure 68C:
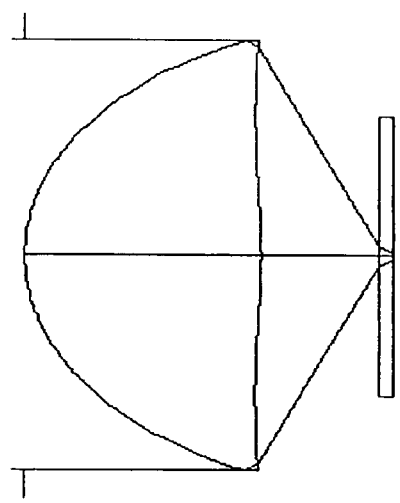

FIG. 68C is a view showing an optical pickup lens according to the example 32.

DETAILED DESCRIPTION OF EMBODIMENTS

An embodiment of the present invention is described hereinafter in detail with reference to the drawings. In the following embodiment, the present invention is applied to an optical pickup lens used for recording or playing back information on an optical information recording medium.

Figure 1A:
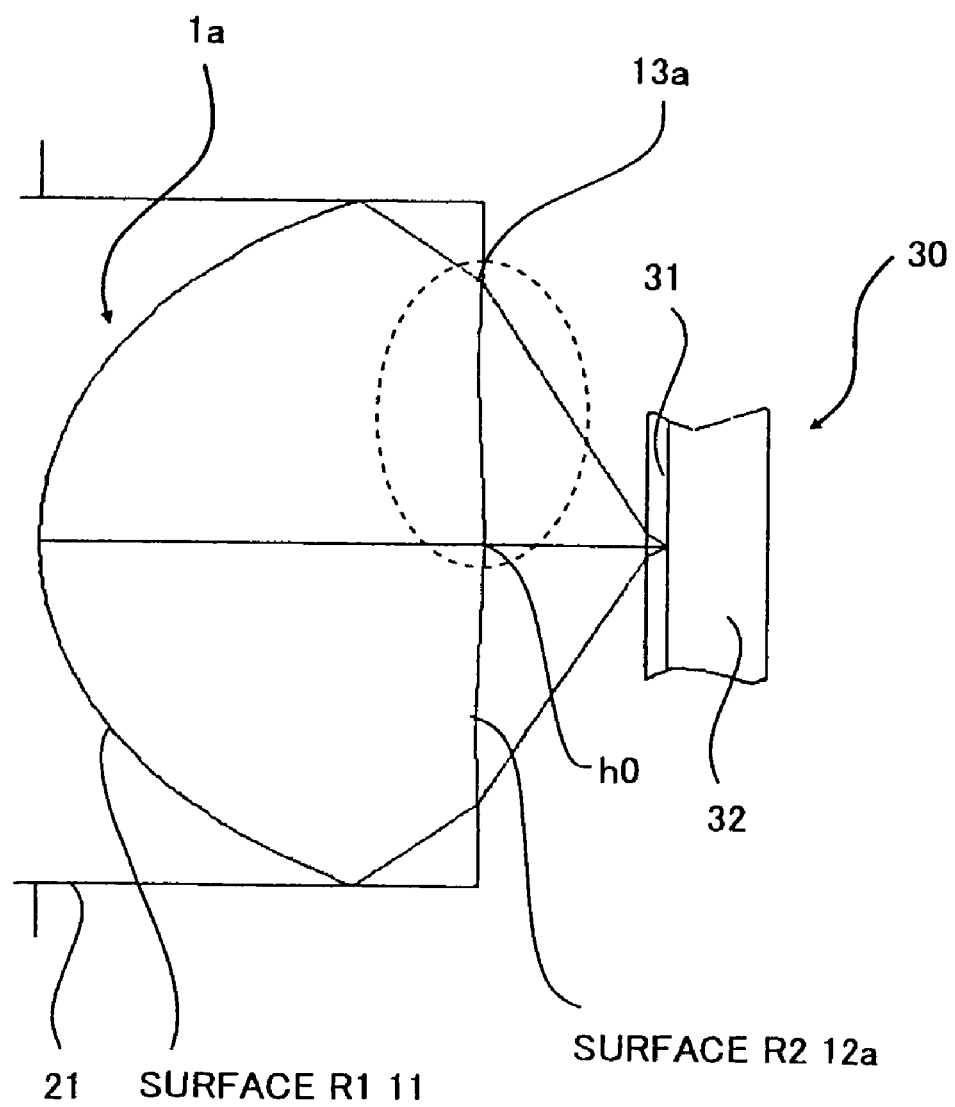
FIG. 1A is a view showing an optical pickup lens according to an embodiment of the present invention.
Figure 1B:
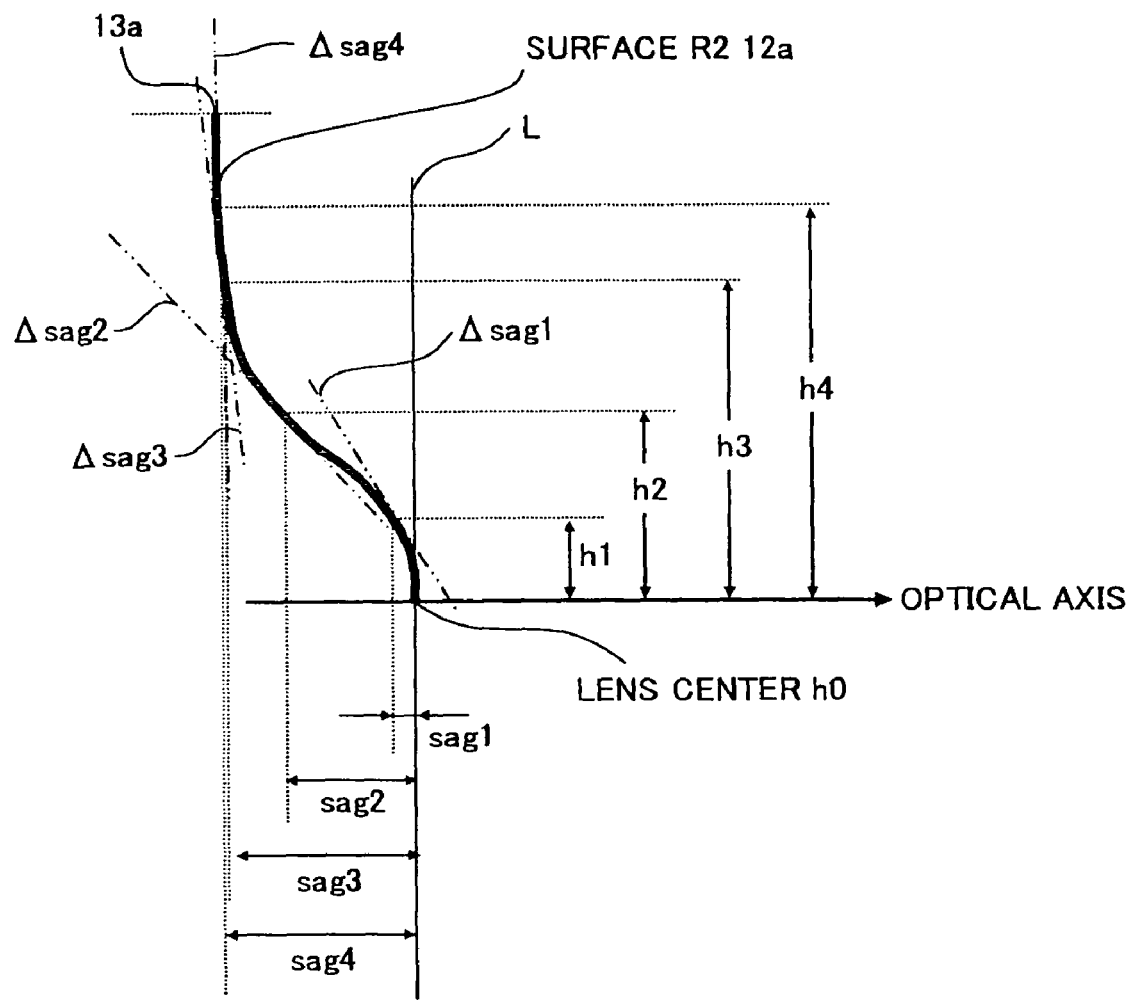
FIG. 1B is a schematic view showing a part within a dotted line in FIG. 1A in an enlarged scale.

FIG. 1A is a view showing an optical pickup lens according to the embodiment of the present invention. FIG. 1B is a view to describe the sag of the optical pickup lens, which schematically shows a part within a dotted line in FIG. 1A in an enlarged scale. As shown in FIG. 1A, an optical pickup lens 1a, which is a single lens, of this embodiment has a first surface (which is referred to hereinafter as a surface R1) 11 that is closer to a laser light source and a second surface (hereinafter as a surface R2) 12a that is opposite to the first surface 11 and that faces an optical disc 30 which includes an optical disc substrate 32 and a light transmitting layer 31 in an optical disc. The surface R2 12a has the following shape.

If the lens surface has radius h1<radius h2<radius h3 from the center to the periphery of the lens, and differentials in sag in the radius h1, the radius h2 and the radius h3 are Δsag1, Δsag2 and Δsag3, respectively, the shape of the surface R2 12a satisfies the following expressions (1) and (2):

$$0 > \Delta sag1 > \Delta sag2 \quad (1)$$

$$\Delta sag2 < \Delta sag3 \quad (2)$$

Firstly, a sag and a differential in sag (Δsag) are described hereinafter. FIG. 1B schematically shows the surface R2 12a from a center h0 to a periphery 13a. As shown in FIG. 1B, when the optical pickup lens 1a is disposed in such a way that the optical axis and the lens center h0 of the surface R2 are in the corresponding position, the sag is a distance from the normal L to the optical axis on the lens center h0 to the surface R2 in a given radius h. The direction from the surface R1 11 to the surface R2 12a is referred to as a positive. A differential in sag (Δsag) is the slope of the sag in a given radius h on the surface R2 12a, which is, the slope of the tangent to the surface R2 from the line L in a radius h. An increase in sag from the inside to the outside is referred to as a positive, and a decrease is referred to as a negative.

In FIGS. 1A and 1B, when the sags of the radii h1, h2 and h3 are sag1, sag2 and sag3, respectively, the following relationships are satisfied:

h1<h2<h3, and sag1>sag2>sag3

Figure 2A:
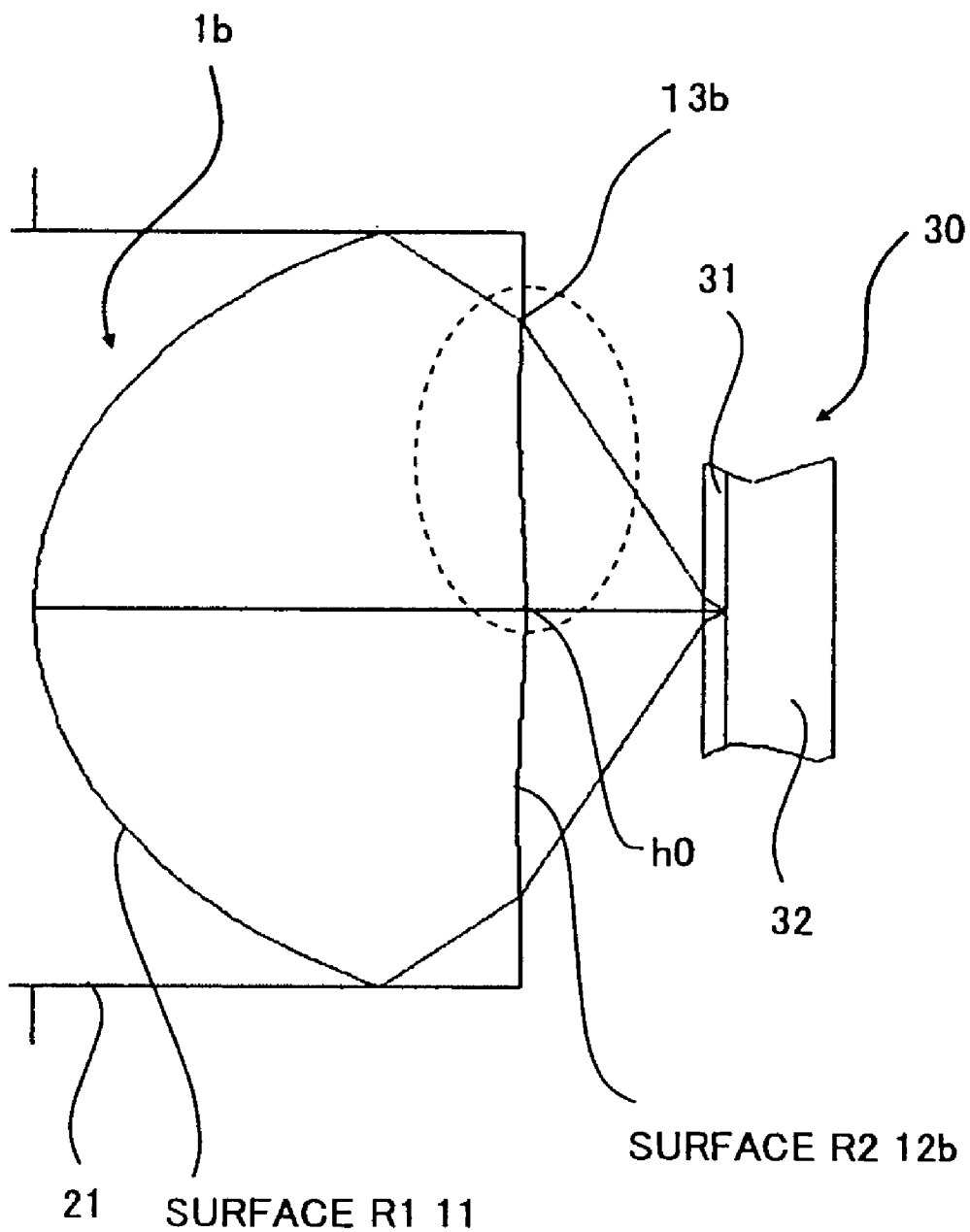
FIG. 2A is a view showing another optical pickup lens according to an embodiment of the present invention.
Figure 2B:
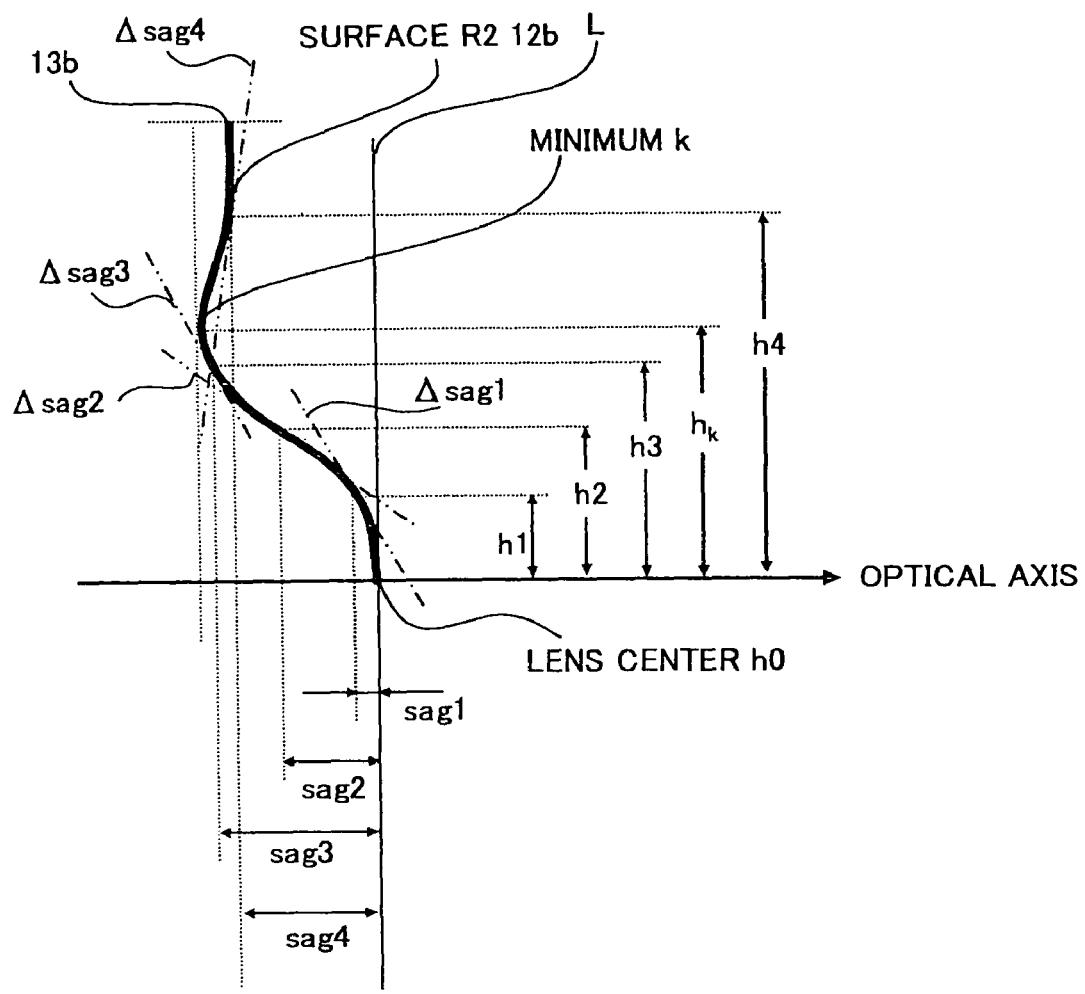
FIG. 2B is a schematic view showing a part within a dotted line in FIG. 2A in an enlarged scale.

FIG. 2A shows another optical pickup lens according to the embodiment of the present invention. FIG. 2B schematically shows a part within a dotted line in FIG. 2A in an enlarged scale. The optical pickup lens may have the shape shown in FIGS. 2A and 2B rather than the shape shown in FIGS. 1A and 1B described above. Specifically, as shown in FIGS. 2A and 2B, a surface R2 12b has the shape which satisfies the above-described expressions (1) and (2) and further has a minimum k (radius hk).

Having the minimum means that, when the lens has radii h1<h2<h3<h4 with sag1, sag2, sag3 and sag4, respectively, the following relationships are satisfied:

$$sag1 > sag2 > sag3 \quad (3)$$

$$sag3 < sag4 \quad (4)$$

Specifically, the surface R2 12b has the radii h1 to h4 which satisfy the expressions (3) and (4).

Further, if the lens radii h1, h2, h3 and h4 satisfy h1<h2<h3<h4, and differentials in sag in the radii h1, h2, h3 and h4 are Δsag1, Δsag2, Δsag3 and Δsag4, respectively, the shape of the surface R2 12b satisfies the following expression (5) as well as the expressions (1) and (2):

$$0 > \Delta sag1 > \Delta sag2 \quad (1)$$

$$\Delta sag2 < \Delta sag3 < 0 \quad (2)$$

$$\Delta sag4 > 0 \quad (5)$$

In FIGS. 1A and 1B, the lens surface is convex-shaped in its center part, so that the slope (Δsag) is first gradual, then abrupt, and gradual again from the lens center h0 to the outside. In FIGS. 2A and 2B, the lens surface further has a concave-shaped portion in its periphery, so that concave and convex shapes are alternately arranged in the radial direction. Specifically, the surface R2 12b of the optical pickup lens 1b shown in FIGS. 2A and 2B has the shape that the center part is convex and the peripheral part is concave.

The surface R2 of the optical pickup lenses shown in FIGS. 1A to 2B has a continuous shape, and there is no ring-zone structure with steps such as a diffraction lens. However, two or three steps may be formed without departing from the technical gist of the present invention. The surface R1 may have a continuous shape or a ring-zone structure with steps.

The surface R2 of the optical pickup lens is good enough if it has the shape with a continuous slope, which includes the shape that the surface R2 is continuous and the shape that the continuous shape of the surface R2 is shifted in parallel to the optical axis direction in a part of the lens surface.

With the surfaces R2 12a and 12b having such a shape, the following advantages are obtained. A general pickup lens is a biconvex lens which has convex surfaces on both sides or a meniscus lens which is composed of a convex lens and a concave lens. Each lens has different features. Specifically, a working distance (WD), which is a distance from the center of the surface R2 to the optical disc 30, is shorter in the meniscus lens than in the biconvex lens because the surface R2 of the meniscus lens is concave. The angle of view characteristics, which are the off-axis characteristics, are better in the meniscus lens than in the biconvex lens because the both surfaces of the meniscus lens are curved in the same direction.

On the other hand, since the optical pickup lenses 1a and 1b of this embodiment have a concave portion in the periphery and a convex portion in the center, they satisfies the both features of the meniscus lens and the biconvex lens. Specifically, the optical pickup lenses 1a and 1b maintain a longer working distance and achieves good angle of view characteristics as off-axis characteristics while maintaining good on-axis characteristics.

In the optical pickup lens 1a shown in FIGS. 1A and 1B, the sag increases gradually from the center h0 toward the periphery 13a along the radius of the surface R2 12a and, after reaching a certain radius, which is the radius h3 in the example of FIG. 1B, the sag does not substantially change. In the optical pickup lens 1b shown in FIGS. 2A and 2B, the sag increases gradually from the center h0 toward the periphery 13b along the radius of the surface R2 12b and, after reaching a certain radius, which is the radius h4 in the example of FIG. 2B, the sag decreases gradually to the periphery 13b. The part of the lens which is inside of the position where an increase or decrease amount of sag differentials has the characteristics of a biconvex lens, and the part of the lens which is outside of that position has the characteristics of a meniscus lens.

Specifically, because the center part of the lens serves as a biconvex lens, a working distance is long, and since a curvature radius is not very large, the angle of view characteristics are good in spite of being a biconvex lens. Further, because the part of the lens which is outside of the position where an increase or decrease amount of a sag differentials, which is the peripheral part of the surface R2, has the feature of a meniscus lens, good angle of view characteristics, which are the advantage of the meniscus lens, can be obtained. Furthermore, because the portion which corresponds to a meniscus lens is formed not in the center part of the lens but in the peripheral part of the lens, a working distance is not shortened. In this manner, the optical pickup lenses 1a and 1b of this embodiment have a substantially flat or concave portion in the outer part to exert the characteristics of a meniscus lens and have a convex portion in the inner part to exert the characteristics of a biconvex lens, thereby maintaining a long working distance and achieving good angle of view characteristics as well as good on-axis characteristics. The radii h1 to h4 in FIGS. 1B and 2B are preferably located in the region through which a laser light beam passes.

Although the optical pickup lens 1a has a meniscus shape in the part outside of the position of the radius h3 where a sag increase/decrease amount changes as shown in FIGS. 1A and 1B, the optical pickup lens 1b has an extreme meniscus shape with a minimum k as shown in FIGS. 2A and 2B. Such a shape enables a longer working distance and better angle of view characteristics as off-axis characteristic and on-axis characteristics.

Figure 3:
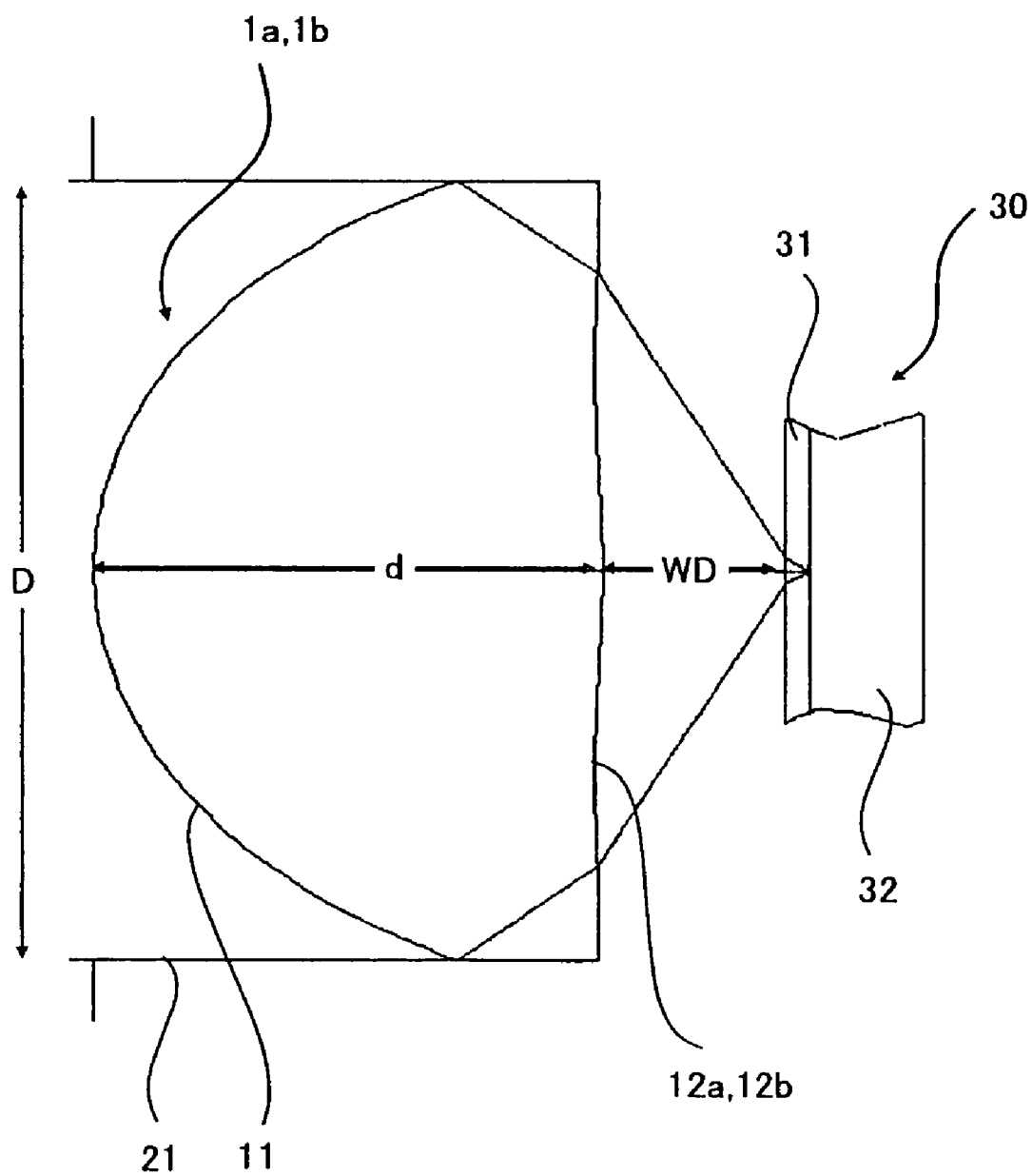
FIG. 3 is a view to describe a lens center thickness d, an effective diameter D and a working distance WD of an optical pickup lens according to an embodiment of the present invention.

When the optical pickup lenses 1a and 1b are used in a recording and/or playback pickup apparatus which uses a laser with a wavelength of 410 nm or shorter as a light source used in an optical head or an optical disc apparatus, it is preferred to satisfy the following expressions:

$$0.84 \leq NA$$

$$0.9 \leq d/f \leq 1.2$$

where NA is a numerical aperture of the optical pickup lens, d is a single lens center thickness of the optical pickup lens (cf. FIG. 3), and f is s focal length.

If the numerical aperture NA is smaller than 0.84, the effective diameter of the surface R2 becomes smaller. If the effective diameter of the surface R2 becomes smaller, it becomes difficult to form the boundary between a biconvex lens portion and a meniscus lens portion in the peripheral part of the surface R2 as described above. Therefore, the numerical aperture NA is preferably 0.8 or larger and more preferably 0.84 or larger.

In order to increase the working distance, it is generally preferred to reduce the center thickness d and lower the refractive index n. On the other hand, in order to set the numerical aperture NA to be 0.84 or larger, increase the working distance and improve the angle of view characteristics, it is preferred to regulate the lens performance, which is the relationship d/f of the focal length f and the center thickness d.

The reason that d/f of 0.9 or larger is preferred is as follows. If the focal length f is a fixed value, the value of d/f decreases as the center thickness d becomes smaller. The decrease in d/f results in the reduction of a distance between the surface R1 and the surface R2 in the peripheral edge, which is called an edge thickness. The reduction of the edge thickness causes a problem such as edge cracking, which makes it difficult to mount a lens. Further, because f=h/NA where f is a focal length and h is a radius, the relationship of d/f=d*NA/h is satisfied. If the numerical aperture NA is a fixed value since it is preferably 0.84 or larger, the value of d/f decreases as the radius is set larger, and it is thus needed to increase the center thickness d accordingly so as to maintain a sufficient edge thickness. It is therefore preferred to set the value of d/f to be 0.9 or larger.

If the value of d/f is 1.2 or smaller, the shape of the surface R2 can be formed easily. It is therefore preferred to set the value of d/f to be 1.2 or smaller.

Setting the numerical aperture NA to be 0.84 or larger and the value of d/f to be 0.9 or larger facilitates the design of the optical pickup lens having the shape shown in FIGS. 1A to 2B, thus obtaining a long working distance and good angle of view characteristics as well as good on-axis characteristics.

The refractive index is preferably set to 1.51<n<1.64 where n is a refractive index for a blue-violet laser with a wavelength of 405 nm. If the refractive index n is smaller than 1.51, a curvature is larger compared with a lens having the same center thickness and a larger refractive index, which causes the reduction of the edge thickness, which is a distance between the peripheral edges of the surface R1 and the surface R2. It is therefore preferred that the refractive index is 1.51 or larger.

On the other hand, if the refractive index n is larger than 1.64, it is difficult to maintain the shape of the surface R2 of the present invention which has both the features of a biconvex lens and a meniscus lens, and it becomes closer to a regular meniscus lens. It is therefore preferred that the refractive index is 1.64 or smaller. However, when the center part of the surface R2 is convex and the peripheral part is concave, the refractive index n can be larger than 1.64.

It is further preferred that the refractive index is set to $1.59 \leq n \leq 1.62$. Setting the refractive index n to the range of 1.59 to 1.62 facilitates the design of the optical pickup lens having the shape shown in FIGS. 2A and 2B. It is therefore preferred to set the refractive index to the range of 1.59 to 1.62.

Setting the refractive index n to the range of 1.51 to 1.64 or the range of 1.59 to 1.62 makes it possible to design the optical pickup lens having the shapes shown in FIGS. 1A to 2B easily. It is thereby possible to maintain a long working distance and improve the angle of view characteristics as well as the on-axis characteristics. The optical pickup lens has a practical lens diameter.

It is also preferred that the effective diameter D (cf. FIG. 3) is set to $1.8 \leq D \leq 3.2$ mm. If the effective diameter D is larger than 3.2 mm, a working distance is too long and it is difficult to manufacture the lens. If, on the other hand, the effective diameter D is smaller than 1.8 mm, a working distance is too short and it is not practical. It is therefore preferred that the effective diameter D is in the range of 1.8 mm to 3.2 mm.

It is also preferred that the tangent angle α of the surface R1, which is one of the two surfaces of a single lens (optical pickup lens) that is closer to a laser light source, is 60°≤α. As the tangent angle α becomes larger, the sag of the surface R1 increases and the sag of the surface R2 decreases accordingly, which makes it easier to manufacture the shape of the optical pickup lens shown in FIGS. 1A, 1B and 2A, 2B. On the other hand, if the tangent angle α is smaller than 60 degrees, the sag of the surface R1 decreases and the sag of the surface R2 increases accordingly. This makes it difficult to manufacture the shape of the surface R2 and deteriorates the angle of view characteristics. It is therefore preferred that the tangent angle α of the surface R1 is 60° or larger. It is thereby possible to facilitate the manufacture of the shape of the surface R2 and obtain good angle of view characteristics as well as good on-axis characteristics.

It is further preferred that the Abbe number vd is 50≦vd. As a lens has a larger Abbe number, chromatic aberration improves in the pickup lens. The chromatic aberration indicates a displacement of a best spot position when a wavelength is deviated by +1 nm each. In a pickup lens, a laser power is turned up when performing recording. The increase in the laser power causes a temporal deviation of a wavelength to be longer. If a best spot position is displaced during recording, tracking can be deviated and recording on the best spot position becomes difficult. It is thus necessary to increase the Abbe number in order to maintain good recording characteristics. The Abbe number is inversely proportional to the refractive index. The refractive index is preferably 1.51≦n≦1.64 as described earlier, and with such a refractive index, the Abbe number is about 50≦vd≦81. Therefore, the Abbe number is preferably 50 or larger, and more preferably 60 or larger.

Figure 6A:
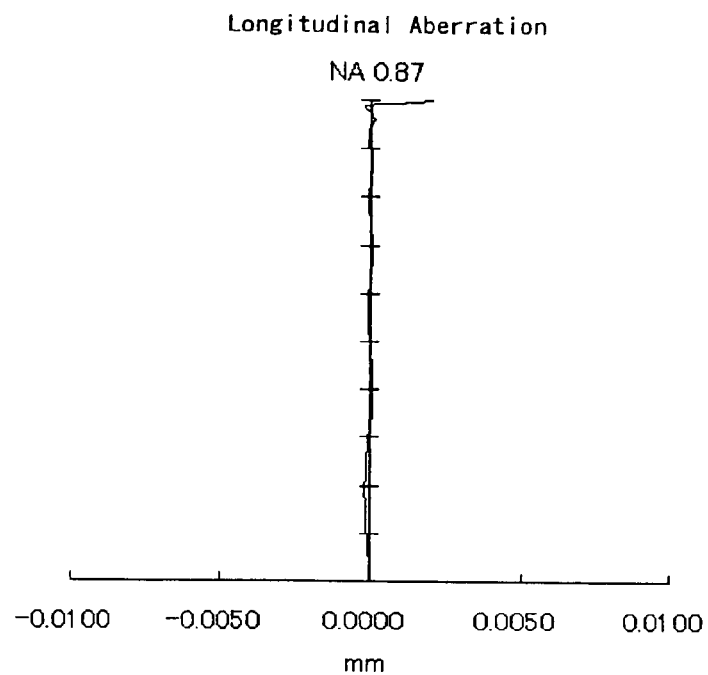
FIG. 6A is a view showing longitudinal aberration.
Figure 6B:
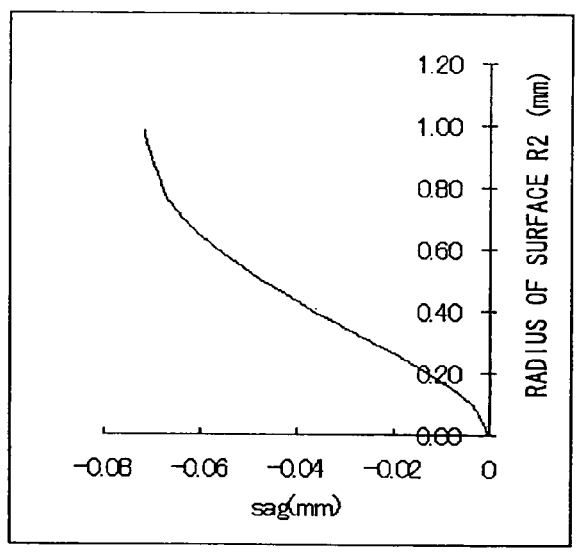
FIG. 6B is a view showing a sag in the radial direction.
Figure 6C:
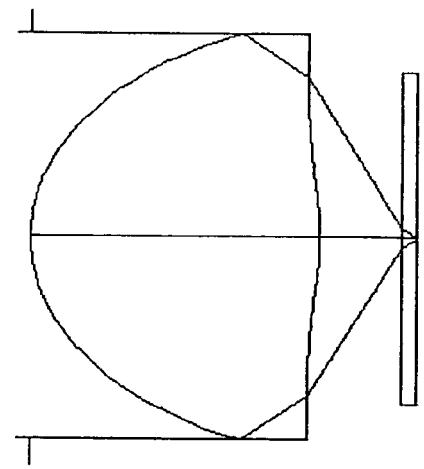
FIG. 6C is a view showing an optical pickup lens according to the example 1.
Figure 8A:
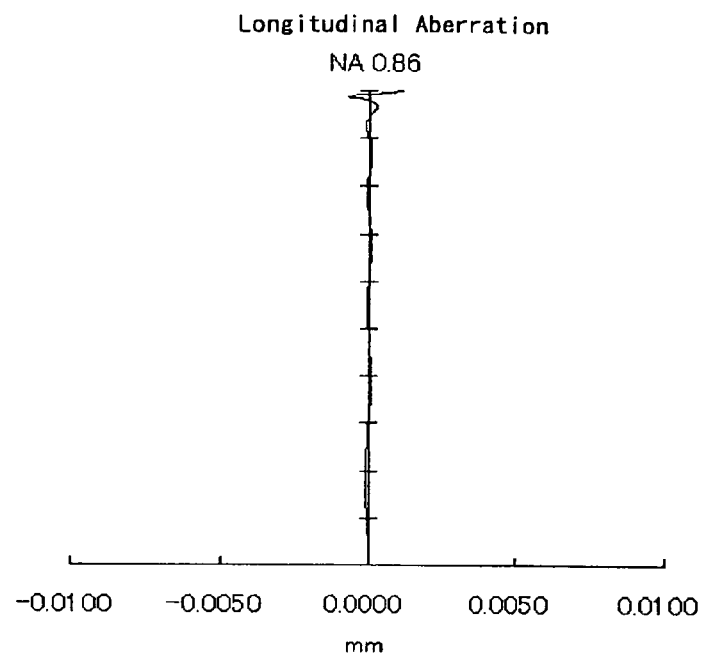
FIG. 8A is a view showing longitudinal aberration.
Figure 8B:
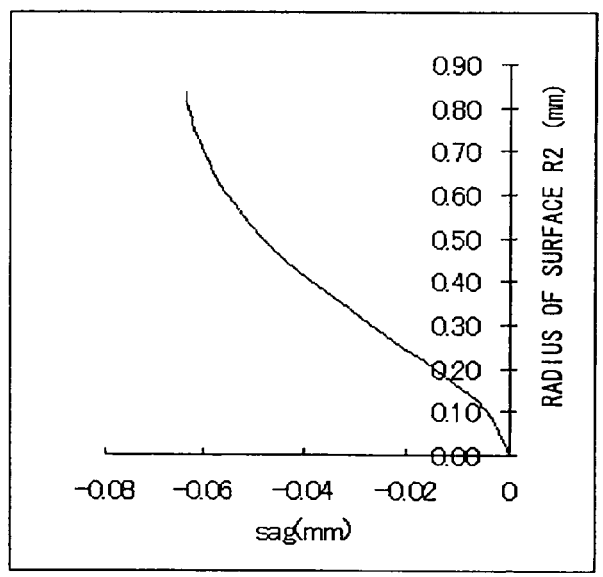
FIG. 8B is a view showing a sag in the radial direction.
Figure 8C:
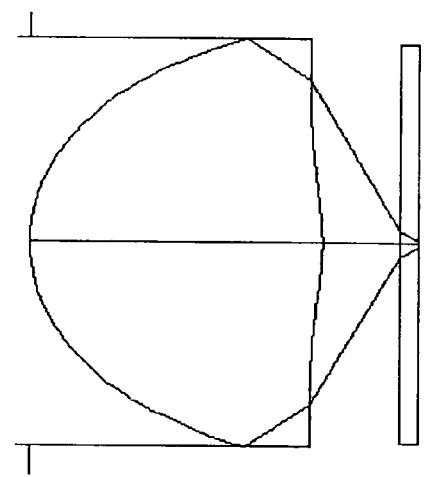
FIG. 8C is a view showing an optical pickup lens according to the example 2.
Figure 10A:
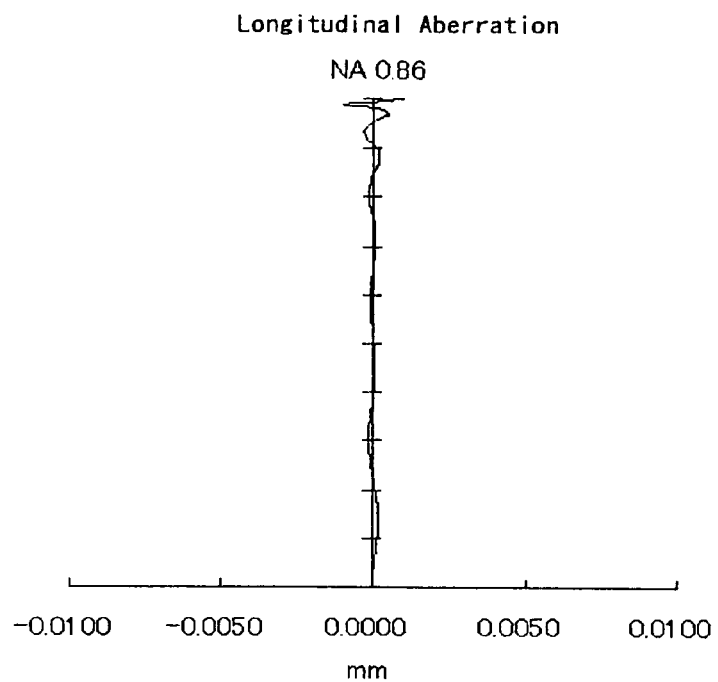
FIG. 10A is a view showing longitudinal aberration.
Figure 10B:
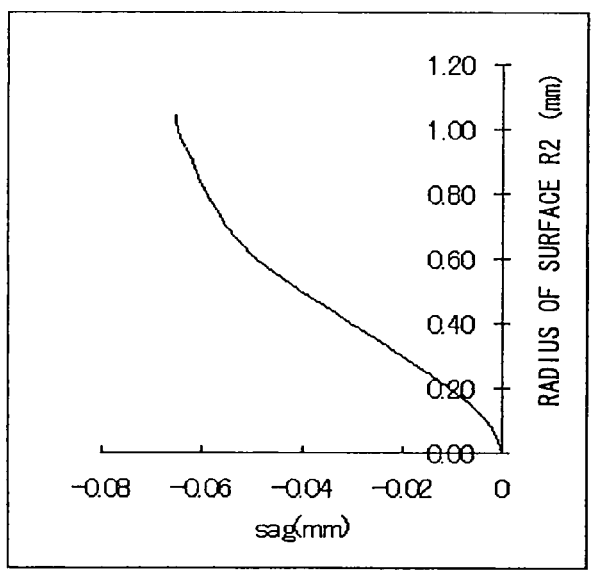
FIG. 10B is a view showing a sag in the radial direction.
Figure 10C:
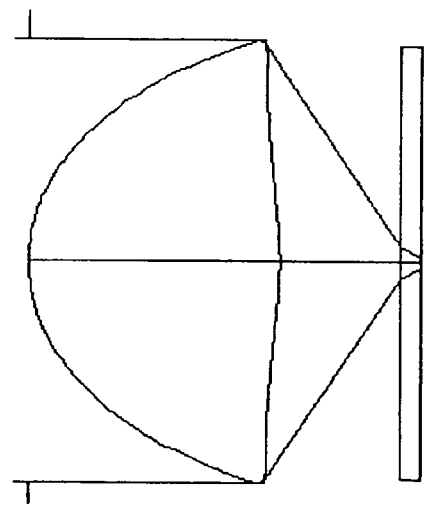
FIG. 10C is a view showing an optical pickup lens according to the example 3.
Figure 12A:
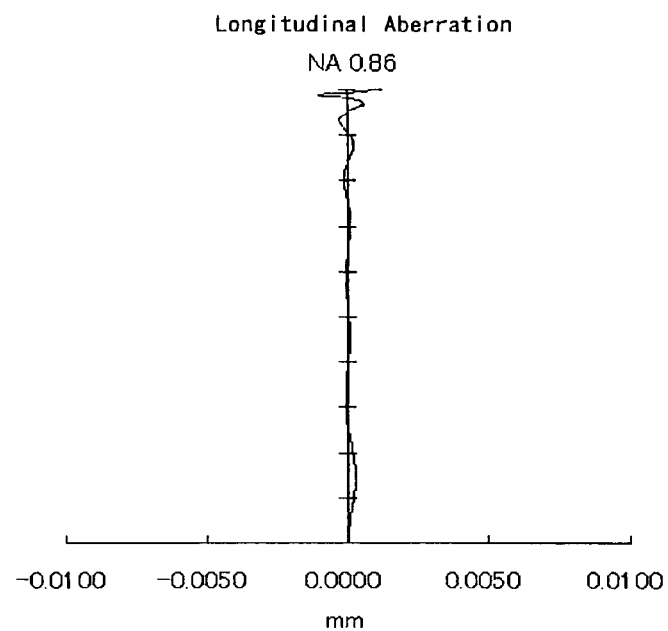
FIG. 12A is a view showing longitudinal aberration.
Figure 12B:
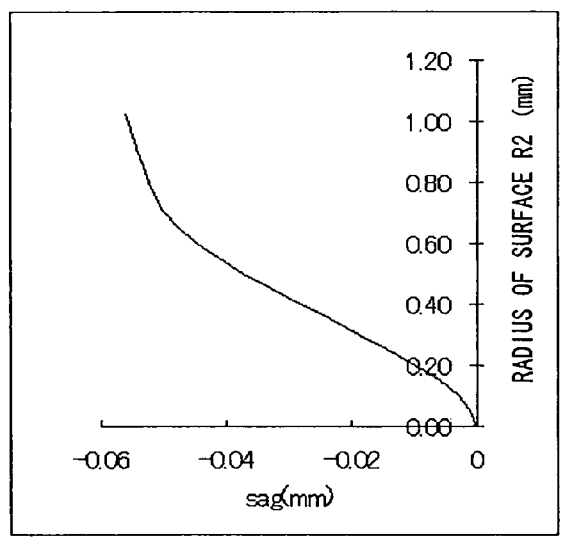
FIG. 12B is a view showing a sag in the radial direction.
Figure 12C:
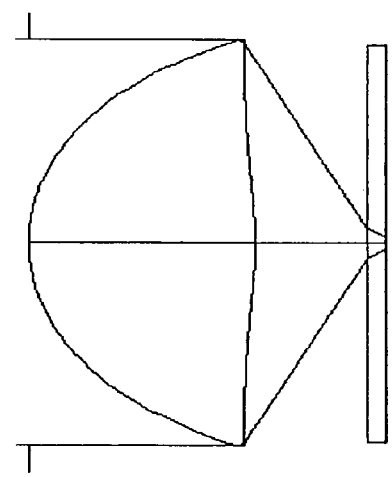
FIG. 12C is a view showing an optical pickup lens according to the example 4.

Examples of the present invention are described hereinafter. FIG. 4 shows wavefront aberration in examples 1 to 32. The details of the example 1 are shown in FIGS. 5A to 5D and FIGS. 6A to 6C, the details of the example 2 are shown in FIGS. 7A to 7D and FIGS. 8A to 8C, and the details of the example 3 are shown in FIGS. 9A to 9D and FIGS. 10A to 10C. Likewise, the details of the examples in FIG. 4 are respectively shown in the subsequent figures up to the example 32 shown in FIGS. 67A to 67D and FIGS. 68A to 68C. Further, the examples 1 to 4 correspond to the optical pickup lens 1a shown in FIGS. 1A and 1B. The examples 5 to 32 correspond to the optical pickup lens 1b shown in FIGS. 2A and 2B. Referring to the example 1, for instance, the corresponding FIGS. 5A to 5D show the characteristic values of the optical pickup lens. FIG. 6A shows longitudinal aberration, FIG. 6B shows the sag from the center to the periphery of the surface R2, and FIG. 6C illustrates the optical pickup lens of the example 1.

The coefficients in the examples 1 to 32 are described hereinafter. The expression $Z_1(h_1)$ indicating the curve of the surface R1 of the optical pickup lens is represented by the following expression (6):

$$Z_1(h_1) = \frac{h_1^2}{R_1\left(1+\sqrt{1-\frac{(1+k_1)h_1^2}{R_1^2}}\right)} + A_14h_1^4 + A_16h_1^6 + \quad (6)$$

$$A_18h_1^8 + A_110h_1^{10} + A_112h_1^{12} + A_114h_1^{14} + A_116h_1^{16} + \ldots$$

where $Z_1(h_1)$ is the sag of the surface R1 of the optical pickup lens at the height $h_1$ from the optical axis, $h_1$ is the height from the optical axis, $k_1$ is the constant of the cone of the surface R1 of the optical pickup lens, $A1_4$, $A1_6$, $A1_8$, $A1_{10}$, $A1_{12}$, $A1_{14}$ and $A1_{16}$ are aspheric coefficients of the surface R1 of the optical pickup lens, and $R_1$ is the curvature radius of the surface R1 of the optical pickup lens.

The expression $Z_2(h_2)$ indicating the curve of the surface R2 of the optical pickup lens is represented by the following expression (7):

$$Z_2(h_2) = \frac{h_2^2}{R_2\left(1+\sqrt{1-\frac{(1+k_2)h_2^2}{R_2^2}}\right)} + A_24h_2^4 + A_26h_2^6 + \quad (7)$$

$$A_28h_2^8 + A_210h_2^{10} + A_212h_2^{12} + A_214h_2^{14} + A_216h_2^{16} + \ldots$$

where $Z_2(h_2)$ is the sag of the surface R2 of the optical pickup lens at the height $h_2$ from the optical axis, $h_2$ is the height from the optical axis, $k_2$ is the constant of the cone of the surface R2 of the optical pickup lens, $A2_4$, $A2_6$, $A2_8$, $A2_{10}$, $A2_{12}$, $A2_{14}$ and $A2_{16}$ are aspheric coefficients of the surface R2 of the optical pickup lens, and $R_2$ is the curvature radius of the surface R2 of the optical pickup lens.

The example 1 shown in FIGS. 5A to 5D and FIGS. 6A to 6C as a typical example of the optical pickup lens 1a shown in FIGS. 1A and 1B, and the example 5 shown in FIGS. 13A to 13D and FIGS. 14A to 14C as a typical example of the optical pickup lens 1b shown in FIGS. 2A and 2B are described hereinbelow. The single lens (optical pickup lens) of the example 1 has a curvature radius R, an inter-surface distance d, a refractive index n for a wavelength 504 nm, and an Abbe number vd as shown in FIG. 5A. FIG. 6A shows the result of measuring longitudinal aberration for the single lens (optical pickup lens) of the example 1 and an optical disc. FIG. 5B shows the focal length d, the working distance WD, the numerical aperture NA and the effective diameter of the optical pickup lens of the example 1, FIGS. 5C and 5D show the aspheric coefficients of the surfaces R1 and R2, respectively, and FIG. 6C shows a schematic illustration of the optical pickup lens. FIG. 6B shows the shape of the surface R2 as a graph with the vertical axis indicating from the center h0 to the peripheral edge (effective diameter) and the horizontal axis indicating the sag. As shown in FIG. 6B, the example 1 satisfies:

$$0>\Delta sag1>\Delta sag2 \quad (1)$$

$$\Delta sag2 < \Delta sag3 \quad (2)$$

and h1<h2<h3, and sag1>sag2>sag3 in the range of the lens effective diameter just like the optical pickup lens 1a shown in FIGS. 1A and 1B.

Now, this point is described in detail based on the data shown in FIG. 5. If it is assumed that h1=0.100 mm, h2=0.500 mm, and h3=0.950 mm in the example 1, it is obtained that sag1=−0.00365 mm, sag2=−0.04780 mm, and sag3=0.07172 mm. Next, sags when 0.005 mm is added to each radius h1, h2, and h3 are calculated to obtain Δsag1, Δsag2, and Δsag3.

sag in h1+0.005 mm=0.105 mm equals to −0.00400 mm, sag in h2+0.005 mm=0.505 mm equals to −0.04831 mm, and sag in h3+0.005 mm=0.955 mm equals to −0.07176 mm.

Therefore,

Δsag1=((−0.00400)−(−0.00305))/(0.105−0.100)=− 0.0704, $$\Delta sag2=((-0.04831)-(-0.04780))/(0.505-0.500)=-0.1020, \text{ and}$$

$$\Delta sag3=((-0.07176)-(-0.07172))/(0.955-0.950)=-0.0080.$$

As can be shown in the verification above based on the specific numerical values, the example 1 satisfies the above-described expression in the range of the lens effective diameter just like the optical pickup lens 1a shown in FIGS. 1A and 1B.

The optical pickup lens of the example 1 with the surface R2 of such a shape has suitable longitudinal aberration within the lens effective diameter as shown in FIG. 6A. It also has good angle of view characteristics as shown in FIG. 4.

Figure 14A:
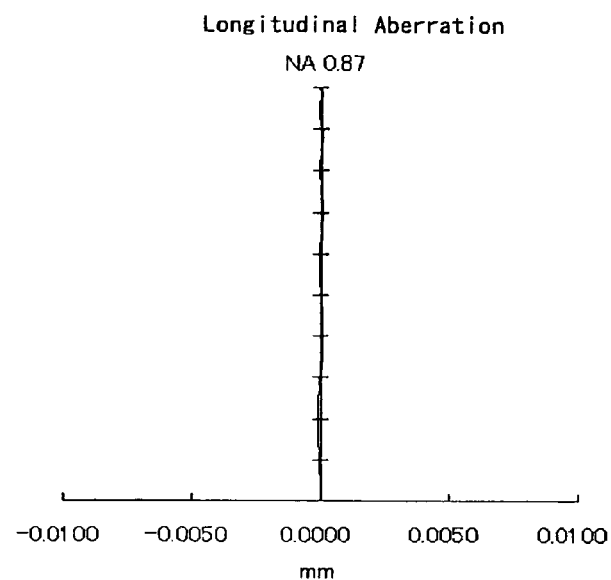
FIG. 14A is a view showing longitudinal aberration.
Figure 14B:
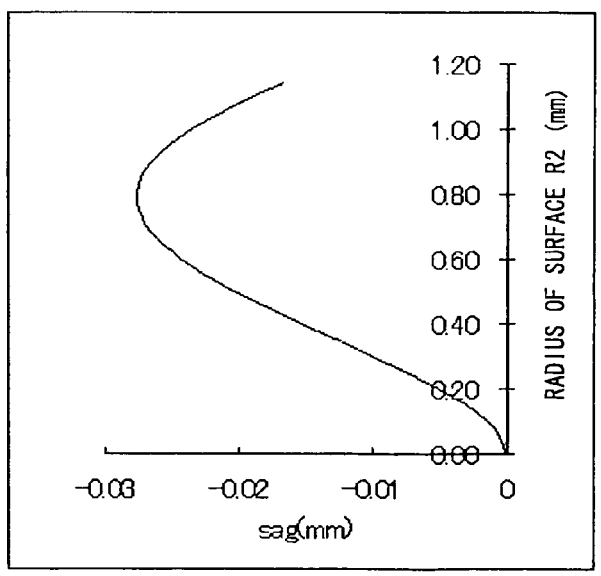
FIG. 14B is a view showing a sag in the radial direction.
Figure 14C:
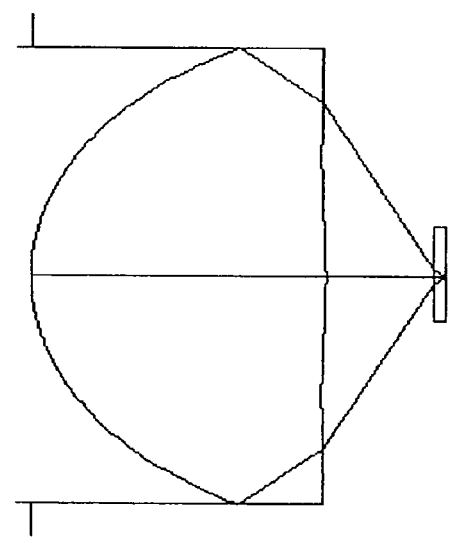
FIG. 14C is a view showing an optical pickup lens according to the example 5.
Figure 16A:
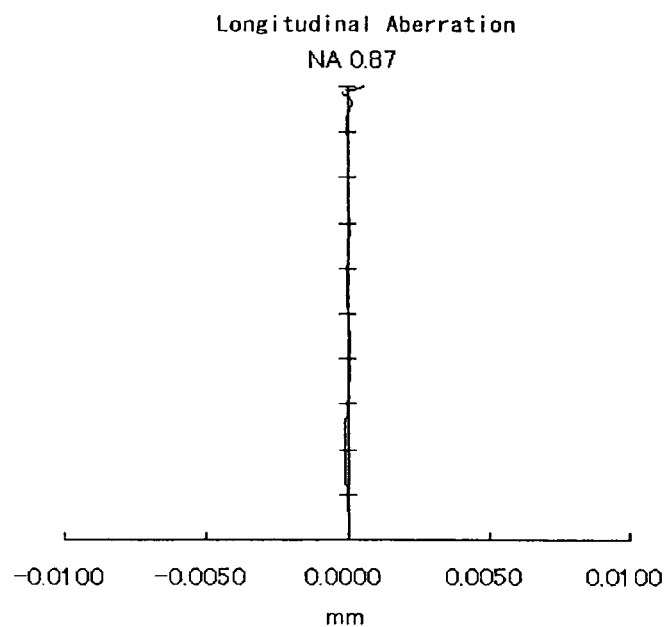
FIG. 16A is a view showing longitudinal aberration.
Figure 16B:
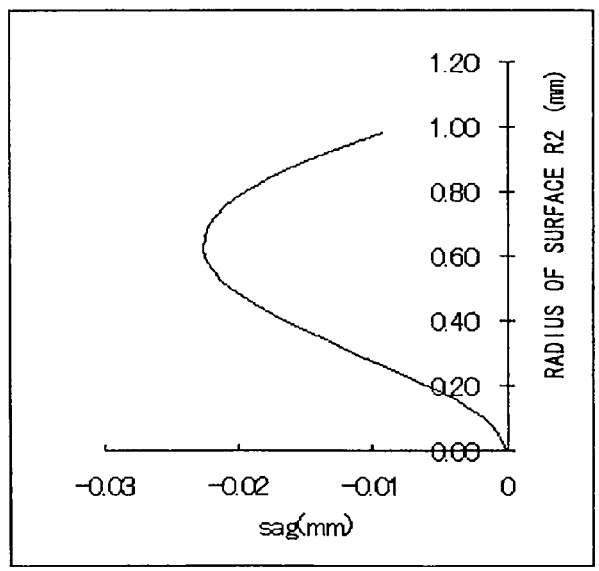
FIG. 16B is a view showing a sag in the radial direction.
Figure 16C:
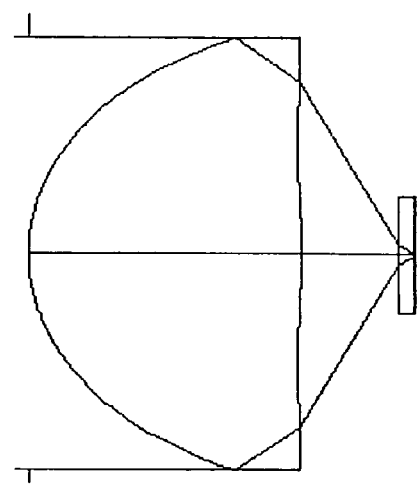
FIG. 16C is a view showing an optical pickup lens according to the example 6.
Figure 18A:
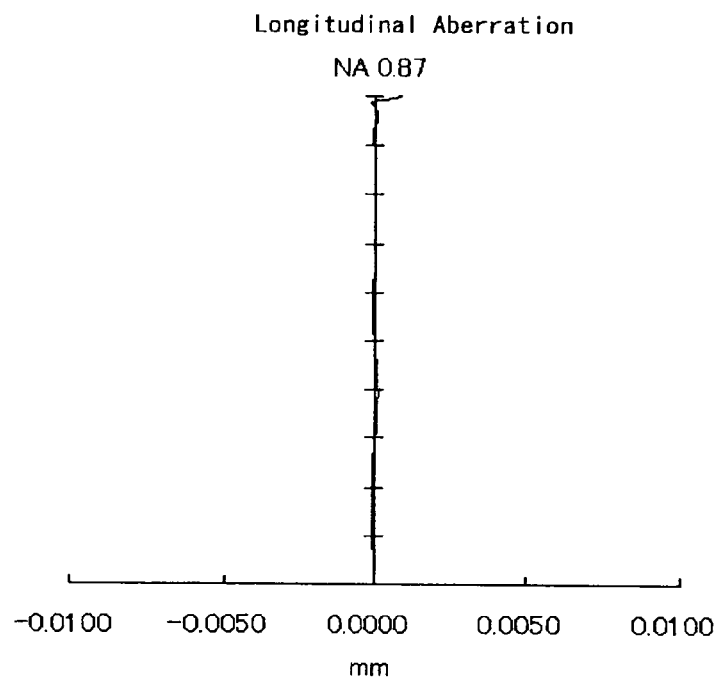
FIG. 18A is a view showing longitudinal aberration.
Figure 18B:
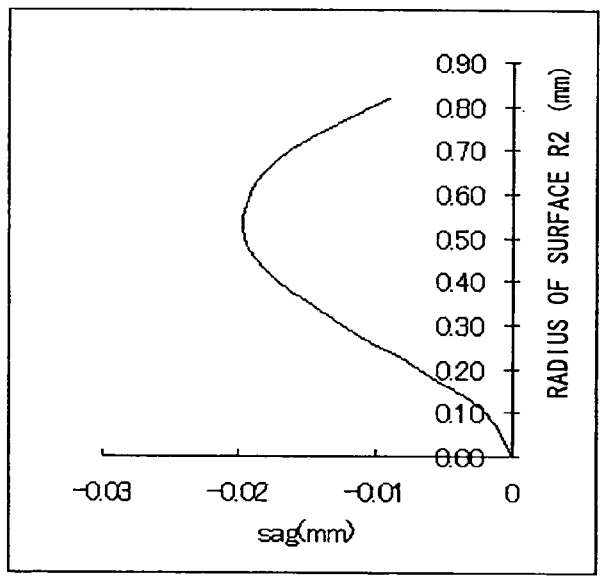
FIG. 18B is a view showing a sag in the radial direction.
Figure 18C:
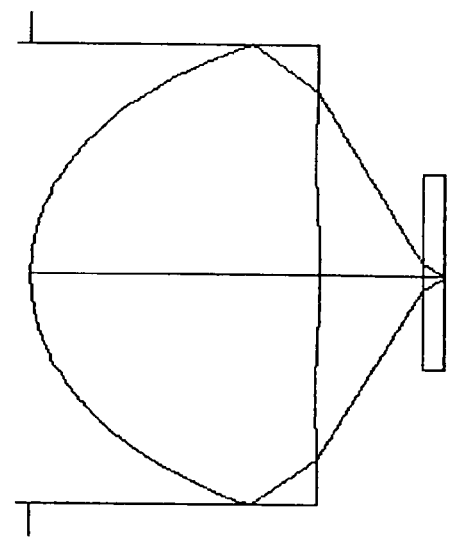
FIG. 18C is a view showing an optical pickup lens according to the example 7.
Figure 20A:
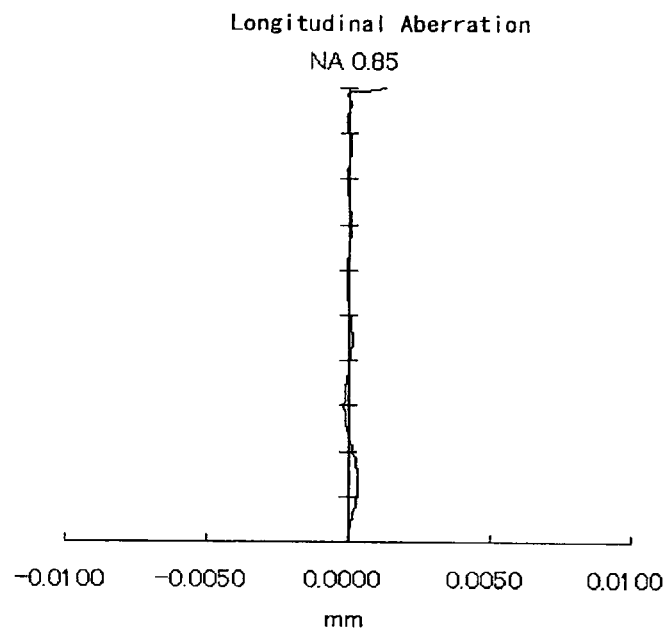
FIG. 20A is a view showing longitudinal aberration.
Figure 20B:
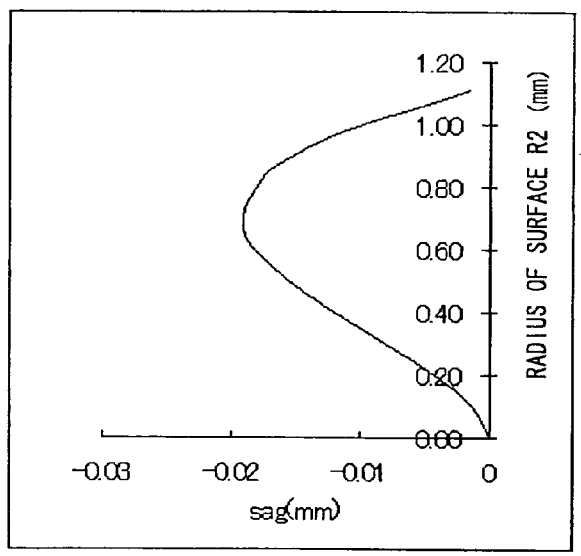
FIG. 20B is a view showing a sag in the radial direction.
Figure 20C:
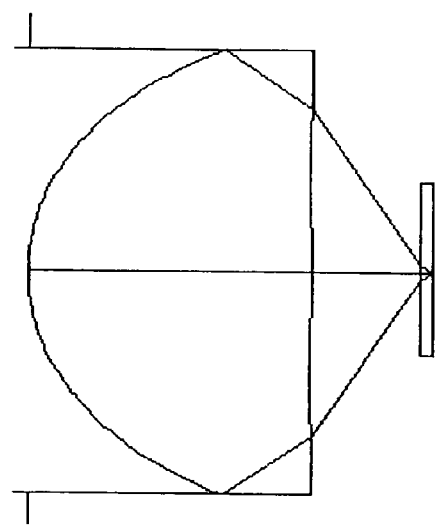
FIG. 20C is a view showing an optical pickup lens according to the example 8.
Figure 22A:
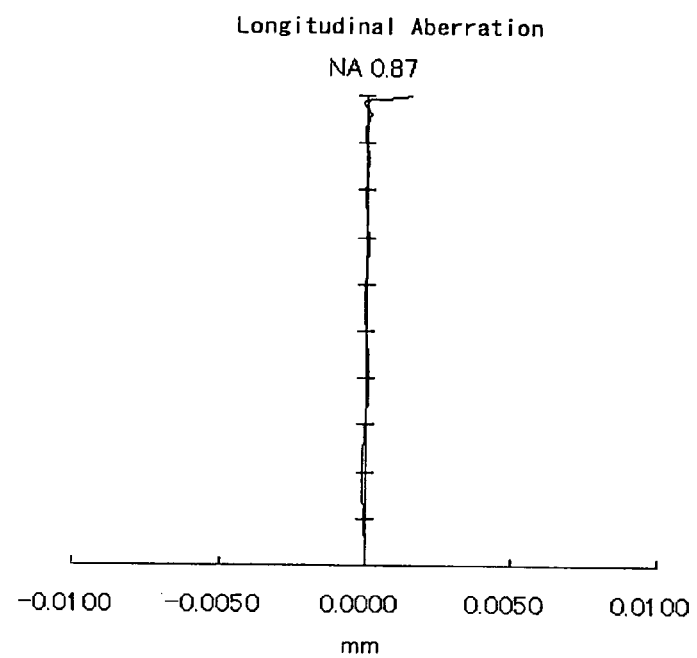
FIG. 22A is a view showing longitudinal aberration.
Figure 22B:
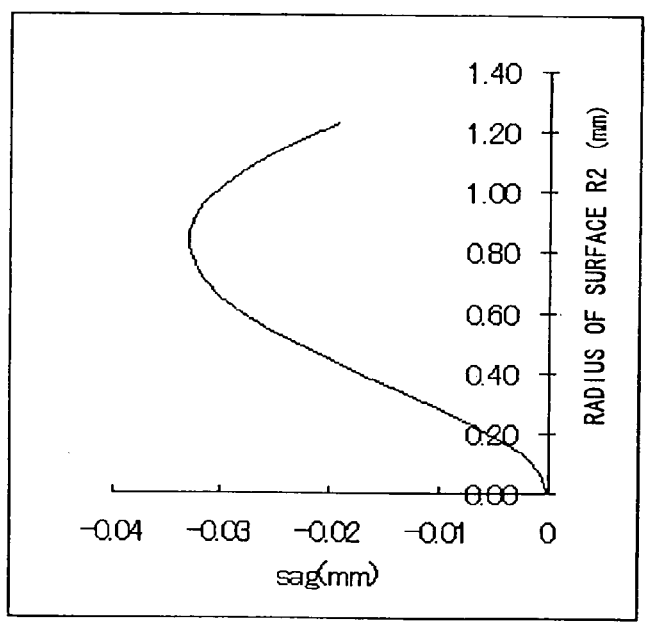
FIG. 22B is a view showing a sag in the radial direction.
Figure 22C:
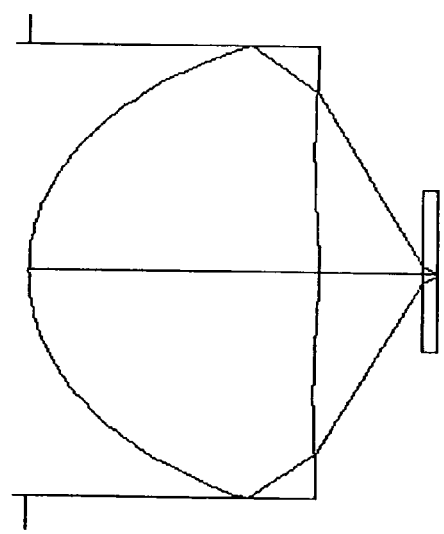
FIG. 22C is a view showing an optical pickup lens according to the example 9.
Figure 24A:
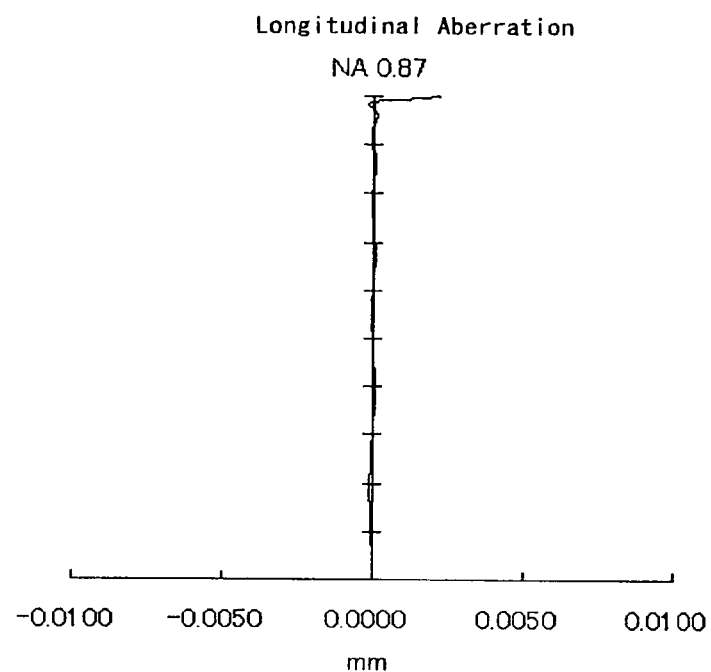
FIG. 24A is a view showing longitudinal aberration.
Figure 24B:
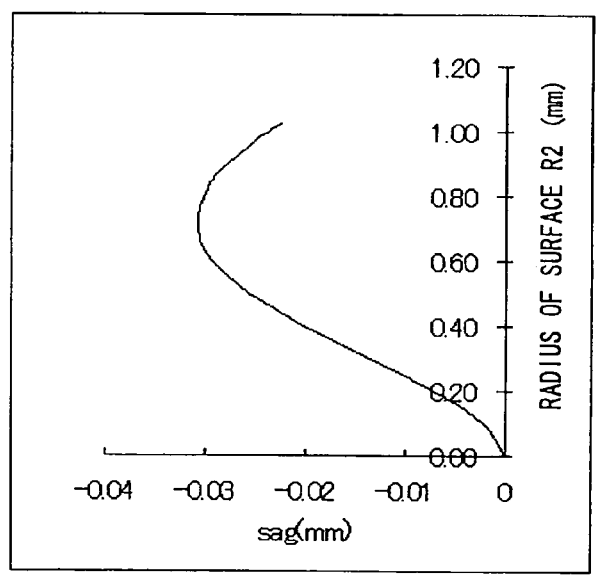
FIG. 24B is a view showing a sag in the radial direction.
Figure 24C:
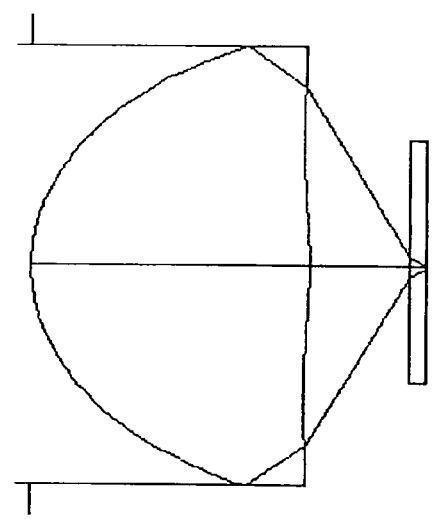
FIG. 24C is a view showing an optical pickup lens according to the example 10.
Figure 26A:
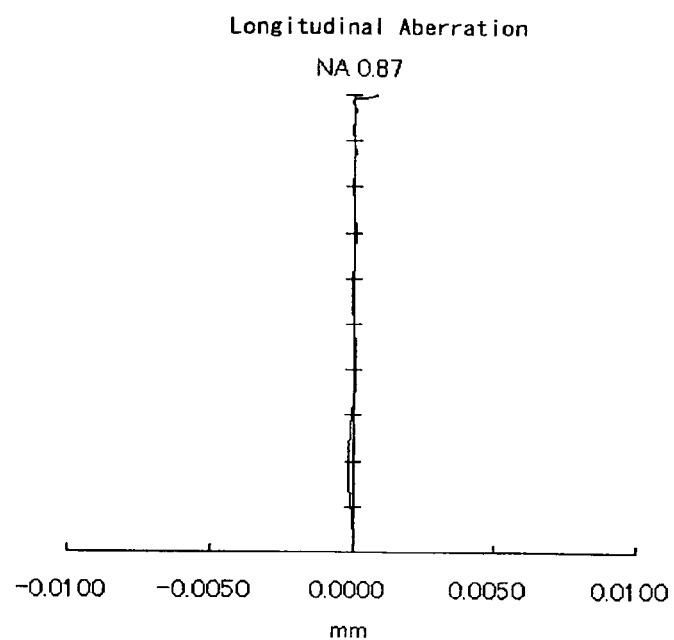
FIG. 26A is a view showing longitudinal aberration.
Figure 26B:
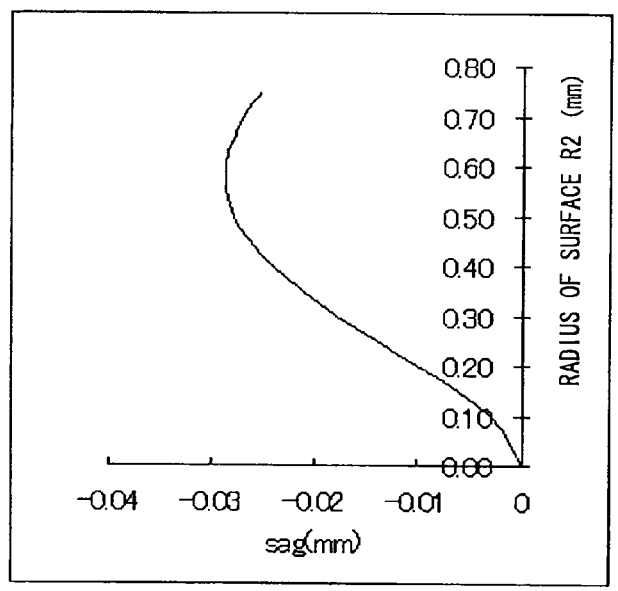
FIG. 26B is a view showing a sag in the radial direction.
Figure 26C:
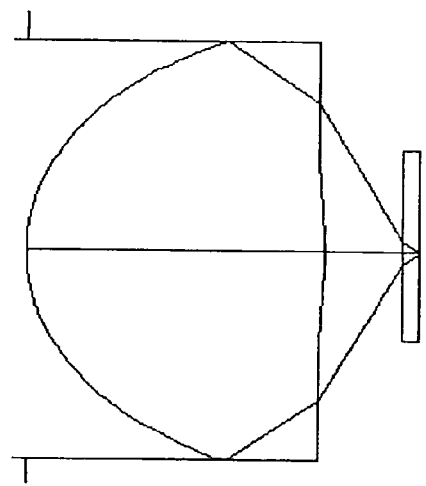
FIG. 26C is a view showing an optical pickup lens according to the example 11.
Figure 28A:
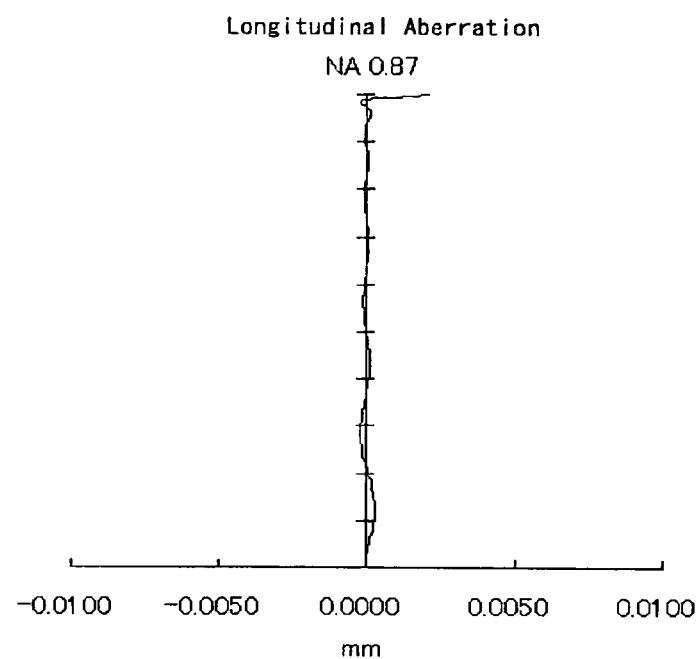
FIG. 28A is a view showing longitudinal aberration.
Figure 28B:
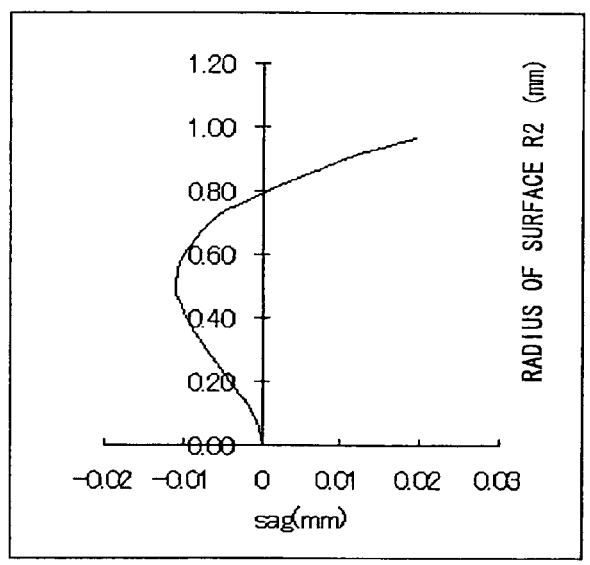
FIG. 28B is a view showing a sag in the radial direction.
Figure 28C:
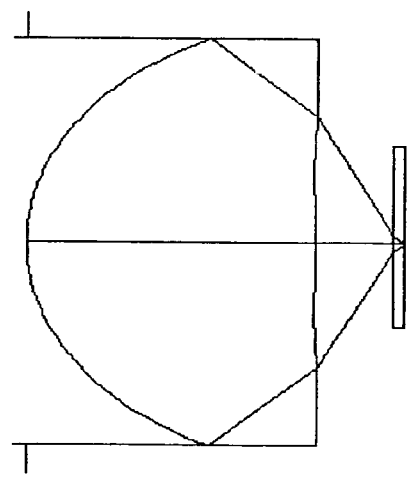
FIG. 28C is a view showing an optical pickup lens according to the example 12.
Figure 30A:
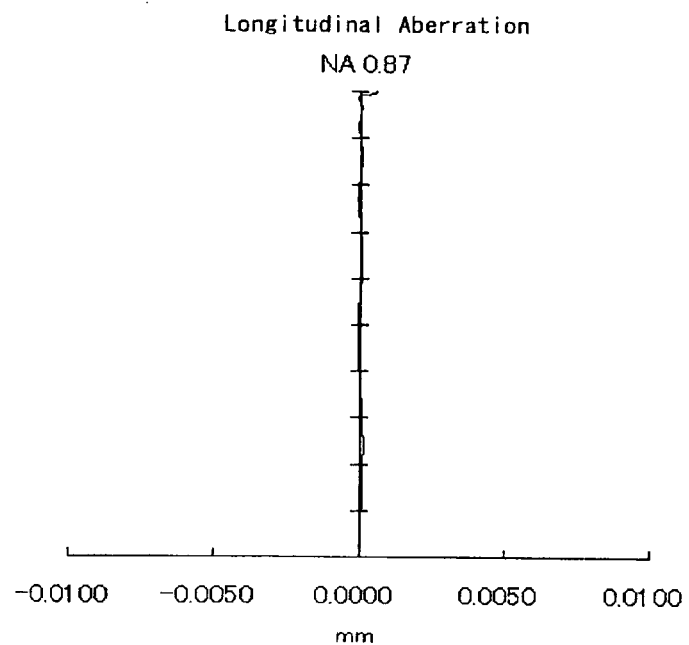
FIG. 30A is a view showing longitudinal aberration.
Figure 30B:
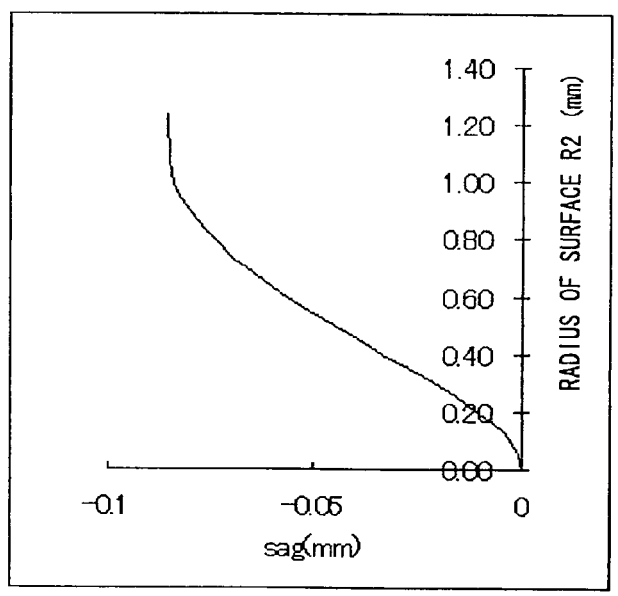
FIG. 30B is a view showing a sag in the radial direction.
Figure 30C:
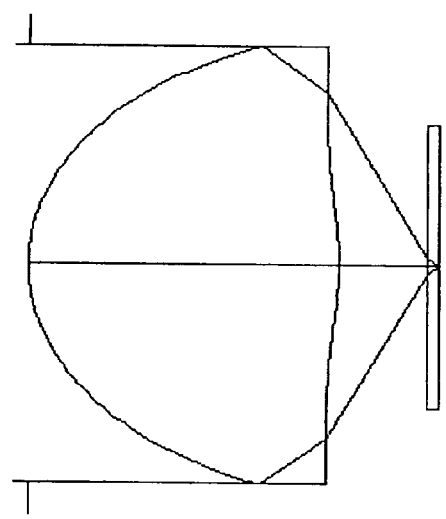
FIG. 30C is a view showing an optical pickup lens according to the example 13.
Figure 32A:
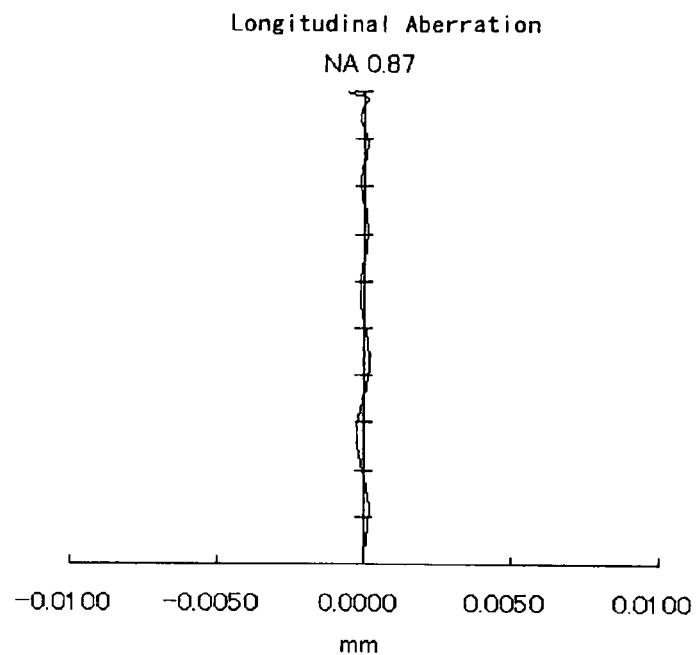
FIG. 32A is a view showing longitudinal aberration.
Figure 32B:
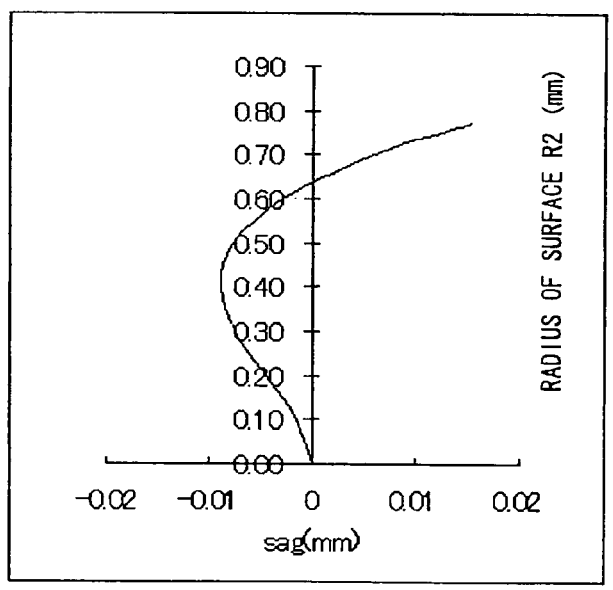
FIG. 32B is a view showing a sag in the radial direction.
Figure 32C:
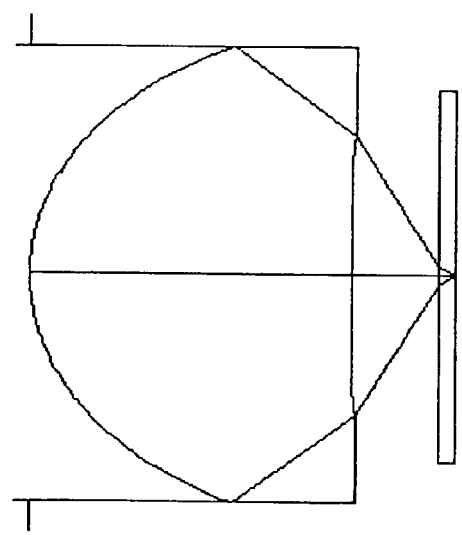
FIG. 32C is a view showing an optical pickup lens according to the example 14.
Figure 34A:
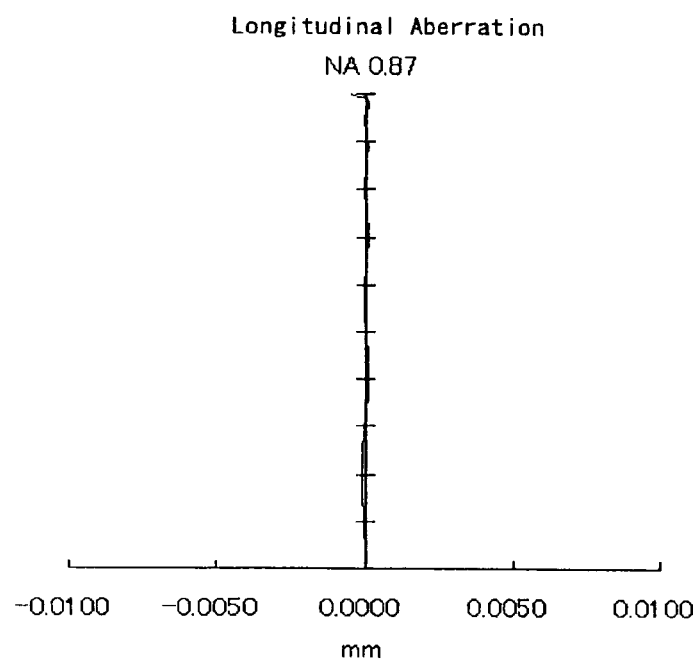
FIG. 34A is a view showing longitudinal aberration.
Figure 34B:
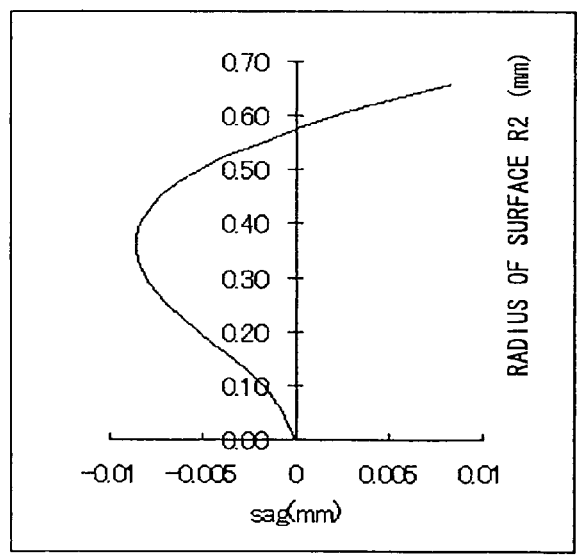
FIG. 34B is a view showing a sag in the radial direction.
Figure 34C:
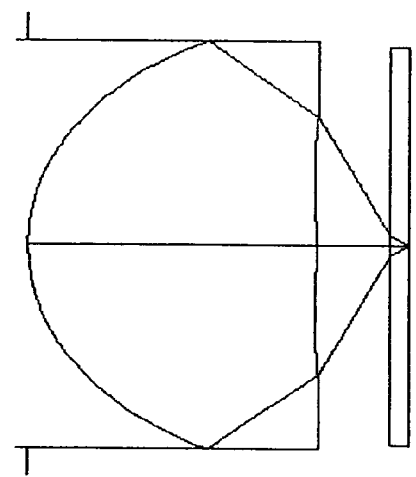
FIG. 34C is a view showing an optical pickup lens according to the example 15.
Figure 36A:
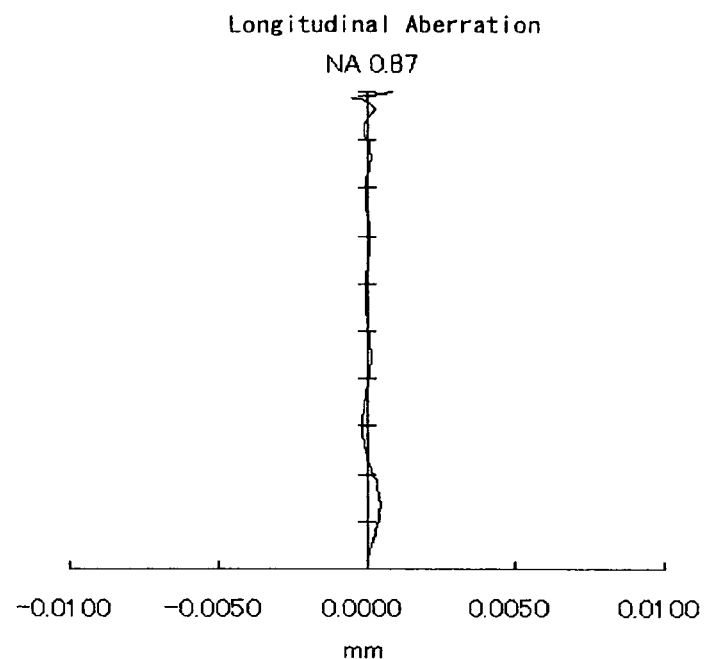
FIG. 36A is a view showing longitudinal aberration.
Figure 36B:
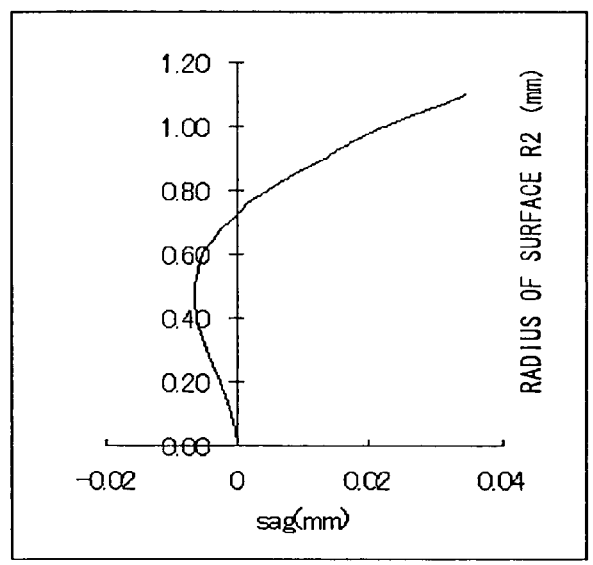
FIG. 36B is a view showing a sag in the radial direction.
Figure 36C:
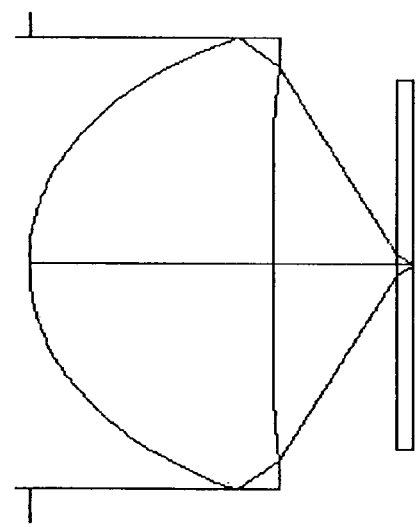
FIG. 36C is a view showing an optical pickup lens according to the example 16.
Figure 38A:
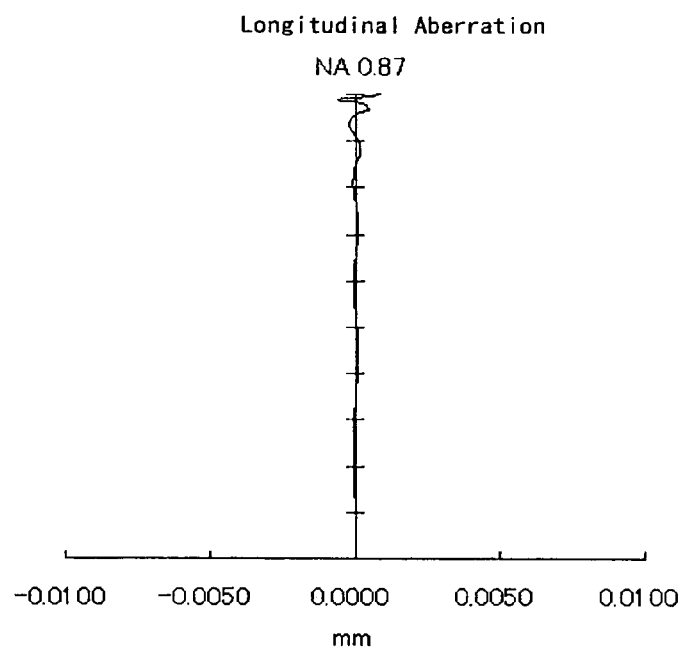
FIG. 38A is a view showing longitudinal aberration.
Figure 38B:
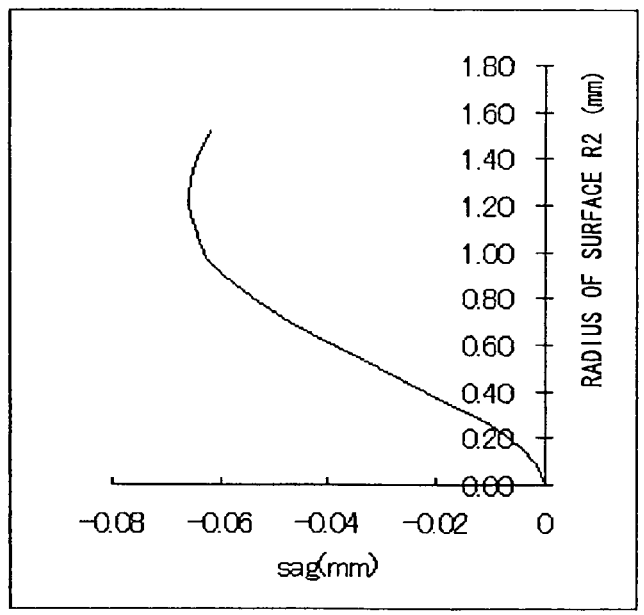
FIG. 38B is a view showing a sag in the radial direction.
Figure 38C:
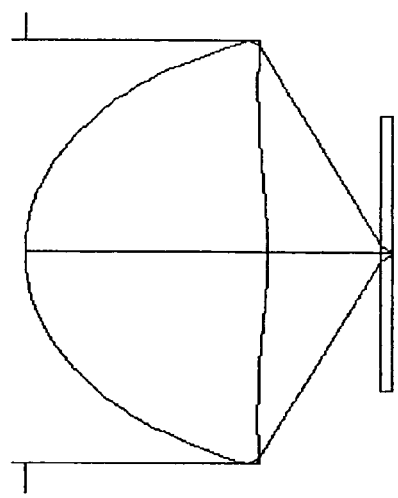
FIG. 38C is a view showing an optical pickup lens according to the example 17.
Figure 40A:
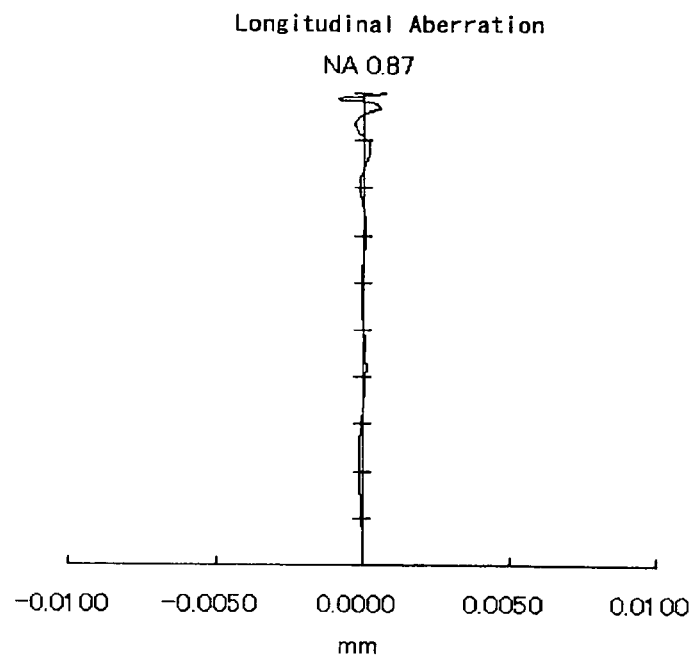
FIG. 40A is a view showing longitudinal aberration.
Figure 40B:
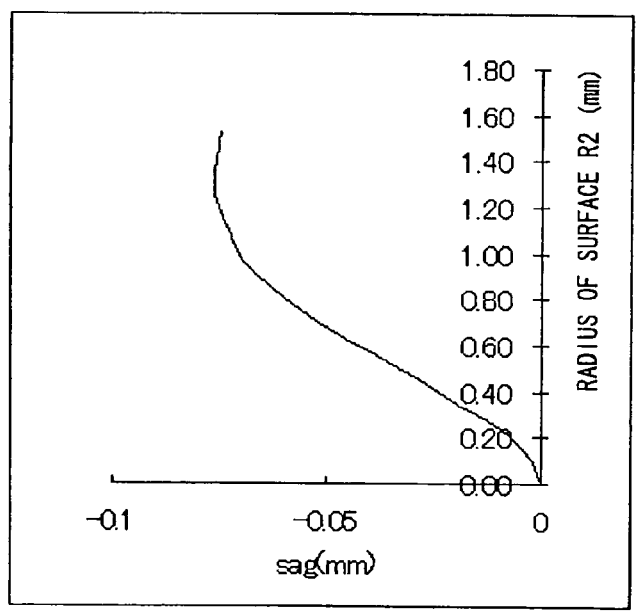
FIG. 40B is a view showing a sag in the radial direction.
Figure 40C:
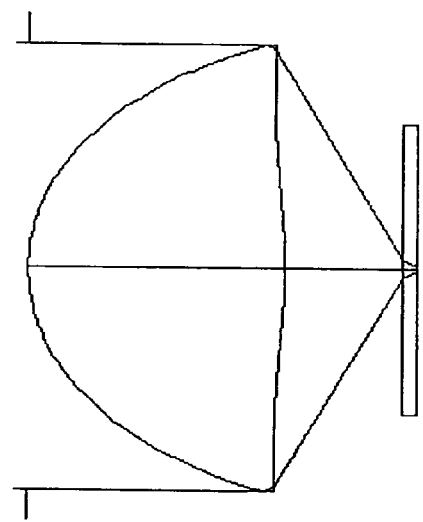
FIG. 40C is a view showing an optical pickup lens according to the example 18.
Figure 42A:
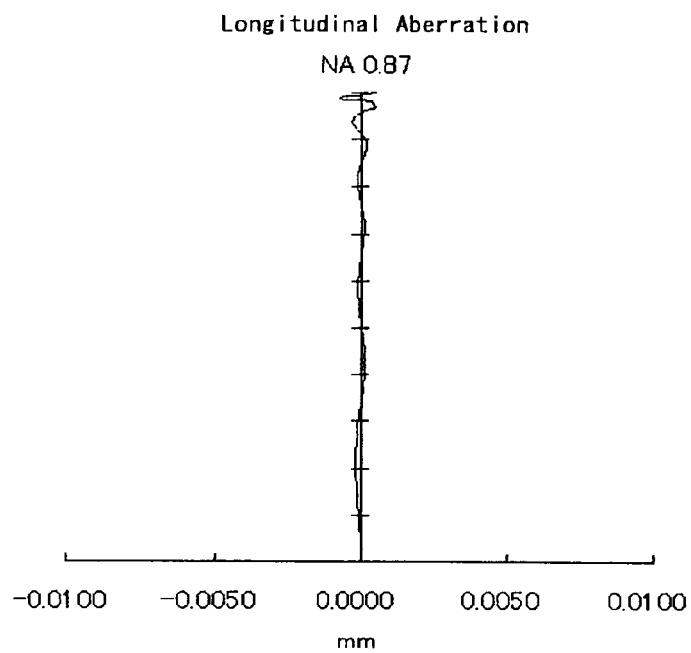
FIG. 42A is a view showing longitudinal aberration.
Figure 42B:
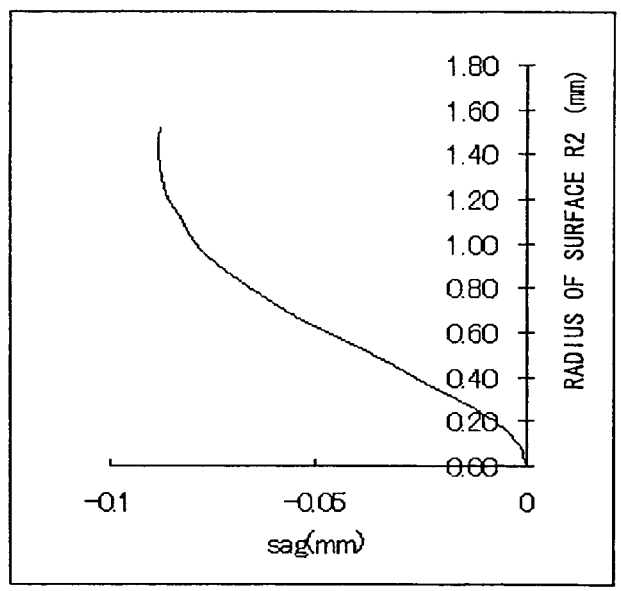
FIG. 42B is a view showing a sag in the radial direction.
Figure 42C:
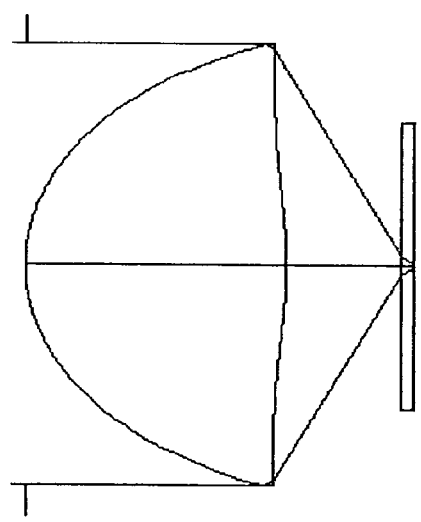
FIG. 42C is a view showing an optical pickup lens according to the example 19.
Figure 44A:
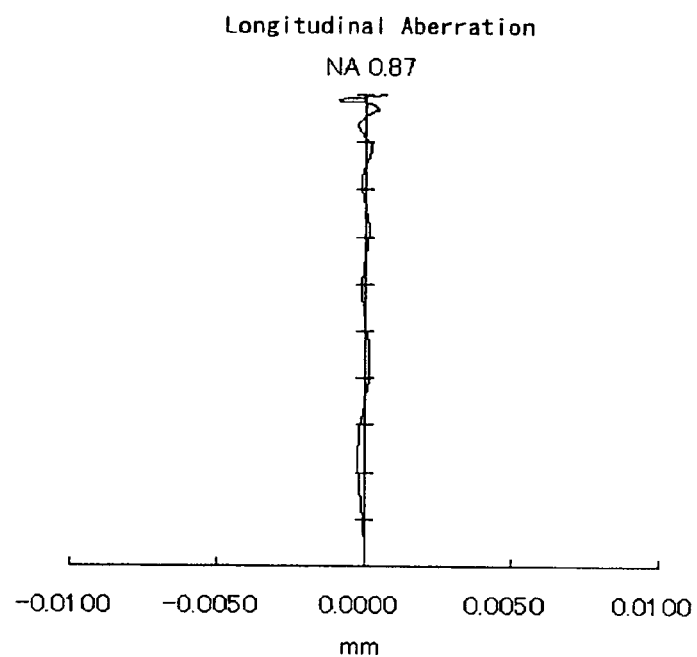
FIG. 44A is a view showing longitudinal aberration.
Figure 44B:
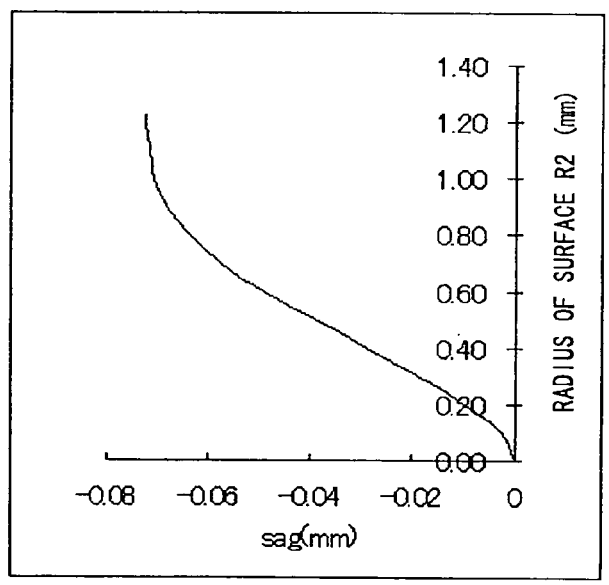
FIG. 44B is a view showing a sag in the radial direction.
Figure 44C:
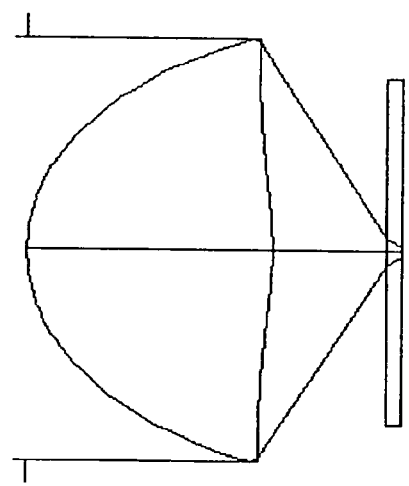
FIG. 44C is a view showing an optical pickup lens according to the example 20.
Figure 46A:
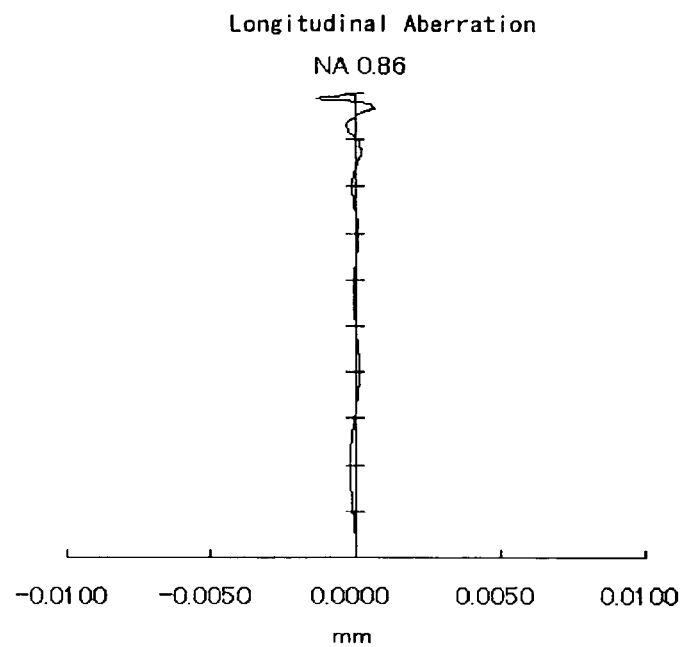
FIG. 46A is a view showing longitudinal aberration.
Figure 46B:
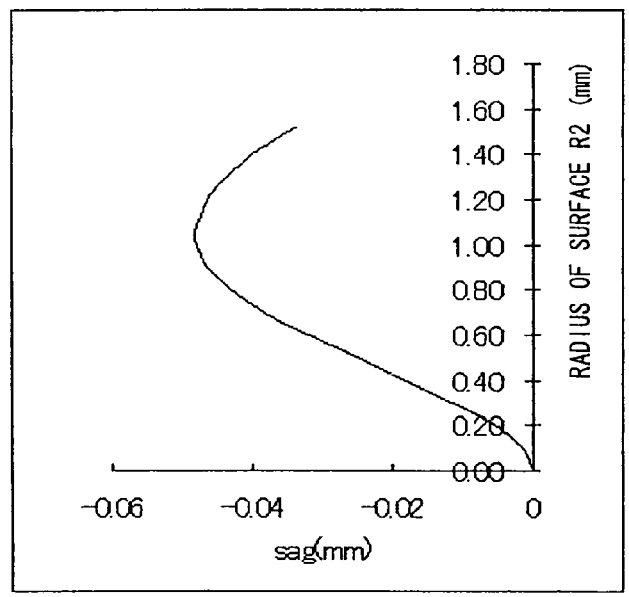
FIG. 46B is a view showing a sag in the radial direction.
Figure 46C:
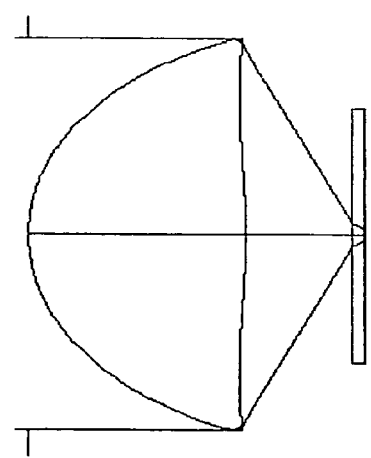
FIG. 46C is a view showing an optical pickup lens according to the example 21.
Figure 48A:
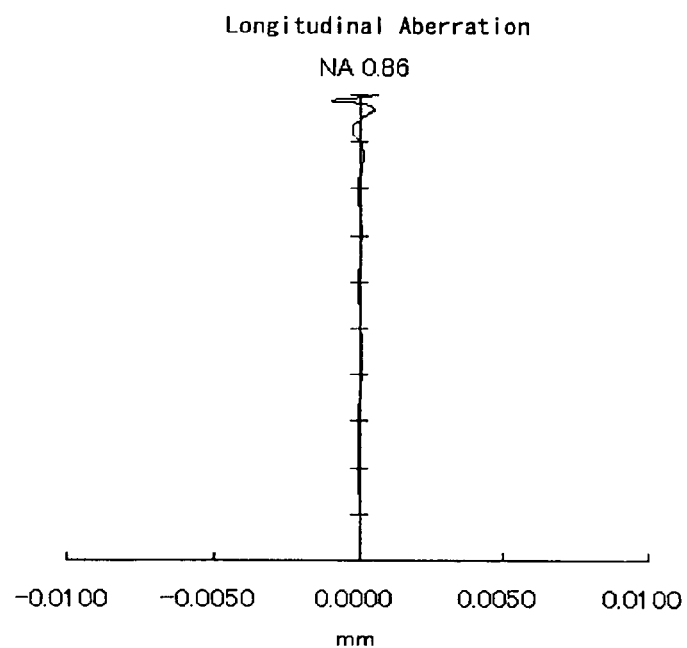
FIG. 48A is a view showing longitudinal aberration.
Figure 48B:
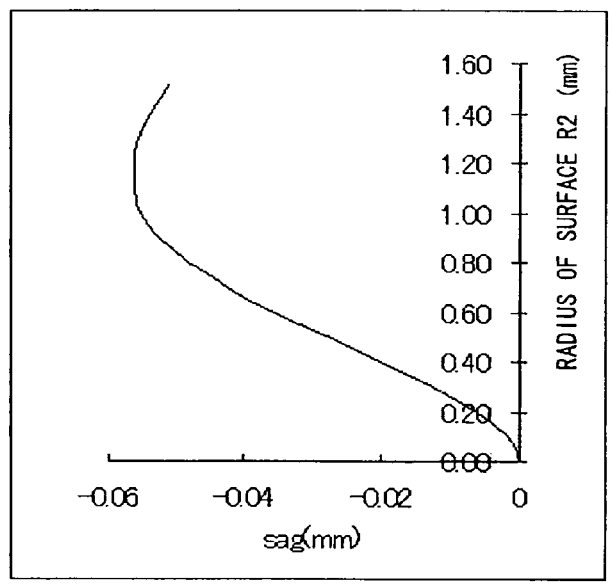
FIG. 48B is a view showing a sag in the radial direction.
Figure 48C:
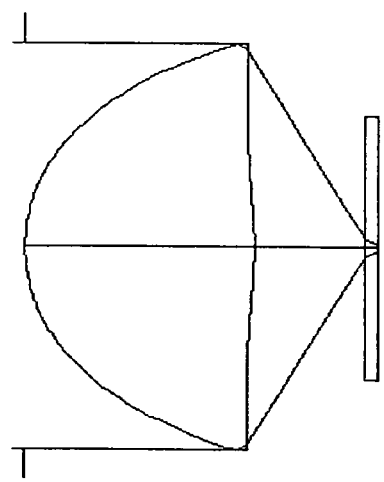
FIG. 48C is a view showing an optical pickup lens according to the example 22.
Figure 50A:
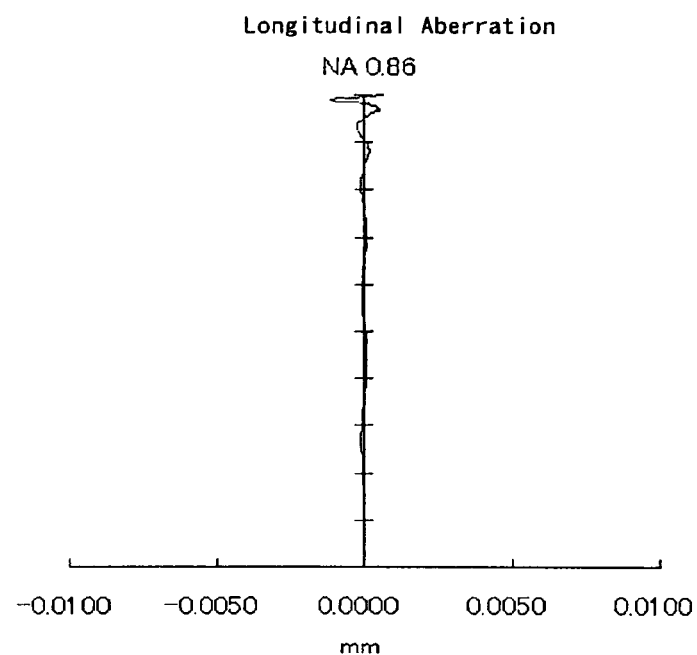
FIG. 50A is a view showing longitudinal aberration.
Figure 50B:
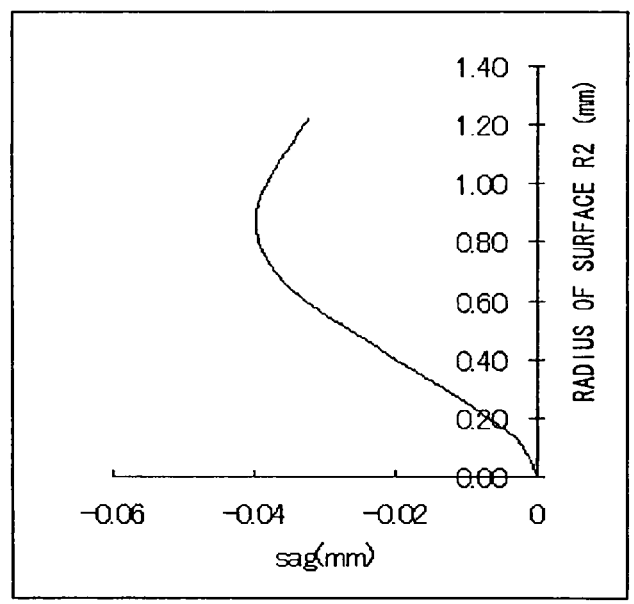
FIG. 50B is a view showing a sag in the radial direction.
Figure 50C:
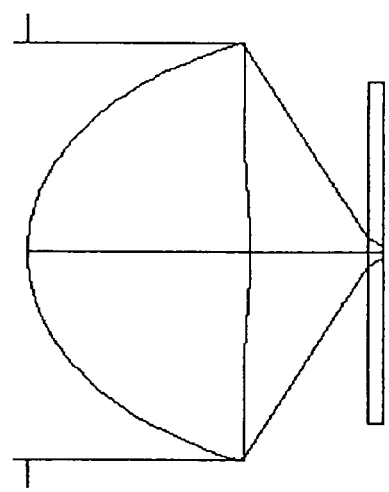
FIG. 50C is a view showing an optical pickup lens according to the example 23.
Figure 52A:
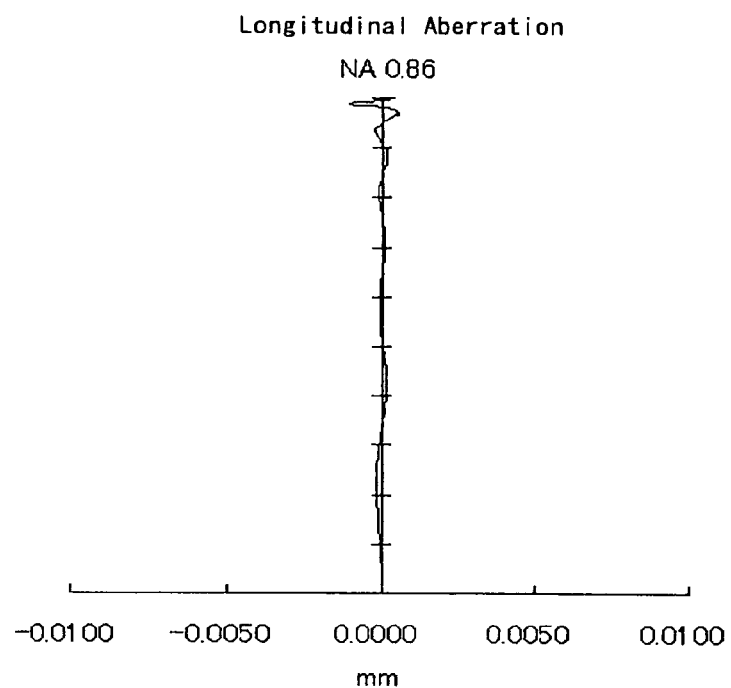
FIG. 52A is a view showing longitudinal aberration.
Figure 52B:
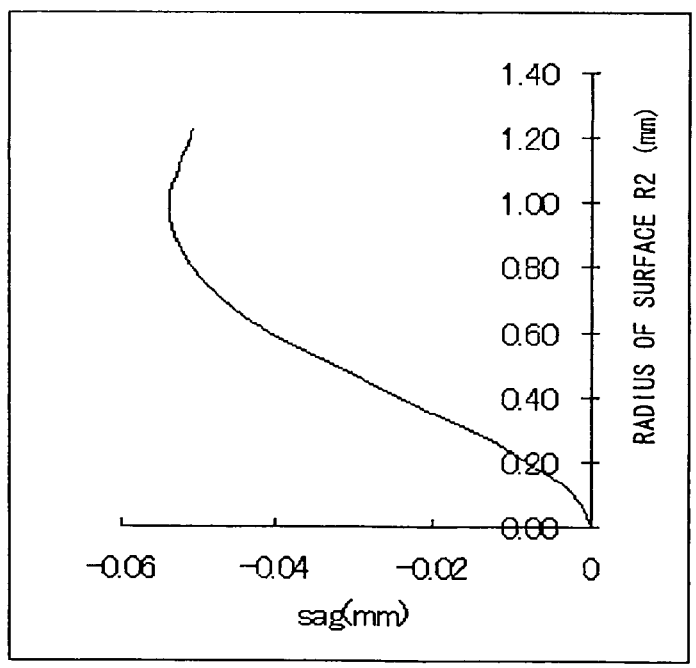
FIG. 52B is a view showing a sag in the radial direction.
Figure 52C:
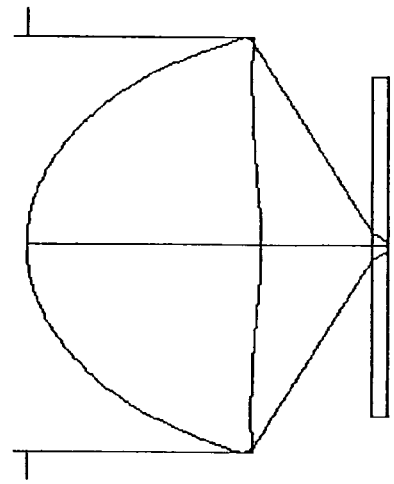
FIG. 52C is a view showing an optical pickup lens according to the example 24.
Figure 54A:
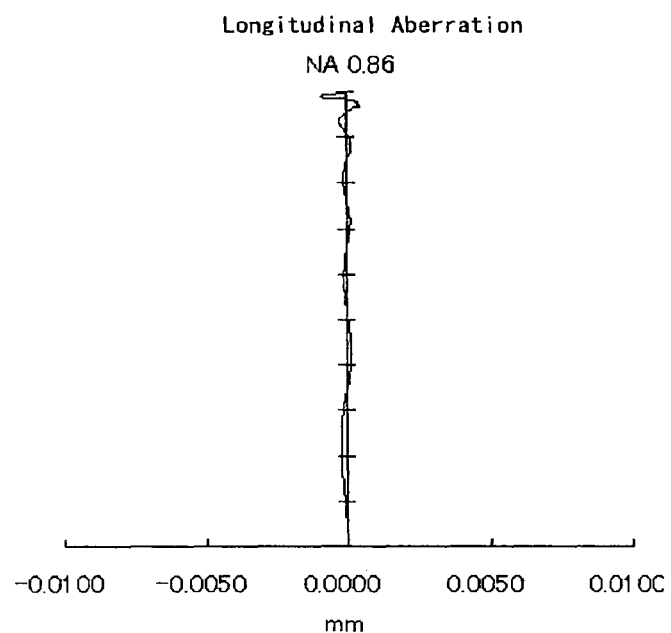
FIG. 54A is a view showing longitudinal aberration.
Figure 54B:
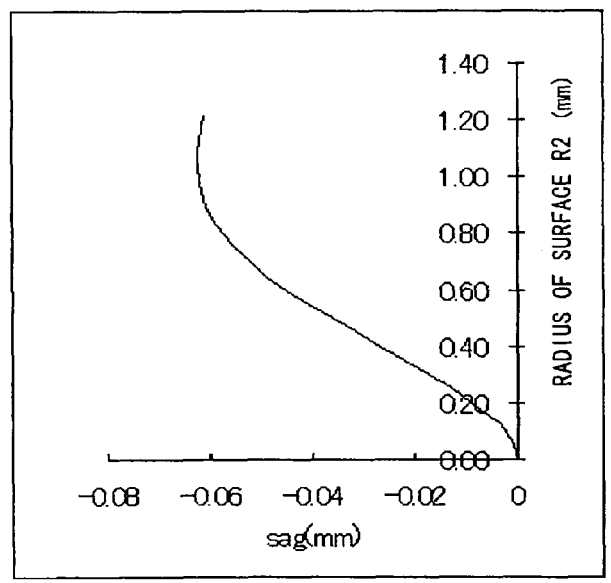
FIG. 54B is a view showing a sag in the radial direction.
Figure 54C:
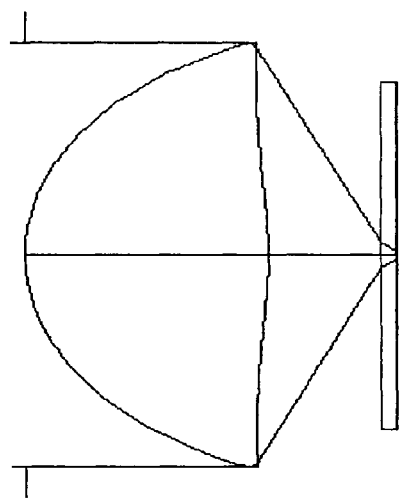
FIG. 54C is a view showing an optical pickup lens according to the example 25.
Figure 56A:
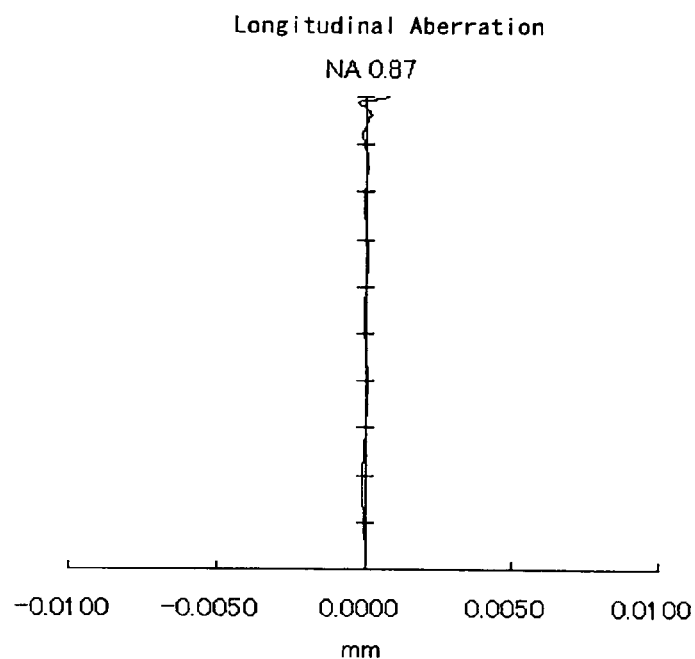
FIG. 56A is a view showing longitudinal aberration.
Figure 56B:
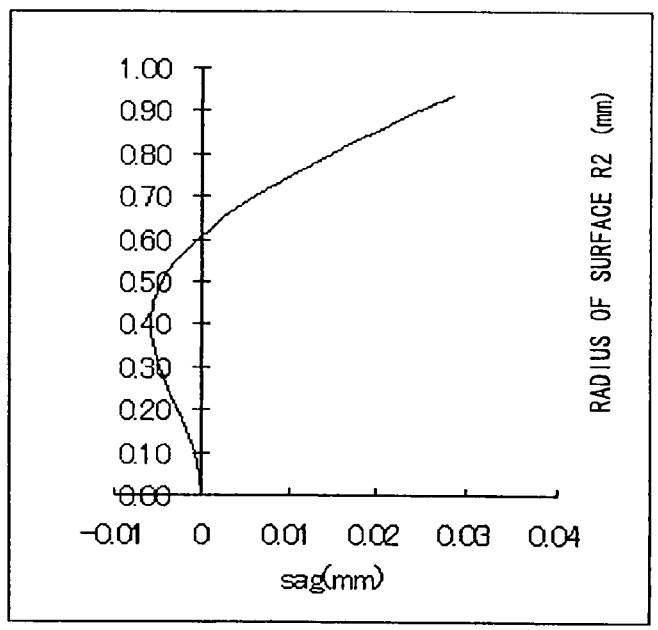
FIG. 56B is a view showing a sag in the radial direction.
Figure 56C:
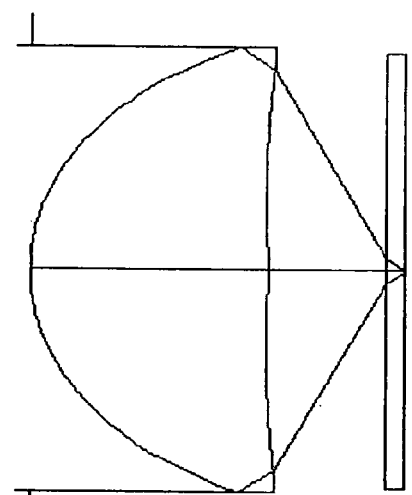
FIG. 56C is a view showing an optical pickup lens according to the example 26.
Figure 58A:
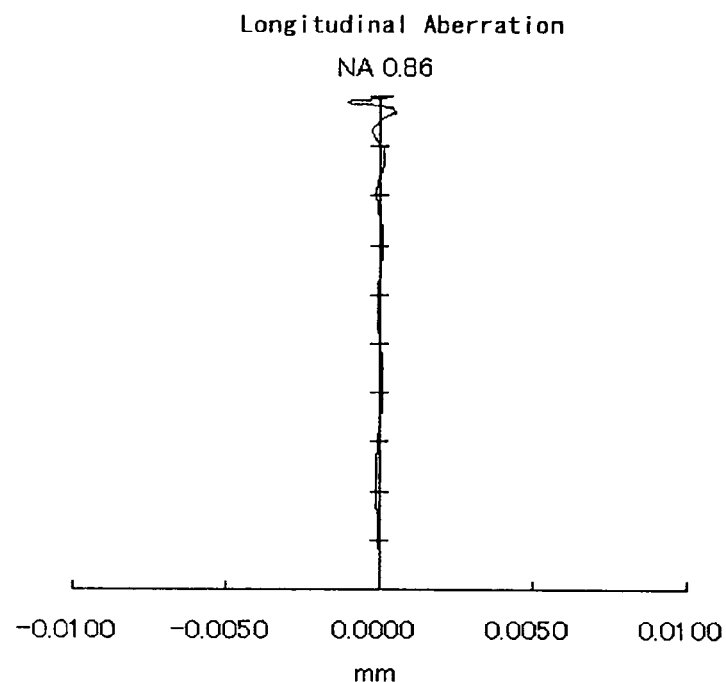
FIG. 58A is a view showing longitudinal aberration.
Figure 58B:
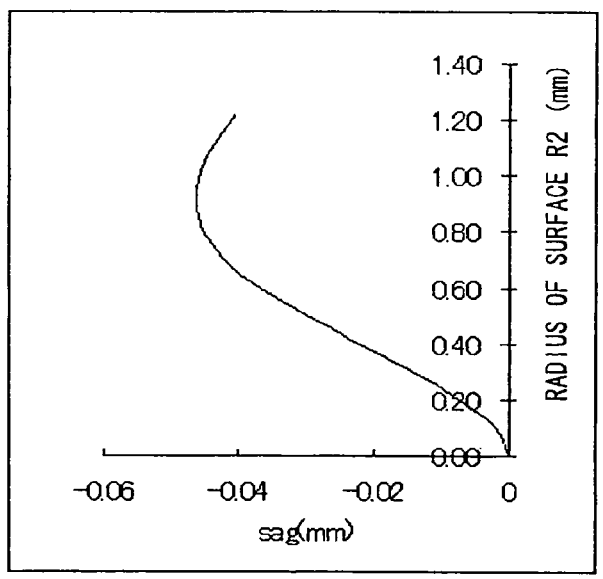
FIG. 58B is a view showing a sag in the radial direction.
Figure 58C:
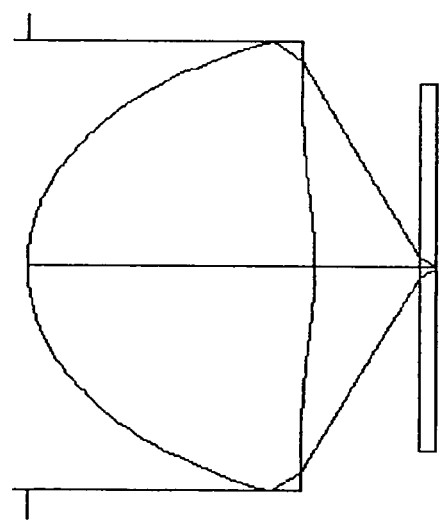
FIG. 58C is a view showing an optical pickup lens according to the example 27.
Figure 60A:
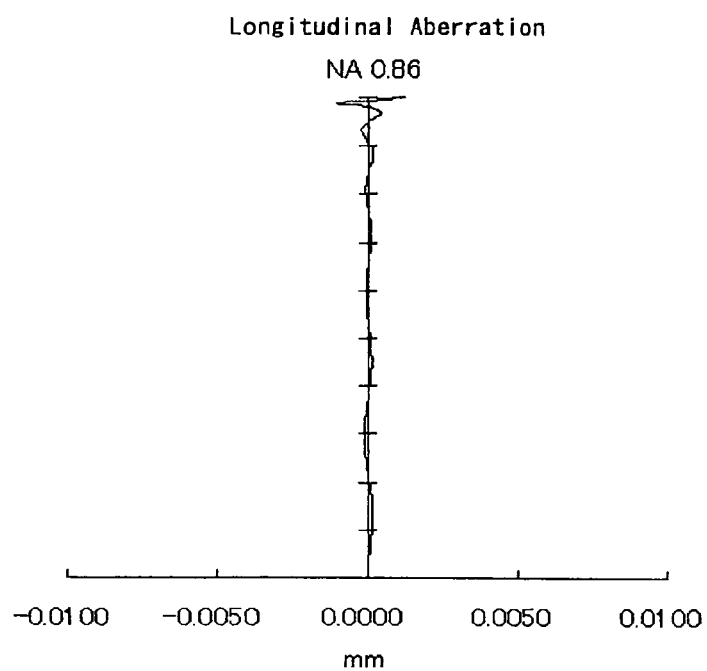
FIG. 60A is a view showing longitudinal aberration.
Figure 60B:
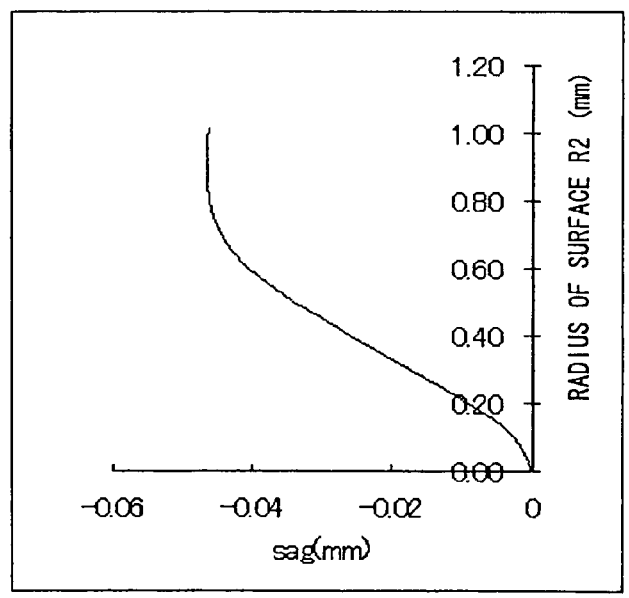
FIG. 60B is a view showing a sag in the radial direction.
Figure 60C:
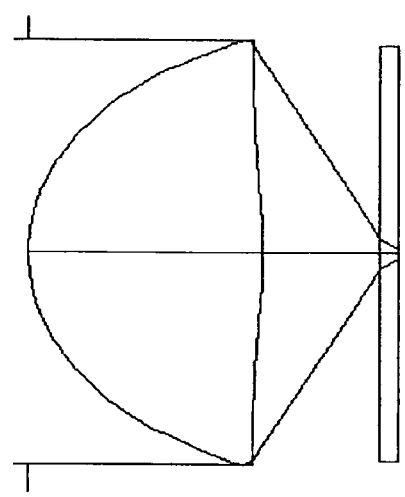
FIG. 60C is a view showing an optical pickup lens according to the example 28.
Figure 62A:
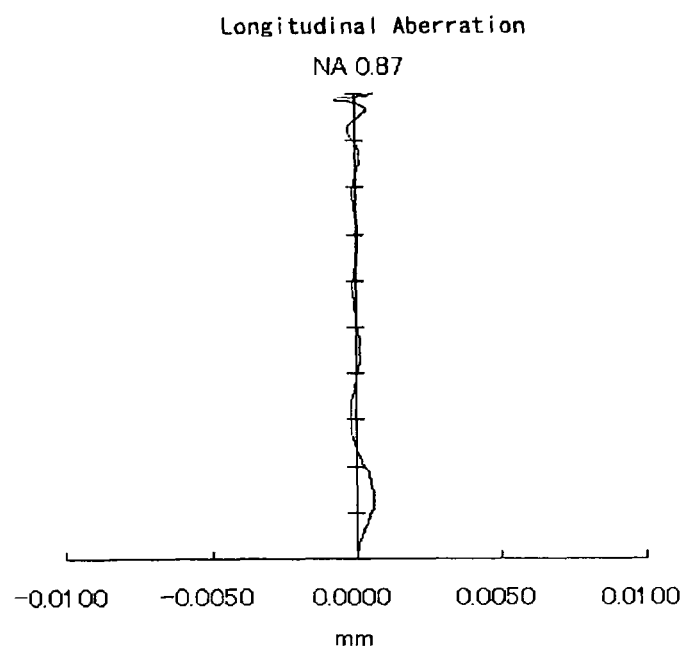
Figure 62B:
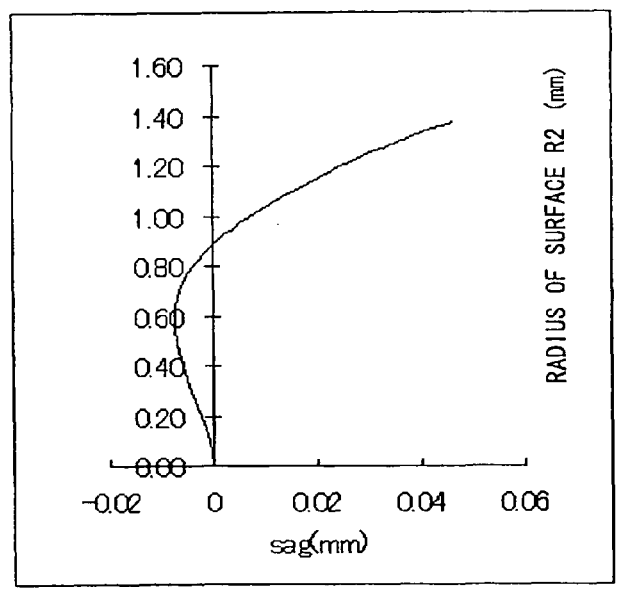
Figure 62C:
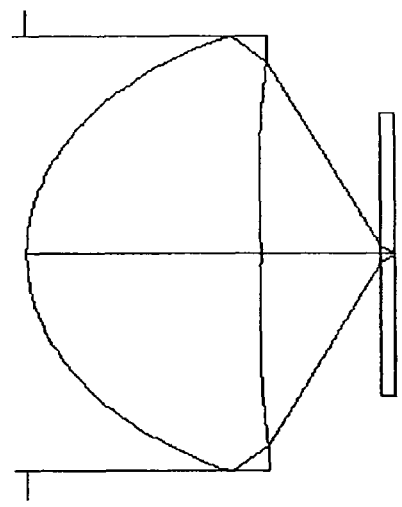
Figure 64A:
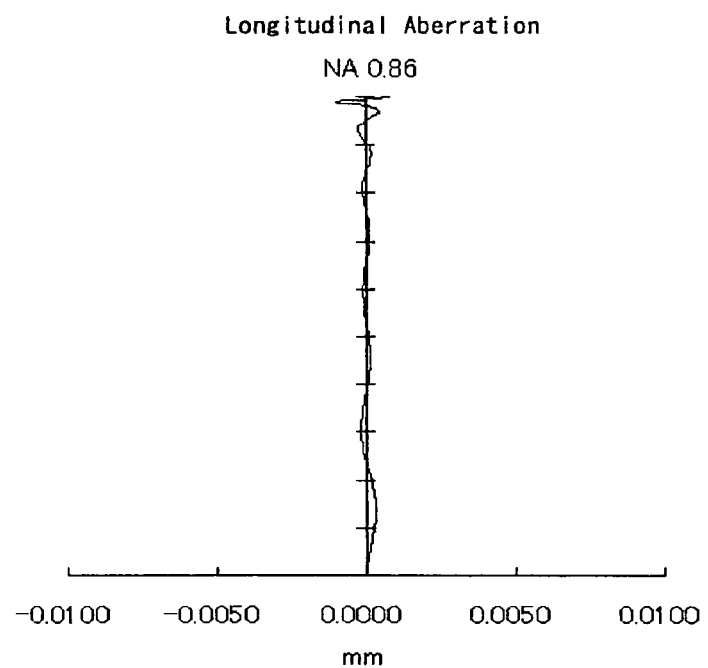
Figure 64B:
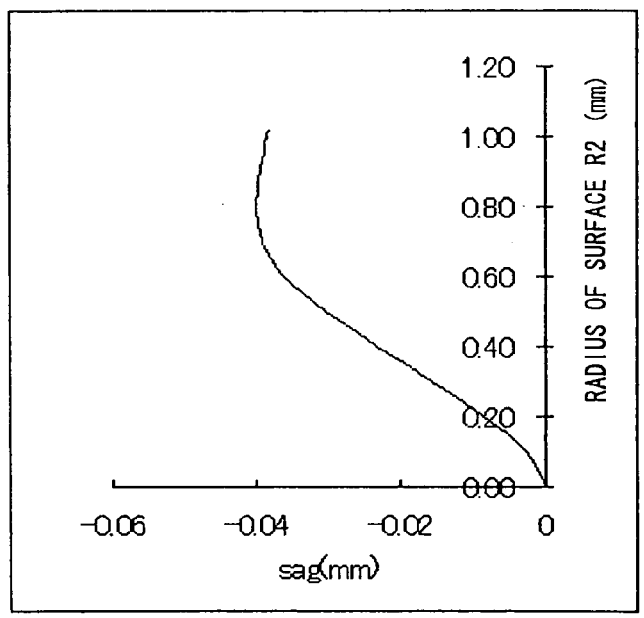
Figure 64C:
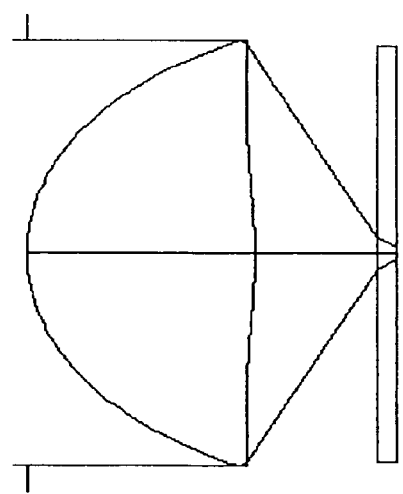
Figure 66A:
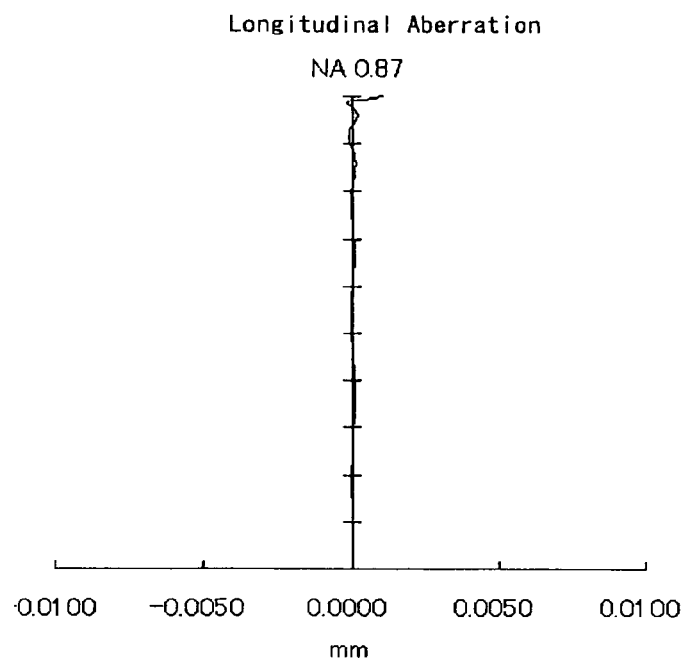
Figure 66B:
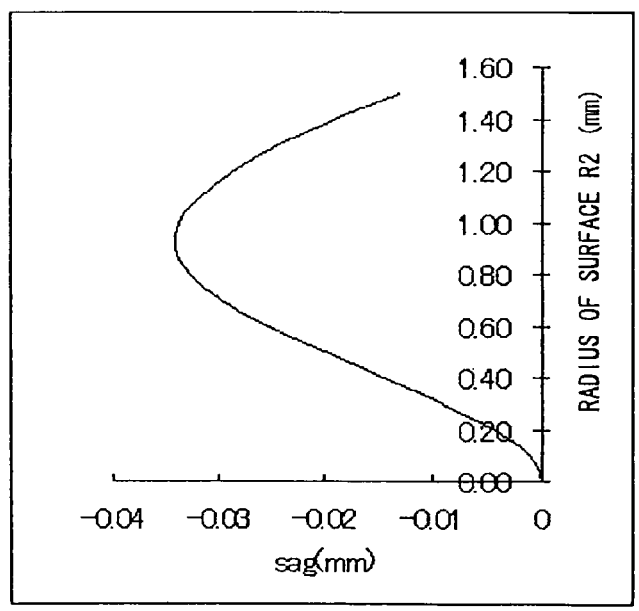
Figure 66C:
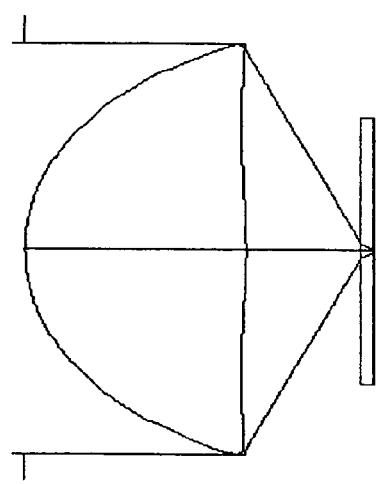

As shown in FIG. 14B, the example 5 satisfies:

$$sag1>sag2>sag3 \quad (3)$$

$$sag3<sag4 \quad (4)$$

and $$0>\Delta sag1>\Delta sag2 \quad (1)$$

$$\Delta sag2<\Delta sag3<0 \quad (2)$$

$$\Delta sag4>0 \quad (5)$$

just like the optical pickup lens 1b shown in FIGS. 2A and 2B.

Now, this point is described in detail based on the data shown in FIG. 13. If it is assumed that h1=0.100 mm, h2=0.600 mm, h3=0.700 mm, and h4=1.200 mm in the example 5, it is obtained that sag1=−0.00141 mm, sag2=−0.02460 mm, sag3=−0.02690 mm, and sag4=−0.01280 mm. Next, sags when 0.005 mm is added to each radius h1, h2, h3, and h4 are calculated to obtain $\Delta sag1$, $\Delta sag2$, $\Delta sag3$ and $\Delta sag4$.

sag in h1+0.005 mm=0.105 mm equals to −0.00155 mm,
sag in h2+0.005 mm=0.605 mm equals to −0.02440 mm,
sag in h3+0.005 mm=0.705 mm equals to −0.02698 mm, and
sag in h4+0.005 mm=1.205 mm equals to −0.01246 mm.

Therefore, $$\Delta sag1=((-0.00155)-(-0.00141))/(0.105-0.100)=-0.0280,$$

$$\Delta sag2=((-0.02440)-(-0.02460))/(0.605-0.600)=-0.0400,$$

$$\Delta sag3=((-0.02698)-(-0.02690))/(0.705-0.700)=-0.0160, \text{ and}$$

$$\Delta sag4=((-0.01246)-(-0.01280))/(1.205-1.200)=+0.068.$$

As can be shown in the verification above based on the specific numerical values, the example 1 satisfies the above-described expression in the range of the lens effective diameter just like the optical pickup lens 1b shown in FIGS. 2A and 2B.

The optical pickup lens of the example 5 with the surface R2 of such a shape has suitable longitudinal aberration within the lens effective diameter as shown in FIG. 14A. It also has good angle of view characteristics as shown in FIG. 4.

Likewise, the optical pickup lenses of the other examples have suitable longitudinal aberration within the lens effective diameter and also have good angle of view characteristics as shown in FIG. 4.

Therefore, it is possible in the examples 1 to 32 shown in FIGS. 4 and 5A to 68C to manufacture the optical pickup lenses with a high NA which maintain a longer working distance and maintains suitable sine conditions and good off-axis characteristics.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical pickup lens with a numerical aperture NA of 0.84 or larger for focusing a light beam of a parallel light or a sub-finite light with a coherent wavefront from a laser light source with a wavelength of 410 nm or shorter on an optical information recording medium in such a state that, as off-axis characteristics, an aberration becomes no more than 15 mλrms when an angle of view is 0.3 degrees, wherein the optical pickup lens is a biconvex single lens with a first surface on which the light beam from the laser light source is incident and a second surface opposite to the first surface, the first surface and the second surface having convex shapes, the second surface has a continuous shape, a shape of the second surface of the optical pickup lens having radii h1, h2 and h3 from an optical axis to a lens periphery, the radii satisfying a first expression h1<h2<h3, wherein sags in the radii h1, h2, and h3 are sag1, sag2, and sag3, and differentials in the sags are $\Delta sag1$, $\Delta sag2$, and $\Delta sag3$, respectively, the differentials satisfying second and third expressions $0>\Delta sag1>\Delta sag2$ and $\Delta sag2<\Delta sag3$, the second surface has a convex-shaped portion in its center part and does not have a concave-shaped portion in a periphery thereof so that a slope ($\Delta sag$), from a lens center h0 that matches the optical axis to an outer peripheral end of outside, is first gradual, then abrupt, and gradual again to the outer peripheral end, and a refractive index n for a wavelength of 405 nm is $1.59 \leq n \leq 1.62$.

2. An optical pickup lens with a numerical aperture NA of 0.84 or larger for focusing a light beam of a parallel light or a sub-finite light with a coherent wavefront from a laser light source with a wavelength of 410 nm or shorter on an optical information recording medium in such a state that, as off-axis characteristics, an aberration becomes no more than 15 mλrms when an angle of view is 0.3 degrees, wherein the optical pickup lens is a biconvex single lens with a first surface on which the light beam from the laser light source is incident and a second surface opposite to the first surface, the first surface and the second surface having convex shapes, the second surface has a continuous shape, a shape of the second surface of the optical pickup lens having radii h1, h2 and h3 from an optical axis to a lens periphery, the radii satisfying a first expression h1<h2<h3, wherein sags in the radii h1, h2, and h3 are sag1, sag2, and sag3, and differentials in the sags are $\Delta sag1$, $\Delta sag2$, and $\Delta sag3$, respectively, the differentials satisfying second and third expressions $0>\Delta sag1>\Delta sag2$ and $\Delta sag2<\Delta sag3$, the second surface has a convex-shaped portion in its center part and does not have a concave-shaped portion in a periphery thereof so that a slope ($\Delta sag$), from a lens center h0 that matches the optical axis to an outer peripheral end of outside, is first gradual, then abrupt, and gradual again to the outer peripheral end, and when a single lens center thickness is d and a focal length of an objective lens is f, $0.9 \leq d/f \leq 1.2$ is satisfied.

3. An optical pickup lens with a numerical aperture NA of 0.84 or larger and an effective diameter D of $1.8 \leq D \leq 3.2$ mm for focusing a light beam of a parallel light or a sub-finite light with a coherent wavefront from a laser light source with a wavelength of 410 nm or shorter on an optical information recording medium, wherein the optical pickup lens is a biconvex single lens with a first surface on which the light beam from the laser light source is incident and a second surface opposite to the first surface, the first surface and the second surface having convex shapes, the second surface has a continuous shape, a shape of the second surface of the optical pickup lens having radii h1, h2 and h3 from an optical axis to a lens periphery, the radii satisfying a first expression h1<h2<h3, wherein sags in the radii h1, h2, and h3 are sag1, sag2, and sag3, and differentials in the sags are $\Delta$sag1, $\Delta$sag2, and $\Delta$sag3, respectively, the differentials satisfying second and third expressions 0>$\Delta$sag1>$\Delta$sag2 and $\Delta$sag2<$\Delta$sag3, the second surface has a convex-shaped portion in its center part and does not have a concave-shaped portion in a periphery thereof so that a slope ($\Delta$sag), from a lens center h0 that matches the optical axis to an outer peripheral end of outside, is first gradual, then abrupt, and gradual again to the outer peripheral end, a tangent angle $\alpha$ of the first surface is $60° \leq \alpha$, and a refractive index n for a wavelength of 405 nm is $1.59 \leq n \leq 1.62$.

4. An optical pickup lens with a numerical aperture NA of 0.84 or larger, an effective diameter D of $1.8 \leq D \leq 2.45$ mm, and a center thickness d of $1.1 \leq d \leq 1.68495$ mm for focusing a light beam from a laser light source with a wavelength of 410 nm or shorter on an optical disc, the optical disc including an optical disc substrate and a light transmitting layer in the optical disc, wherein the optical pickup lens is a single lens with a first surface having a continuous shape on which the light beam from the laser light source is incident and a second surface opposite to the first surface, the second surface facing the optical disc, the second surface has a continuous shape, a shape of the second surface of the optical pickup lens having radii h1, h2 and h3 from an optical axis to a lens periphery, the radii satisfying a first expression h1<h2<h3, wherein sags in the radii h1, h2, and h3 are sag1, sag2, and sag3, and differentials in the sags are $\Delta$sag1, $\Delta$sag2, and $\Delta$sag3, respectively, the differentials satisfying second and third expressions 0>$\Delta$sag1>$\Delta$sag2 and $\Delta$sag2<$\Delta$sag3, the second surface has a convex shape in its center and does not have a concave-shaped portion in its periphery, and for a parallel light beam from the laser light source, a light is converged at a point having an inter-surface distance of 0.0875 mm from a surface of the light transmitting layer.

5. An optical pickup lens with a numerical aperture NA of 0.84 or larger, an effective diameter D of $2.04 \leq D \leq 2.45$ mm, and a center thickness d no less than 1.1 mm for focusing a light beam from a laser light source with a wavelength of 410 nm or shorter on an optical disc, the optical disc including an optical disc substrate and a light transmitting layer in the optical disc, wherein the optical pickup lens is a single lens with a first surface having a continuous shape on which the light beam from the laser light source is incident and a second surface opposite to the first surface, the second surface facing the optical disc, the second surface has a continuous shape, a shape of the second surface of the optical pickup lens having radii h1, h2 and h3 from an optical axis to a lens periphery, the radii satisfying a first expression h1<h2<h3, wherein sags in the radii h1, h2, and h3 are sag1, sag2, and sag3, and differentials in the sags are $\Delta$sag1, $\Delta$sag2, and $\Delta$sag3, respectively, the differentials satisfying second and third expressions 0>$\Delta$sag1>$\Delta$sag2 and $\Delta$sag2<$\Delta$sag3, the second surface has a convex shape in its center and does not have a concave-shaped portion in its periphery, and a curvature radius r2 of the second surface is $-1.766506 \leq r2 \leq -1.297362$ mm.

6. The optical pick up lens according to claim 5, wherein a conic coefficient K2 of the second surface is K2>−39.48096.

7. The optical pick up lens according to claim 5, wherein a refractive index n for a wavelength of 405 nm is $1.51 \leq n \leq 1.64$.

8. The optical pick up lens according to claim 5, wherein a refractive index n for a wavelength of 405 nm is $1.51 \leq n \leq 1.5899$.

9. The optical pick up lens according to claim 5, wherein a refractive index n for a wavelength of 405 nm is $1.51 \leq n \leq 1.57$.

10. The optical pick up lens according to claim 5, wherein for a parallel light beam from the laser light source, a light is converged at a point having an inter-surface distance of 0.0875 mm from a surface of the light transmitting layer.

\* \* \* \* \*